(12) United States Patent
Colborn et al.

(10) Patent No.: US 7,790,292 B2
(45) Date of Patent: Sep. 7, 2010

(54) POLYSILOXANE COPOLYMERS, THERMOPLASTIC COMPOSITION, AND ARTICLES FORMED THEREFROM

(75) Inventors: Robert Edgar Colborn, Niskayuna, NY (US); Gary C. Davis, Albany, NY (US); Jianbo Di, Evansville, IN (US); Constantin Donea, Evansville, IN (US); Irene Dris, Clifton Park, NY (US); Katherine Lee Jackson, Latham, NY (US); Brian D. Mullen, Mt. Vernon, IN (US); Laura G. Schultz, Evansville, IN (US); Moitreyee Sinha, Niskayuna, NY (US); Paul D. Sybert, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 939 days.

(21) Appl. No.: 11/537,154

(22) Filed: Sep. 29, 2006

(65) Prior Publication Data

US 2007/0129492 A1 Jun. 7, 2007

Related U.S. Application Data

(63) Continuation-in-part of application No. 11/426,680, filed on Jun. 27, 2006, now Pat. No. 7,605,221, which is a continuation-in-part of application No. 11/025,635, filed on Dec. 29, 2004, now Pat. No. 7,169,859, which is a continuation-in-part of application No. 10/307,873, filed on Dec. 2, 2002, now Pat. No. 6,861,482, which is a continuation-in-part of application No. 09/908,396, filed on Jul. 18, 2001, now Pat. No. 6,610,409, which is a continuation-in-part of application No. 09/368,706, filed on Aug. 5, 1999, now Pat. No. 6,306,507.

(60) Provisional application No. 60/134,692, filed on May 18, 1999.

(51) Int. Cl.
*C08G 77/14* (2006.01)
(52) U.S. Cl. .................. 428/447; 525/446; 525/464; 525/474; 528/26
(58) Field of Classification Search ............. 528/26; 525/446, 464, 474; 428/447
See application file for complete search history.

(56) References Cited

U.S. PATENT DOCUMENTS

| | | | |
|---|---|---|---|
| 3,030,331 A | 4/1962 | Goldberg | |
| 3,169,121 A | 2/1965 | Goldberg | |
| 3,207,814 A | 9/1965 | Goldberg et al. | |
| 3,444,129 A | 5/1969 | Young, Jr. et al. | |
| 3,460,961 A | 8/1969 | Young, Jr. et al. | |
| 3,492,261 A | 1/1970 | Young, Jr. et al. | |
| 3,503,779 A | 3/1970 | Young, Jr. et al. | |
| 3,506,470 A | 4/1970 | Young, Jr. et al. | |
| 3,686,355 A | 8/1972 | Gaines et al. | |
| 3,939,117 A | 2/1976 | Ueno | |
| 4,001,184 A | 1/1977 | Scott | |
| 4,074,864 A | 2/1978 | Narita et al. | |
| 4,127,560 A | 11/1978 | Kramer | |
| 4,156,069 A | 5/1979 | Prevorsek et al. | |
| 4,194,038 A | 3/1980 | Baker et al. | |
| 4,217,438 A | 8/1980 | Brunelle et al. | |
| 4,238,596 A | 12/1980 | Quinn | |
| 4,238,597 A | 12/1980 | Markezich et al. | |
| 4,286,083 A | 8/1981 | Kochanowski | |
| 4,308,406 A | 12/1981 | Takenaka et al. | |
| 4,334,053 A | 6/1982 | Freitag et al. | |
| 4,334,093 A | 6/1982 | Knifton | |
| 4,373,061 A | 2/1983 | Ching | |
| 4,410,594 A | 10/1983 | Olson | |
| 4,482,694 A | 11/1984 | Freitag et al. | |
| 4,487,896 A | 12/1984 | Mark et al. | |
| 4,503,121 A | 3/1985 | Robeson et al. | |

(Continued)

FOREIGN PATENT DOCUMENTS

EP 0254054 11/1992

(Continued)

OTHER PUBLICATIONS

ASTM D1003-00, Standard Test Method for Haze and Luminous Transmittance of Transparent Plastics, 6 pages.

(Continued)

*Primary Examiner*—Margaret G Moore
(74) *Attorney, Agent, or Firm*—Cantor Colburn LLP

(57) ABSTRACT

A polysiloxane copolymer composition comprises: a polysiloxane unit comprising 4 to 50 siloxane units, and a polyester-polycarbonate unit consisting of 50 to 100 mole percent of arylate ester units, less than 50 mole percent aromatic carbonate units, less than 30 mole percent resorcinol carbonate units, and less than 35 mole percent bisphenol carbonate units, wherein the siloxane units are present in the polysiloxane unit in an amount of 0.2 to 10 wt % of the total weight of the polysiloxane copolymer composition, and wherein the polysiloxane copolymer composition has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d). A window article for an aircraft, comprising the polysiloxane copolymer composition, is also disclosed.

31 Claims, 7 Drawing Sheets

U.S. PATENT DOCUMENTS

| | | | |
|---|---|---|---|
| 4,506,065 | A | 3/1985 | Miller et al. |
| 4,576,842 | A | 3/1986 | Hartsing et al. |
| 4,584,340 | A | 4/1986 | Chi |
| 4,600,632 | A | 7/1986 | Paul et al. |
| 4,617,368 | A | 10/1986 | Freitag et al. |
| 4,663,413 | A | 5/1987 | Ward et al. |
| 4,681,922 | A * | 7/1987 | Schmidt et al. ............. 525/474 |
| 4,742,111 | A | 5/1988 | Chi |
| 4,948,864 | A | 8/1990 | Imai et al. |
| 4,963,595 | A | 10/1990 | Ward et al. |
| 4,969,975 | A | 11/1990 | Biggs et al. |
| 4,973,652 | A | 11/1990 | Ebert et al. |
| 4,978,489 | A | 12/1990 | Radvan et al. |
| 4,992,322 | A | 2/1991 | Curry et al. |
| 4,994,532 | A | 2/1991 | Hawkins et al. |
| 5,032,661 | A | 7/1991 | Serini et al. |
| 5,047,270 | A * | 9/1991 | Mori et al. ................. 428/35.2 |
| 5,053,449 | A | 10/1991 | Biggs et al. |
| 5,126,495 | A * | 6/1992 | Serini et al. ................... 528/21 |
| 5,214,118 | A | 5/1993 | Hawkins et al. |
| 5,215,627 | A | 6/1993 | Willis et al. |
| 5,318,850 | A | 6/1994 | Pickett et al. |
| 5,321,114 | A | 6/1994 | Fontana et al. |
| 5,322,882 | A | 6/1994 | Okamoto |
| 5,360,861 | A | 11/1994 | Campbell |
| 5,380,795 | A | 1/1995 | Gosens et al. |
| 5,391,795 | A | 2/1995 | Pickett |
| 5,445,871 | A * | 8/1995 | Murase et al. .............. 428/215 |
| 5,451,632 | A | 9/1995 | Okumura et al. |
| 5,455,310 | A | 10/1995 | Hoover et al. |
| 5,488,086 | A | 1/1996 | Umeda et al. |
| 5,510,182 | A | 4/1996 | Fontana et al. |
| 5,510,414 | A | 4/1996 | Okamoto et al. |
| 5,530,083 | A | 6/1996 | Phelps et al. |
| 5,608,026 | A | 3/1997 | Hoover et al. |
| 5,616,674 | A | 4/1997 | Michel et al. |
| 5,679,820 | A | 10/1997 | Pickett et al. |
| 5,714,567 | A | 2/1998 | Idage et al. |
| 5,807,965 | A | 9/1998 | Davis |
| 5,821,322 | A | 10/1998 | Brunelle et al. |
| 5,869,168 | A | 2/1999 | Mahn, Jr. |
| 5,916,997 | A | 6/1999 | Webb et al. |
| 5,932,677 | A * | 8/1999 | Hoover et al. ................. 528/26 |
| 5,990,188 | A | 11/1999 | Patel et al. |
| 6,037,059 | A | 3/2000 | Pickett et al. |
| 6,072,011 | A | 6/2000 | Hoover |
| 6,103,837 | A | 8/2000 | Hiiro et al. |
| 6,143,839 | A | 11/2000 | Webb et al. |
| 6,143,918 | A | 11/2000 | Pickett et al. |
| 6,252,013 | B1 | 6/2001 | Banach et al. |
| 6,265,522 | B1 | 7/2001 | Brunelle et al. |
| 6,291,589 | B1 | 9/2001 | Brunelle et al. |
| 6,294,647 | B1 | 9/2001 | Brunelle et al. |
| 6,306,507 | B1 | 10/2001 | Brunelle et al. |
| 6,329,456 | B1 | 12/2001 | Okibe et al. |
| 6,346,597 | B1 | 2/2002 | Banach et al. |
| 6,350,521 | B1 | 2/2002 | Chen et al. |
| 6,410,620 | B2 | 6/2002 | Shakhanovich |
| 6,414,058 | B2 | 7/2002 | Shakhanovich |
| 6,417,253 | B1 | 7/2002 | Shakhanovich |
| 6,492,481 | B1 | 12/2002 | Davis et al. |
| 6,500,549 | B1 | 12/2002 | Deppisch et al. |
| 6,559,270 | B1 | 5/2003 | Siclovan et al. |
| 6,572,956 | B1 | 6/2003 | Pickett et al. |
| 6,596,843 | B2 | 7/2003 | Brunelle et al. |
| 6,607,814 | B2 | 8/2003 | Pickett et al. |
| 6,610,409 | B2 | 8/2003 | Pickett et al. |
| 6,613,820 | B2 | 9/2003 | Fujiguchi et al. |
| 6,657,018 | B1 | 12/2003 | Hoover |
| 6,723,864 | B2 | 4/2004 | Silva et al. |
| 6,730,720 | B2 * | 5/2004 | Gohr et al. .................. 523/351 |
| 6,833,422 | B2 | 12/2004 | Silva et al. |
| 6,861,482 | B2 | 3/2005 | Brunelle et al. |
| 6,870,013 | B2 | 3/2005 | Silva et al. |
| 2003/0105226 | A1 | 6/2003 | Cella et al. |
| 2003/0139504 | A1 | 7/2003 | Miebach et al. |
| 2003/0207123 | A1 | 11/2003 | Brunelle et al. |
| 2004/0039145 | A1 | 2/2004 | Silva et al. |
| 2004/0220330 | A1 | 11/2004 | DeRudder et al. |
| 2005/0032988 | A1 | 2/2005 | Silva et al. |
| 2005/0159577 | A1 | 7/2005 | Davis et al. |

FOREIGN PATENT DOCUMENTS

| | | |
|---|---|---|
| EP | 0434848 | 9/1995 |
| EP | 0376052 | 3/1996 |
| EP | 0517927 | 6/1999 |
| EP | 0524731 | 3/2002 |
| GB | 2043083 | 10/1980 |
| WO | 80/00084 | 1/1980 |
| WO | 00/26275 | 5/2000 |
| WO | 2004/076541 | 9/2004 |

OTHER PUBLICATIONS

ASTM D256-04, Standard Test Method for Determining the Izod Pendulum Impact Resistance of Plastics, 20 pages.

JP 04-225062, Polycarbonate Resin Composition, Abstract Only, 1 page.

JP 56-133332, Preparation of Aromatic Polyester Carbonate Resin, Abstract Only, 1 page.

Federal Aviation Regulation F25.5, [online],;[retrieved on May 3, 2007]; retrieved from the Internet http://rgl.faa.gov/Regulatory_and_Guidance_Library/rgFAR.nsf/0/2A254C0127EFE73A85256673004F6278?OpenDocument.

International Search Report for International Application No. PCT/US2007/074279, mailed Jan. 15, 2008, 6 pages.

Written Opinion for International Application No. PCT/US2007/074279, mailed Jan. 15, 2008, 8 pages.

Federal Aviation Regulation F25.853(d), [online],;[retrieved on May 3, 2007]; retrieved from the Internet http://rgl.faa.gov/Regulatory_and_Guidance_Library/rgFAR.nsf/0/93495F64A031532D86256F3B006D86C7?OpenDocument.

Federal Aviation Regulation F25.4 (Appendix F4 [online],;[retrieved on May 3, 2007]; retrieved from the Internet http://www.flightsimaviation.com/data/FARS/part_25-appF4.html.

Aircraft Materials Fire Test Handbook, Chapter 5, Heat Release Rate for Cabin Materials [online]; [retrieved on May 18, 2007]; retrieved from the Internet http://www.fire.tc.faa.gov/pdf/handbook/00-12_ch5.pdf.

Eareckson, III. "Interfacial Polycondensation. X. Polyphenyl Esters". Journal of Polymer Science. vol. XL, pp. 399-406 (1959).

Cohen, et al. "Transparent Ultraviolet-Barrier Coatings" Journal of Polymer Science: Part A-1. vol. 9, 3263-3299 (1971).

DE 1927938, Polyarylesters, Abstract Only, 1 page.

JP1989-199841, Multi-layer Orientation Bottle, Abstract Only, 1 page.

* cited by examiner

OSU Values Of Copolymers Containing E10 Siloxane Blocks

OSU Values v Siloxane Block Length

UV-Vis Spectra of UVA Containing Film

- UVAPLAS 388 20 mil
- UVAPLAS 388 3 mil
- LA31 20 mil
- Cyasorb 3638 20 mil
- Uvinul 3030 20 mil
- Uvinul 3030 3 mil
- PC 20 mil OSU vs Cap Layer Thickness
LA31 Containing PC Cap

- Uncoated-Peak
- Coated-Peak
- Uncoated-2 min
- Coated-2min

PeakHeat Release Rate versus Cap Layer Thickness

−◇− 5 % LA31, AB    −■− 7 % LA31 ABA sheet

−◇− LA31
−■− Cyasorb 3638
−▲− Uvinul 3030

POLYSILOXANE COPOLYMERS, THERMOPLASTIC COMPOSITION, AND ARTICLES FORMED THEREFROM

CROSS-REFERENCE TO RELATED APPLICATIONS

This application is a continuation-in-part of U.S. application Ser. No. 11/426,680, filed Jun. 27, 2006, now U.S. Pat. No. 7,605,221, which is a continuation-in-part of U.S. application Ser. No. 11/025,635, filed Dec. 29, 2004, now U.S. Pat. No. 7,169,859, which is a continuation-in-part of Ser. No. 10/307,873 filed Dec. 2, 2002 U.S. Pat. No. 6,861,482, issued Mar. 1, 2005, which is a continuation-in-part of Ser. No. 09/908,396, filed Jul. 18, 2001 U.S. Pat. No. 6,610,409, issued Aug. 26, 2003, which is a continuation-in-part of Ser. No. 09/368,706 filed Aug. 5, 1999 U.S. Pat. No. 6,306,507, issued Oct. 23, 2001, which claims the benefit of U.S. Provisional Application No. 60/134,692, filed May 18, 1999, and which applications are incorporated herein by reference.

BACKGROUND OF THE INVENTION

This disclosure relates to polysiloxane copolymers, thermoplastic compositions comprising these, methods of manufacture, and articles and uses thereof.

Plastic materials are widely used for fabricating components used in the interior of vehicles designed to move large numbers of people (e.g., commercial aircraft, ships, and trains). It is desirable for such materials, particularly where they are used in aircraft, to have excellent flame retardant properties and to release only low levels of heat and smoke when exposed to a flame. According to the Federal Aviation Regulations (FAR), specific flame retardant properties of interest for plastic components used in the interior of aircraft include at minimum a low heat release rate (referred to as the OSU 65/65 standard), low smoke density, and low toxicity of combustion products. In the event of a fire, components made from materials having these properties can increase the amount of time available that the passengers would have to escape, provide for better visibility during a fire, and reduce the toxicity of the emissions. Plastic materials that are useful in such applications generally must also have good processability for forming the components, and desirable physical properties such as surface finish, toughness to minimize the propensity of the parts to crack during use or secondary operations, weatherability, and transparency where desired.

In addition, it is desirable for these materials to have an intrinsic flame retardance that may be enhanced by addition of flame retardants. Plastic materials that meet such criteria desirably have flame retardant properties that are improved over the flame retardant properties of typical commercially available thermoplastic compositions.

Isophthalate-terephthalate-resorcinol (ITR) based polyarylate copolymers can possess many of these desired features, including toughness, transparency, and weatherability. ITR based polyarylate copolymers can have desirable thermal flow properties and are useful in a variety of manufacturing processes. In addition, ITR based polyarylate copolymers can have desirable solubility properties for the manufacture of polyarylate copolymers on a commercial scale using interfacial polymerization techniques. These polymerization techniques allow synthetic flexibility and composition specificity toward the synthesis of polyarylate copolymers with a target molecular weight and molecular composition.

There accordingly remains a need in the art for polyarylates having good intrinsic heat release rate performance, and low haze for use in thermoplastic compositions. In addition, the polyarylates may have good melt stability, solubility, and ductility. The thermoplastic compositions prepared therefrom also desirably have good color capability, weatherability, and gloss retention.

SUMMARY OF THE INVENTION

The above deficiencies in the art are alleviated by, in an embodiment, a window article comprising a frame and a sheet supported by the frame, wherein the sheet comprises a polysiloxane copolymer composition comprising: a.) a polysiloxane unit of the formula:

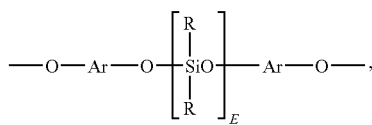

of the formula:

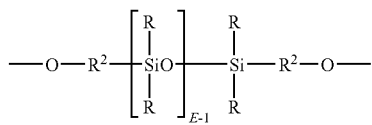

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and b.) an arylate-containing unit consisting of: 50 to 100 mole percent of arylate ester units, less than 50 mole percent aromatic carbonate units, less than 30 mole percent resorcinol carbonate units, and less than 35 mole percent bisphenol carbonate units, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the sheet has a 2 minute integrated heat release rate of less than or equal to 65 kilowatt-minutes per square meter (kW-min/$m^2$) and a peak heat release rate of less than 65 kilowatts per square meter (kW/$m^2$) as measured using the method of FAR F25.4, in accordance with Federal Aviation Regulation FAR 25.853 (d).

In another embodiment, a window article consists essentially of a frame and a sheet supported by the frame, wherein the sheet consists essentially of: a.) 50 to 100 percent by weight of a polysiloxane copolymer composition comprising: i.) a polysiloxane unit comprising siloxane units, wherein the polysiloxane unit is of the formula:

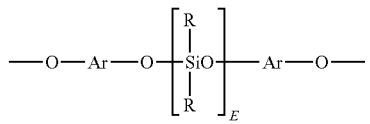

or the polysiloxane unit is of the formula:

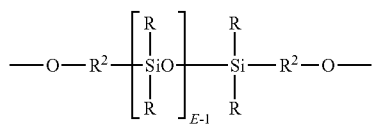

wherein E is 4 to 50, each R is the same or different and is a $C_{1-13}$ monovalent organic group, Ar is a $C_{6-30}$ arylene group, and each $R^2$ is independently a divalent $C_{1-30}$ alkylene or $C_{7-30}$ arylene-alkylene; and ii.) an arylate-containing unit consisting of: 50 to 100 mole percent of arylate ester units, less than 50 mole percent aromatic carbonate units, less than 30 mole percent resorcinol carbonate units, and less than 3 mole percent bisphenol carbonate units, wherein the siloxane units of the polysiloxane unit are present in the polysiloxane copolymer composition in an amount of 0.2 to 10 wt % based on the weight of the polysiloxane copolymer composition, b.) 0 to 50 percent by weight of an additional polymer not identical to the polysiloxane copolymer composition; and c.) 0 to 1 percent by weight of a flame retardant, wherein the weight percentages of each of the polysiloxane copolymer composition, the additional polymer, and the flame retardant are based on the total weight of polysiloxane copolymer composition, additional polymer, and flame retardant, wherein the properties of the polysiloxane composition are such that it can be molded into a test chip having a thickness of 2.0±0.12 millimeters that has a haze of less than or equal to 3%, according to ASTM D1003-00, and wherein the sheet has a 2 minute integrated heat release rate of less than or equal to 65 kilowatt-minutes per square meter (kW-min/m²) and a peak heat release rate of less than 65 kilowatts per square meter (kW/m²) as measured using the method of FAR F25.4, in accordance with Federal Aviation Regulation FAR 25.853 (d).

In another embodiment, a window article comprises a frame and a sheet supported by the frame, wherein the sheet comprises an OSU compliant layer having a hard coat disposed on a surface of the OSU compliant layer, wherein the OSU compliant layer comprises a polysiloxane copolymer composition comprising: a.) a polysiloxane unit of the formula:

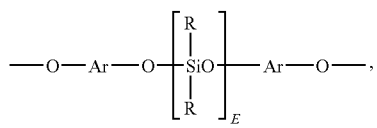

or of the formula:

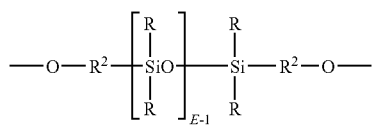

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and b.) an arylate-containing unit consisting of 50 to 100 mole percent of arylate ester units, less than 50 mole percent aromatic carbonate units, less than 30 mole percent resorcinol carbonate units, and less than 35 mole percent bisphenol carbonate units, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the sheet has a 2 minute integrated heat release rate of less than or equal to 65 kilowatt-minutes per square meter (kW-min/m²) and a peak heat release rate of less than 65 kilowatts per square meter (kW/m²) as measured using the method of FAR F25.4, in accordance with Federal Aviation Regulation FAR 25.853 (d). In another embodiment, the window article comprises a frame and a sheet supported by the frame, wherein the sheet further comprises a UV blocking layer disposed on both opposing surfaces of the OSU compliant layer, and a hard coat disposed on a surface of each of the UV blocking layers opposite the OSU compliant layer.

In another embodiment, an aircraft window comprises an outer window, an inner window, a dust cover, and a frame, wherein the outer window, inner window, and dust cover are secured in the frame such that the inner window is disposed between and is substantially coplanar with each of the dust cover and the outer window; the outer window and inner window are separated by a space; the dust cover and the inner window are separated by a space; and wherein the dust cover comprises a polysiloxane copolymer composition comprising a.) a polysiloxane unit comprising siloxane units, wherein the polysiloxane unit is of the formula:

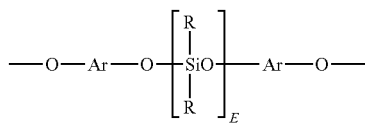

or of the formula:

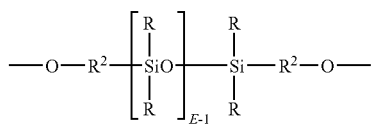

wherein E is 4 to 50; each R is the same or different and is a $C_{1-13}$ monovalent organic group, Ar is a $C_{6-30}$ arylene group, and each $R^2$ is independently a divalent $C_{1-30}$ alkylene or $C_{7-30}$ arylene-alkylene; and b.) an arylate-containing unit consisting of: 50 to 100 mole percent of arylate ester units, less than 50 mole percent aromatic carbonate units, less than 30 mole percent resorcinol carbonate units, and less than 35 mole percent bisphenol carbonate units, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the dust cover has a 2 minute integrated heat release rate of less than or equal to 65 kilowatt-minutes per square meter (kW-min/m²)

and a peak heat release rate of less than 65 kilowatts per square meter (kW/m$^2$) as measured using the method of FAR F25.4, in accordance with Federal Aviation Regulation FAR 25.853 (d).

In another embodiment, a plastic mirror, comprises a polymer layer, a hard coat disposed on a surface of the polymer layer, and a metal layer disposed on a surface of the polymer layer opposite the hard coat, wherein the polymer layer comprises a polysiloxane copolymer composition comprising a.) a polysiloxane unit comprising siloxane units, wherein the polysiloxane unit is of the formula:

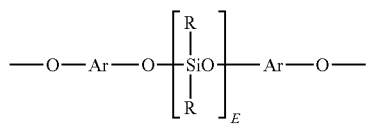

or of the formula:

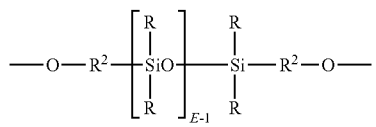

wherein E is 4 to 50; each R is the same or different and is a $C_{1-13}$ monovalent organic group, Ar is a $C_{6-30}$ arylene group, and each $R^2$ is independently a divalent $C_{1-30}$ alkylene or $C_{7-30}$ arylene-alkylene; and b.) an arylate-containing unit consisting of: 50 to 100 mole percent of arylate ester units, less than 50 mole percent aromatic carbonate units, less than 30 mole percent resorcinol carbonate units, and less than 35 mole percent bisphenol carbonate units, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the plastic mirror has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

A description of the figures, which are meant to be exemplary and not limiting, is provided below.

Figure 1:
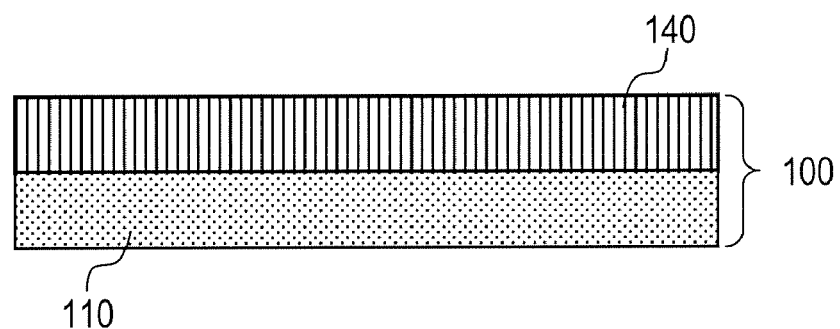
FIG. 1 is a diagram of a hard coated sheet.

The above described and other features are exemplified by the following detailed description.

DETAILED DESCRIPTION OF THE INVENTION

Surprisingly, a polysiloxane copolymer composition comprising polyarylate units, carbonate units, and low levels (less than or equal to 10 wt %) of polysiloxane units having relatively low numbers of siloxane repeat units (i.e., 4 to 50 siloxane units) and distributed in the polyester unit, polycarbonate unit, or in both the polyester and polycarbonate units, has a low OSU 65/65 heat release rate as determined by combustion of an article consisting of the polysiloxane copolymer composition. Polysiloxane copolymer compositions of these compositions may be prepared by any known polycarbonate, polyester, or polyester-polycarbonate reaction, and the resulting polymer may be opaque, translucent, or transparent. The polysiloxane copolymer composition also desirably meets the FAR requirements for low smoke density and levels of toxic combustion by-products. The polysiloxane copolymer composition can be used to prepare, for example, transparent components for use in commercial jet aircraft, such as the transparent dust cover for covering the cabin side of an aircraft window, to give these components significantly improved fire safety properties while maintaining excellent transparency.

As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like. Combinations of substituents and/or variables are permissible provided that the substitutions do not significantly adversely affect synthesis or use of the compound.

The polysiloxane copolymer composition comprises arylate-containing units that may comprise aromatic carbonate units. The aromatic carbonate units may also be referred to as polycarbonate units. As used herein, the terms "polycarbonate", "polycarbonate resin", and "polycarbonate unit" mean a composition having repeating structural carbonate units of the formula (1):

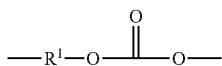
(1)

in which greater than or equal to 60 percent of the total number of $R^1$ groups are aromatic organic groups and the balance thereof are aliphatic or alicyclic groups. The aromatic organic groups may be derived from dihydroxy aromatic compounds, including resorcinols or bisphenols. In an embodiment, each $R^1$ is a $C_{6-30}$ arylene group. In another embodiment, each $R^1$ is a group of the formula (2):

$$-A^1-Y^1-A^2- \quad (2)$$

wherein each of $A^1$ and $A^2$ is a monocyclic divalent aryl group and $Y^1$ is a bridging group having one or two atoms that separate $A^1$ from $A^2$. In an exemplary embodiment, one atom separates $A^1$ from $A^2$. Illustrative non-limiting examples of bridging groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene. In another embodiment, $Y^1$ is a carbon-carbon bond (–) connecting $A^1$ and $A^2$. An example of an $R^1$ of formula (2) that has a carbon-carbon bond connecting $A^1$ and $A^2$ is the group derived from 4,4'-biphenol. In an embodiment, the $R^1$ groups are desirably minimally substituted with hydrocarbon-containing substituents such as, for example, alkyl, alkoxy, or alkylene substituents.

Polycarbonates may be produced by the interfacial reaction of dihydroxy aromatic compounds having the formula HO—$R^1$—OH, which includes dihydroxy aromatic compounds of formula (3), also referred to herein as a bisphenol:

$$HO-A^1-Y^1-A^2-OH \quad (3)$$

wherein $Y^1$, $A^1$ and $A^2$ are as described above. Also included are the more specific bisphenol compounds of general formula (4):

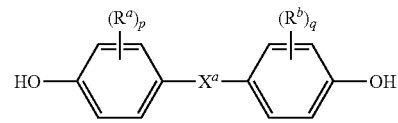
(4)

wherein $R^a$ and $R^b$ each represent a halogen atom or a monovalent hydrocarbon group and may be the same or different; p and q are each independently integers of 0 to 4. It will be understood herein that where no substituent group is specified for an atom, for example where p is 0 in formula (4), the unspecified valency or valencies will be occupied by a hydrogen atom or atoms sufficient to fill the unspecified valency or valencies, unless otherwise specified. Also, in formula (4), $X^a$ represents one of the groups of formula (5).

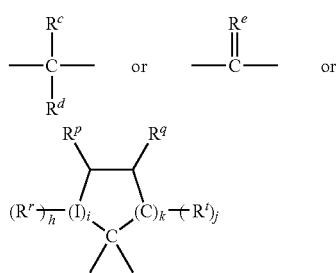
(5)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and Re is a divalent $C_{1-12}$ hydrocarbon group.

In an embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

In another embodiment, $X^a$ is an acyclic $C_{1-18}$ alkylidene group, a $C_{3-18}$ cycloalkylidene group, or a $C_{2-18}$ heterocycloalkylidene group, i.e., a cycloalkylidene group having up to three heteroatoms in the ring, wherein the heteroatoms include —O—, —S—, or —N(Z)-, where Z is hydrogen, halogen, hydroxy, $C_{1-12}$ alkyl, $C_{1-12}$ alkoxy, or $C_{1-12}$ acyl.

In still another embodiment, $X^a$ is a substituted $C_{3-18}$ cycloalkylidene of the formula (5), wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)- where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

Polycarbonates can be derived from bisphenols containing cycloalkylidene bridges. Cycloalkylidene-bridged bisphenols may include, for example, cyclohexylidene-bridged bisphenols corresponding to formula (6):

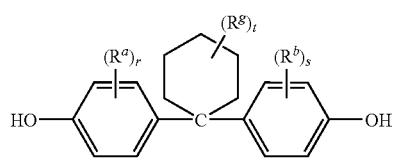

(6)

wherein $R^a$, $R^b$ and $R^g$ are each independently $C_{1-12}$ alkyl or halogen, r and s are each independently 0 to 4, and t is 0 to 10. It will be understood that $R^a$ is hydrogen when r is 0, $R^b$ is hydrogen when s is 0, and $R^g$ is hydrogen when t is 0. The substituents $R^a$, $R^b$, and $R^g$ may, when comprising an appropriate number of carbon atoms, be straight chain, cyclic, bicyclic, branched, saturated, or unsaturated. In a specific embodiment, cyclohexylidene-based bisphenols, for example the reaction product of two moles of a substituted or unsubstituted phenol with one mole of a cyclohexanone such as, in an exemplary embodiment, cyclohexanone or a hydrogenated isophorone (e.g., 3,3,5-trimethylcyclohexane-1-one), are useful for making polycarbonate polymers with high glass transition temperatures and high heat distortion temperatures. Isophorone bisphenol based polymers, including polycarbonate copolymers made from non-cyclohexylidene bisphenols and blends of alkyl cyclohexylidene bisphenol containing polycarbonates with non-alkyl cyclohexyl bisphenol polycarbonates, are supplied by Bayer Co. under the APEC® trade name.

Some illustrative, non-limiting examples of suitable dihydroxy aromatic compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethyl-spiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy aromatic compounds may also be used.

Another aromatic organic group $R^1$ (that is not a bisphenol) is derived from a dihydroxy aromatic compound of formula (7):

(7)

wherein each $R^f$ is independently a halogen atom, a $C_{1-10}$ hydrocarbon group, or a $C_{1-10}$ halogen substituted hydrocarbon group, and u is 0 to 4. The halogen is usually bromine. In an embodiment, compounds of formula (7) in which the —OH groups are substituted meta to one another, and wherein $R^f$ and u are as described above, are also generally referred to herein as resorcinols. Examples of compounds that may be represented by the formula (7) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds. In a specific embodiment, compounds of formula (7) are not substituted, with hydrocarbon-containing substituents. In an embodiment, where a dihydroxyaromatic compound of general formula (7) is used, less than or equal to 5 mol %, specifically less than or equal to 2 mol %, and still more specifically less than or equal to 1 mol % of the dihydroxyaromatic compound has alkyl, alkoxy, or alkylene substituents.

In an embodiment, useful polycarbonate units are derived from bisphenol compounds of formula (3). In a specific embodiment, polycarbonate units comprise bisphenol-A carbonate repeat units. In another specific embodiment, polycarbonate units may comprise a combination of carbonate repeat units derived from dihydroxy aromatic compounds of formula (3), formula (4), formula (6), formula (7), or a combination comprising at least one of the foregoing dihydroxy aromatic compounds. Polycarbonates as disclosed herein may also include, in addition to homopolycarbonates, copolymers comprising different $R^1$ moieties in the carbonate and referred to herein as "copolycarbonates". In an embodiment, the bisphenol polycarbonate units comprise 0 to 35 mol %, specifically 1 to 30 mol %, more specifically 2 to 25 mol %, and still more specifically, 3 to 20 mol %, of the total weight of the polysiloxane copolymer composition.

In an embodiment, the polycarbonate unit is a linear homopolymer derived from bisphenol A, in which each of $A^1$ and $A^2$ is p-phenylene and $Y^1$ is isopropylidene.

The polysiloxane copolymers may have an intrinsic viscosity, as determined in chloroform at 25° C., of 0.3 to 1.5 deciliters per gram (dl/g), specifically 0.45 to 1.0 dl/g. The polysiloxane copolymers may have a weight average molecular weight ($M_w$) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, the polysiloxane copolymer has flow properties described by the melt volume flow rate (often abbreviated MVR), which measures the rate of extrusion of a thermoplastic polymer through an orifice at a prescribed temperature and load. Polysiloxane copolymers suitable for use may have an MVR, measured at 300° C. under a load of 1.2 kg according to ASTM D1238-04, of 0.5 to 80 cubic centimeters per 10 minutes (cc/10 min). In a specific embodiment, an exemplary polycarbonate has an MVR measured at 300° C. under a load of 1.2 kg according to ASTM D1238-04, of 0.5 to 100 cc/10 min, specifically 1 to 75 cc/10 min, and more specifically 1 to 50 cc/10 min. Combinations of polycarbonates of different flow properties may be used to achieve the overall desired flow property.

In an embodiment, a molded test chip article having a thickness of 2.0±0.12 millimeters and consisting of the polysiloxane copolymer may have a light transmittance greater than or equal to 70%, specifically greater than or equal to 80% and more specifically greater than or equal to 85%, according to ASTM D1003-00. In another embodiment, the test chip article having a thickness of 2.0±0.12 millimeters and consisting of the polycarbonate can have a haze less than or equal to 10%, specifically less than or equal to 5%, and most specifically less than or equal to 3%, according to ASTM D1003-00.

The polysiloxane copolymer composition comprises a polyester unit, in addition to the optional recurring carbonate chain units of the formula (1). As disclosed herein, polyester units or polymers comprise repeating ester units of formula (8):

(8)

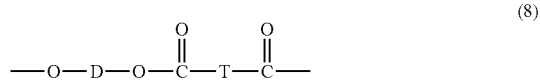

wherein D is a divalent group derived from a dihydroxy compound, and may be, for example, a $C_{6-20}$ alicyclic group or a $C_{6-20}$ aromatic group; and T is a divalent group derived from a dicarboxylic acid, and may be, for example, a $C_{6-20}$ alicyclic group, a $C_{6-20}$ alkylene-arylene group, or a $C_{6-20}$ arylene group. In a specific embodiment, T is a $C_{6-20}$ arylene group. In an embodiment, D is derived from a dihydroxy aromatic compound comprising formula (3), formula (4), formula (6), formula (7), or a combination comprising at least one of the foregoing dihydroxy aromatic compounds. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined number of moles of D and T groups are substituted with hydrocarbon-containing substituents such as alkyl, alkoxy, or alkylene substituents.

Examples of aromatic dicarboxylic acids from which the T group in the ester unit of formula (8) is derived include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

In an embodiment, the arylate ester units of the arylate-containing units are derived from the reaction product of one equivalent of an isophthalic acid derivative and/or terephthalic acid derivative. In such an embodiment, the arylate units are as illustrated in formula (9):

(9)

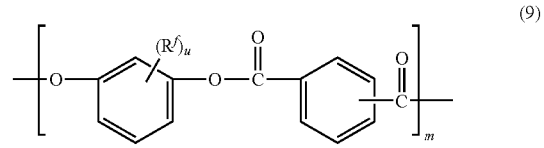

wherein $R^f$ and u are previously defined for formula (7), and m is greater than or equal to 4. In an embodiment, m is 4 to 50, specifically 5 to 30, more specifically 5 to 25, and still more specifically 10 to 20. Also in an embodiment, m is less than or equal to 100, specifically less than or equal to 90, more specifically less than or equal to 70, and still more specifically less than or equal to 50. It will be understood that the low and high endpoint values for m are independently combinable. In another embodiment, the molar ratio of isophthalate to terephthalate can be about 0.25:1 to about 4.0:1. In a specific embodiment, the arylate ester units consist of isophthalate-terephthalate ester units. In another embodiment, the arylate ester units are derived from the reaction product of one equivalent of an isophthalic acid derivative and/or a terephthalic acid derivative with a resorcinol of formula (7). Such arylate ester units correspond to formula (14) below wherein $R^1$ is derived from resorcinol.

Exemplary arylate ester units are aromatic polyester units such as isophthalate-terephthalate-resorcinol ester units, isophthalate-terephthalate-bisphenol ester units, or a combination comprising each of these. Specific arylate ester units include poly(isophthalate-terephthalate-resorcinol)esters, poly(isophthalate-terephthalate-bisphenol-A)esters, poly[(isophthalate-terephthalate-resorcinol)ester-co-(isophthalate-terephthalate-bisphenol-A)]ester, or a combination comprising at least one of these. In an embodiment, a useful arylate ester unit is a poly(isophthalate-terephthalate-resorcinol)ester. In an embodiment, the arylate ester unit comprises isophthalate-terephthalate-resorcinol ester units in an amount greater than or equal to 95 mol %, specifically greater than or equal to 99 mol %, and still more specifically greater than or equal to 99.5 mol % based on the total number of moles of ester units in the polyarylate unit. In another embodiment, the arylate ester units are not substituted with non-aromatic hydrocarbon-containing substituents such as, for example, alkyl, alkoxy, or alkylene substituents.

In one embodiment, polysiloxane copolymer compositions as disclosed herein are weatherable compositions comprising isophthalate-terephthalate-resorcinol ester units. It is known in the art that exposure of isophthalate-terephthalate esters such as (10) to ultraviolet radiation can cause a rapid, photochemically-induced rearrangement known as a Photo-Fries rearrangement, to form the 2-hydroxy benzophenone of formula (11) at the surface, which acts as an ultraviolet absorber and stabilizer for the underlying polymer. Compositions comprising resorcinol ester units thus also undergo only a slow Photo-Fries rearrangement below the surface of the composition, and so are both resistant to weathering and are suitable for use in the thermoplastic compositions disclosed herein.

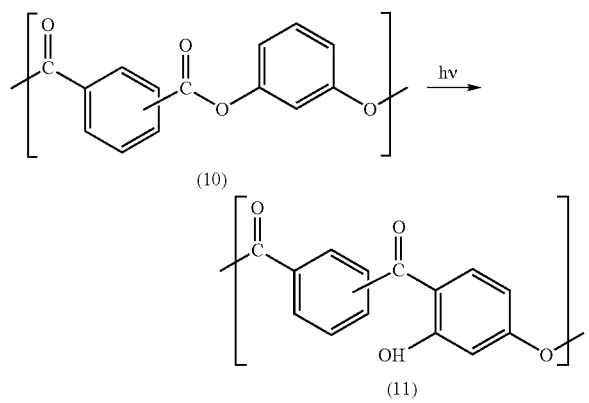

Other ester units, such as bisphenol-containing ester units of formula (12), also undergo Photo-Fries rearrangement to form the corresponding 2-hydroxy benzophenone having formula (13). Because of the electronic structure of these species, there is a greater absorption of light at a wavelength of about 400 nm. As a result, the transmitted or reflected light has an observable and undesirable more yellow color than other structures such as the structure represented by formula (11), measurable by yellowing index ("YI"). Thus, for weatherable applications, it is further desirable to minimize the number of bisphenol ester units present in such resins and articles derived therefrom.

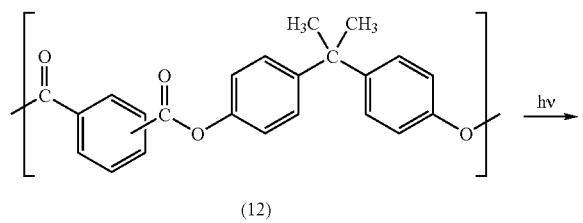

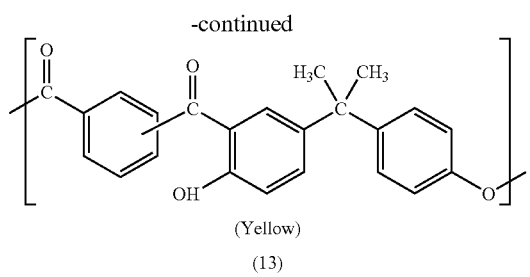

(Yellow)

(13)

In an embodiment, the arylate ester units are polyester-polycarbonate units having the structure shown in formula (14):

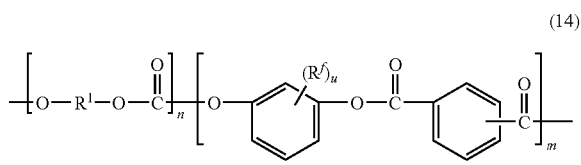

wherein $R^f$, u, and m are as defined in formula (9), each $R^1$ is independently a $C_{6-30}$ arylene group, and n is greater than or equal to one. In an embodiment, n is from 3 to 50, specifically from 5 to 25, and more specifically from 5 to 20. Also, in an embodiment, n is less than or equal to 50, specifically less than or equal to 25, and more specifically less than or equal to 20. It will be understood that the endpoint values for n are independently combinable. In an embodiment, m is from 5 to 75, specifically from 5 to 30, and more specifically from 10 to 25. In a specific embodiment, m is 5 to 75, and n is 3 to 50. In a specific embodiment, m is 10 to 25, and n is 5 to 20. In an embodiment, the polyester-polycarbonate unit is the reaction product of a combination of isophthalic and terephthalic diacids (or derivatives thereof) with a dihydroxy compound of formula (7), wherein the molar ratio of isophthalate units to terephthalate units is 99:1 to 1:99, specifically 95:5 to 5:95, more specifically 90:10 to 10:90, and still more specifically 80:20 to 20:80. In an embodiment, the molar ratio of the isophthalate-terephthalate ester units to the carbonate units in the polyester-polycarbonate can be 1:99 to 99:1, specifically 5:95 to 90:10, more specifically 10:90 to 80:20.

In a specific embodiment, the polyester polycarbonate unit comprises resorcinol carbonate units, derived from resorcinols of formula (7), and having formula (15):

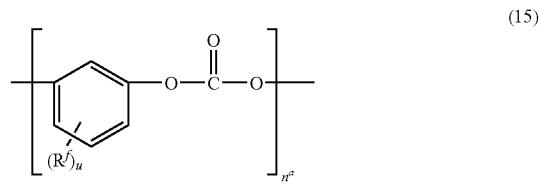

wherein $R^f$ and u are as described above, and $n^a$ is greater than or equal to 1. In another embodiment, a polyester-polycarbonate unit further comprises bisphenol carbonate units derived from bisphenols of formulas (4) and (6), having formula (16)

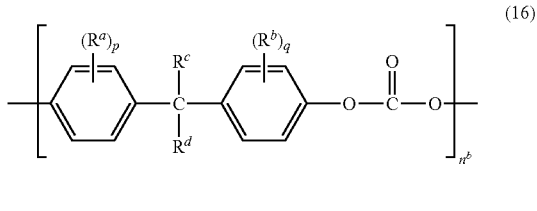

(16)

wherein $R^a$ and $R^b$ are each individually $C_{1-8}$ alkyl, $R^c$ and $R^d$ are individually $C_{1-8}$ alkyl or $C_{1-8}$ cycloalkylene, p and q are 0 to 4, and $n^b$ is greater than or equal to one. In another embodiment, the polyester-polycarbonate unit comprises resorcinol carbonate units of formula (15) and bisphenol carbonate units of formula (16), in a molar ratio of resorcinol carbonate units to bisphenol carbonate units of 1:99 to 100:0. In a specific embodiment, the polyester-polycarbonate units are derived from resorcinol (i.e., 1,3-dihydroxybenzene) or a combination comprising resorcinol and bisphenol-A. In a specific embodiment, the polyester-polycarbonate unit is a poly(isophthalate-terephthalate-resorcinol ester)-co-(resorcinol carbonate)-co-(bisphenol-A carbonate) polymer.

The polysiloxane copolymer composition desirably comprises a minimum amount of saturated hydrocarbon present in the form of substituents or structural groups such as bridging groups or other connective groups. In another embodiment, less than or equal to 25 mol %, specifically less than or equal to 15 mol %, and still more specifically less than or equal to 10 mol % of the combined arylate ester units and carbonate units comprise alkyl, alkoxy, or alkylene groups. In a specific embodiment, where the polysiloxane copolymer composition comprises carbonate units, less than or equal to 25 mol %, specifically less than or equal to 15 mol %, and still more specifically less than or equal to 10 mol % of the carbonate units comprising alkyl, alkoxy, or alkylene groups, based on the combined moles of arylate ester units and carbonate units. In another embodiment, the arylate ester units and the carbonate units are not substituted with non-aromatic hydrocarbon-containing substituents such as, for example, alkyl, alkoxy, or alkylene substituents.

In an embodiment, the arylate-containing units of the polysiloxane copolymer composition consist of 50 to 100 mole percent (mol %) of arylate ester units, specifically 58 to 90 mol % arylate ester units; 0 to 50 mol % aromatic carbonate units (e.g., resorcinol carbonate units, bisphenol carbonate units and other carbonate units such as aliphatic carbonate units); 0 to 30 mol % resorcinol carbonate units, specifically 5 to 20 mol % resorcinol carbonate units; and 0 to 35 mol % bisphenol carbonate units, specifically 5 to 35 mol % bisphenol carbonate units.

In an exemplary embodiment, the arylate-containing unit is a polyester-polycarbonate unit that may have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a crosslinked styrene-divinyl benzene column, at a sample concentration of 1 milligram per milliliter, and as calibrated with polycarbonate standards. Samples are eluted at a flow rate of about 1.0 ml/min with methylene chloride as the eluent.

The polysiloxane copolymer composition further comprises a polysiloxane (also referred to herein as "polydiorganosiloxane") unit, in addition to the arylate-containing units. Polysiloxane units comprise repeating siloxane units (also referred to herein as "diorganosiloxane units") of formula (17):

(17)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (17) may vary widely depending on the type and relative amount of each component in the thermoplastic composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 10.

In an embodiment, the polydiorganosiloxane units are provided by repeating structural units of formula (18):

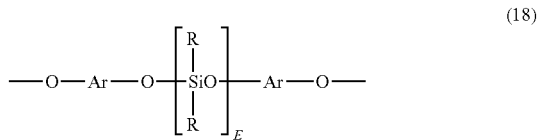

(18)

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (18) may be derived from a $C_{6-30}$ dihydroxy aromatic compound, for example a dihydroxy aromatic compound of formula (3), (4), (6), or (7) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl) propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

Units of formula (18) may be derived from the corresponding dihydroxy aromatic compound of formula (19):

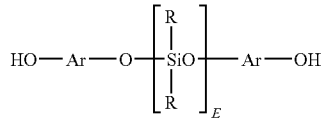
(19)

wherein R, Ar, and E are as described above. In a specific embodiment, where Ar is derived from resorcinol, the polysiloxane has formula (20):

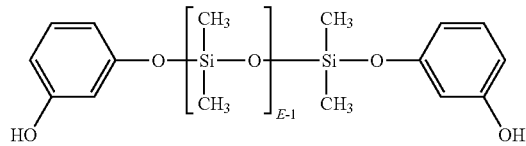
(20)

or, where Ar is derived from bisphenol-A, the polysiloxane has the formula (21)

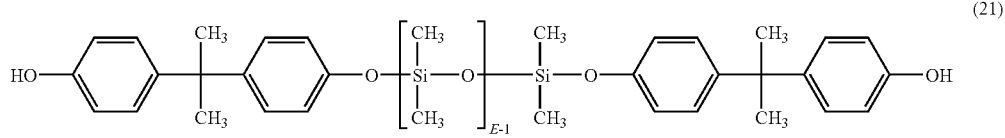
(21)

where E for formulas (20) and (21) are as defined for formula (17), above.

In another embodiment, polydiorganosiloxane units are units of formula (22):

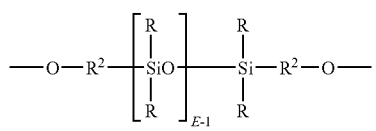
(22)

wherein R and E are as described for formula (17), and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are of formula (23):

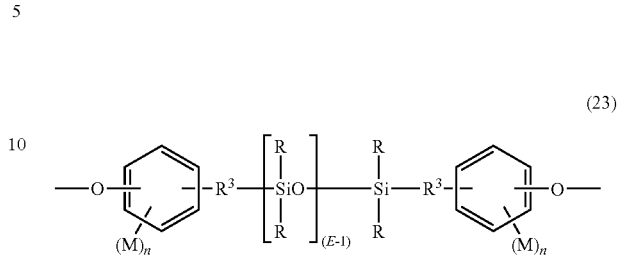
(23)

wherein R and E are as defined for formula (17). Each $R^3$ in formula (23) is independently a divalent $C_{2-8}$ aliphatic group. Each M in formula (23) may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

Units of formula (23) may be derived from the corresponding dihydroxy polydiorganosiloxanes (24):

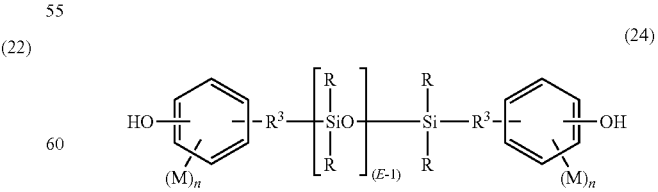
(24)

wherein R, E, M, $R^3$, and n are as described for formula (23).

In a specific embodiment, the dihydroxy oligodiorganosiloxane has the structure given in formula (25):

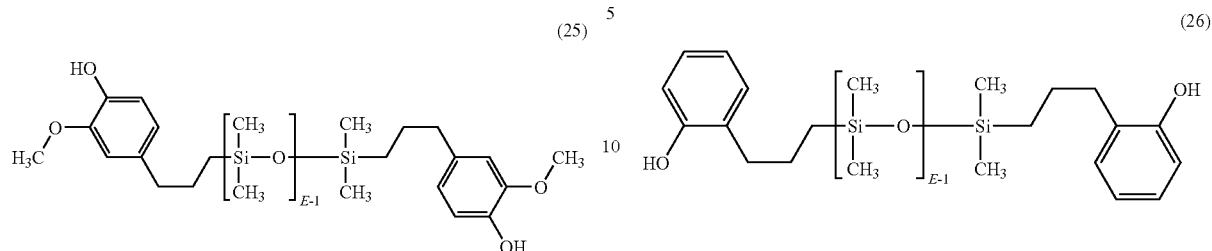

where E is as described for formula (17), above.

In another specific embodiment, the polydiorganosiloxane units are derived from dihydroxy oligodiorganosiloxanes of formula (26):

where E is as defined for formula (17), above.

In a specific embodiment, a hydroxyaromatic end-capped polysiloxane of general formula (21) (where Ar is derived from bisphenol-A) forms an ester-linked structure with a carboxylic acid derivative during formation of the polysiloxane copolymer composition, which has the structure of formula (27):

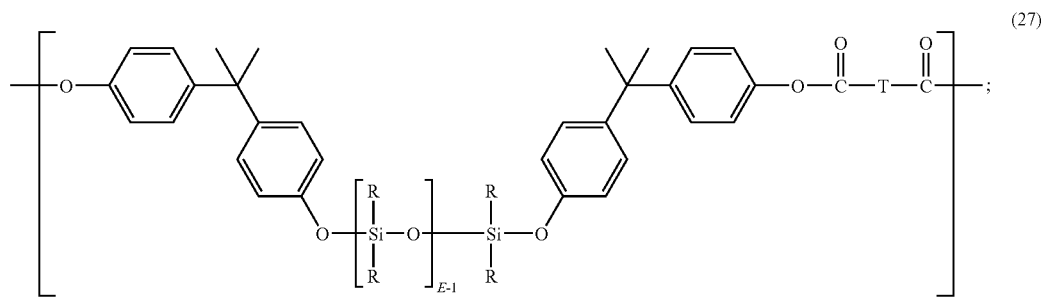

or, where a hydroxyaromatic end-capped polysiloxane of formula (21) (derived from a bisphenol) is copolymerized with a carbonate precursor or haloformate, a carbonate linked structure is formed in the polysiloxane copolymer composition, having the structure of formula (28):

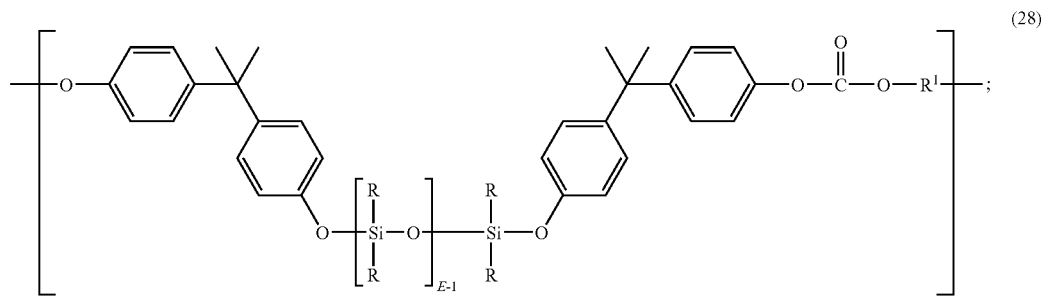

or a combination comprising the foregoing polysiloxanes, wherein for both formulas (27) and (28), R and E are as described for formula (17), above; T in formula (27) is a $C_{6-30}$ arylene group; and $R^1$ in formula (28) is a $C_{6-30}$ arylene group. In an embodiment, T is derived from the reaction product of a reactive derivative of isophthalic and/or terephthalic acid. In an embodiment, $R^1$ is derived from the carbonate reaction product of a resorcinol of formula (7), or a combination of a resorcinol of formula (7) and a bisphenol of formula (4).

In another specific embodiment, a hydroxyaromatic end-capped polysiloxane of general formula (19) (where Ar is derived from resorcinol) forms an ester-linked structure with a carboxylic acid derivative during formation of the polysiloxane copolymer composition, which has the structure of formula (29):

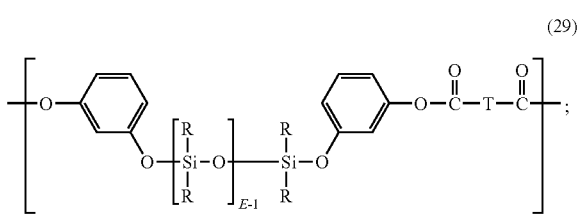

(29)

or, where a hydroxyaromatic end-capped polysiloxane of formula (20) (derived from a resorcinol) is copolymerized with a carbonate precursor or haloformate, a carbonate linked structure is formed in the polysiloxane copolymer composition, having the structure of formula (30):

wherein for both formulas (29) and (30), R and E are as described for formula (17), above; T in formula (29) is a $C_{6-30}$ arylene group; and $R^1$ in Formula (30) is a $C_{6-30}$ arylene group. In an embodiment, T is derived from the reaction product of a reactive derivative of isophthalic and/or terephthalic acid. In an embodiment, $R^1$ is derived from the carbonate reaction product of a resorcinol of formula (7), or a combination of a resorcinol of formula (7) and a bisphenol of formula (4).

In another specific embodiment, a hydroxyaromatic end-capped polysiloxane of general formula (23) where $R^3$ is trimethylene can form an ester-linked structure with a carboxylic acid derivative during formation of the polysiloxane copolymer composition, which has the structure of formula (31):

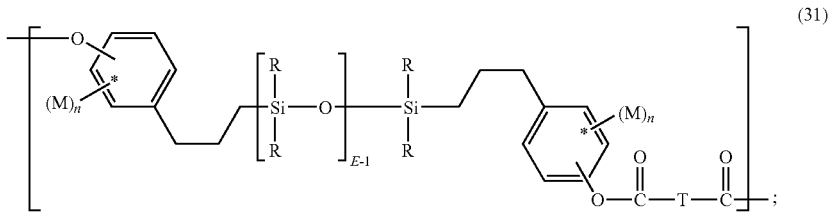

(31)

or, where a hydroxyaromatic end-capped polysiloxane of formula (23) (where $R^3$ is trimethylene) is copolymerized with a carbonate precursor or haloformate, a carbonate linked structure is formed in the polysiloxane copolymer composition, having the structure of formula (32):

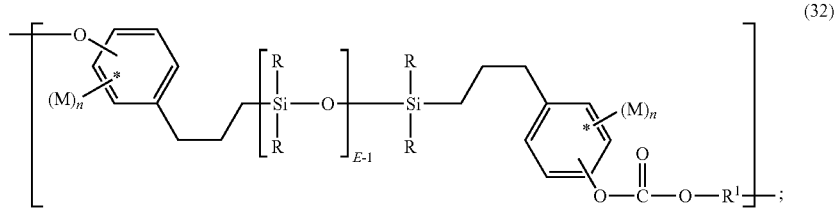

(32)

or a combination comprising these polysiloxanes, wherein for both formulas (31) and (32), R and E are as described for formula (17), and M and n are as described for formula (23), above; T in formula (31) is a $C_{6-30}$ arylene group; and $R^1$ in Formula (32) is a $C_{6-30}$ arylene group. In an embodiment, T is derived from the reaction product of a reactive derivative of isophthalic and/or terephthalic acid. As in formula (23), the arylene portions of formulas (31) and (32) each have connectivity to both of: an oxygen atom, which provides connectivity to the adjacent arylate ester units and/or aromatic carbonate units and is derived from a hydroxy group; and the alkylene portion of the polysiloxane end group which further

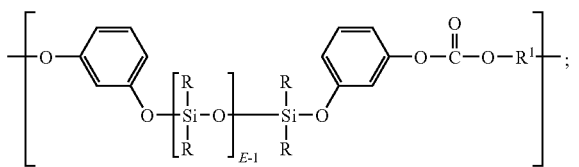

(30)

has connectivity to both the terminal silicon atom of the polysiloxane portion, and the arylene portion of the polysiloxane unit. In an embodiment, the oxygen atom and the alkylene group connecting the arylene portion to the terminal silicon atom of the polysiloxane unit may be disposed ortho, meta, or para to each other on the arylene portions of formulas (31) or (32). In an embodiment, $R^1$ is derived from the carbonate reaction product of a resorcinol of formula (7), or a combination of a resorcinol of formula (7) and a bisphenol of formula (4).

Dihydroxy polysiloxanes typically can be made by functionalizing a substituted siloxane oligomer of formula (33):

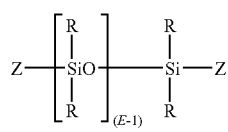

wherein R and E are as previously defined, and Z is H, halogen (Cl, Br, I), or carboxylate. Exemplary carboxylates include acetate, formate, benzoate, and the like. In an exemplary embodiment, where Z is H, compounds of formula (33) may be prepared by platinum catalyzed addition with an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (3), (4), (6), (7), or a combination comprising at least one of the foregoing dihydroxy aromatic compounds. In an exemplary embodiment, compounds of formula (19) may be formed from an alpha,omega-bisacetoxypolydiorangonosiloxane and a dihydroxy aromatic compound under phase transfer conditions.

In an embodiment, the polysiloxane copolymer composition comprises siloxane units in an amount of 0.5 to 20 mol %, specifically 1 to 10 mol % siloxane units, based on the combined mole percentages of siloxane units, arylate ester units, and carbonate units, and provided that siloxane units are provided by polysiloxane units covalently bonded in the polymer backbone of the polysiloxane copolymer composition.

The polysiloxane copolymer composition comprises siloxane units in an amount of 0.1 to 25 weight percent (wt %). In an embodiment, the polysiloxane copolymer composition comprises siloxane units in an amount of 0.2 to 10 wt %, specifically 0.2 to 6 wt %, more specifically 0.2 to 5 wt %, and still more specifically 0.25 to 2 wt %, based on the total weight of the polysiloxane copolymer composition, with the proviso that the siloxane units are provided by polysiloxane units covalently bonded in the polymer backbone of the polysiloxane copolymer composition.

The polysiloxane copolymer composition can further comprise carbonate units of formula (1). In an embodiment, the polysiloxane copolymer composition comprises 0.2 to 6 wt % polysiloxane units, 50 to 99.8 wt % ester units, and 0 to 49.85 wt % carbonate units, wherein the combined weight percentages of the polysiloxane units, ester units, and carbonate units is 100 wt % of the total weight of the polysiloxane copolymer composition. In another embodiment, the polysiloxane copolymer composition comprises 0.25 to 2 wt % polysiloxane units, 60 to 94.75 wt % ester units, and 3.25 to 39.75 wt % carbonate units, wherein the combined weight percentages of the polysiloxane units, ester units, and carbonate units is 100 wt % of the total weight of the polysiloxane copolymer composition.

In an embodiment, a polysiloxane copolymer composition described above has a $T_g$ of less than or equal to 165° C., specifically less than or equal to 160° C., and more specifically less than or equal to 155° C. Similarly, in an embodiment, a polysiloxane copolymer composition described above has a $T_g$ for the polycarbonate unit of greater than or equal to 115° C., specifically greater than or equal to 120° C.

The polysiloxane copolymers described herein can be manufactured by different methods such as, for example, solution polymerization, interfacial polymerization, and melt polymerization. Of these, a specifically useful method is interfacial polymerization. Although the reaction conditions for interfacial polymerization can vary, a process generally involves dissolving or dispersing a dihydric phenol reactant in aqueous caustic soda or potash, or alternatively suspending or dissolving a dihydric phenol reactant in water adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11.5. The most commonly used water immiscible solvents include methylene chloride, 1,2-dichloroethane, chlorobenzene, toluene, and the like. Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

A chain stopper (also referred to as a capping agent or end cap) may be included during polymerization. The chain-stopper limits molecular weight growth rate, and so controls molecular weight in the copolymer. A chain-stopper may be at least one of mono-phenolic compounds, mono-carboxylic acid chlorides, and/or mono-chloroformates. Where a chain stopper is incorporated with the copolymer, the chain stopper may also be referred to as an end group.

For example, mono-phenolic compounds useful as chain stoppers include monocyclic phenols, such as phenol, $C_1$-$C_{22}$ alkyl-substituted phenols, p-cumyl-phenol, p-tertiary-butyl phenol, hydroxyphenyl phenyl ether, phenylphenol; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be useful as chain stoppers. These include monocyclic, mono-carboxylic acid chlorides such as benzoyl chloride, $C_1$-$C_{22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and combinations thereof, polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also useful are mono-chloroformates including monocyclic, mono-chloroformates, such as phenyl chloroformate, alkyl-substituted phenyl chloroformate, p-cumyl phenyl chloroformate, toluene chloroformate, t-butyl-phenyl chloroformate, and combinations thereof.

Arylate-containing units having branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and combinations of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl) phenol), 4-chloroformyl phthalic anhydride, trimesic acid, and benzophenone tetracarboxylic acid. The branching agents may be added at a level of 0.05 to 2.0 wt % of the polycarbonate. All types of polycarbonate end groups are contemplated as being useful in the polycarbonate, provided that such end groups do not significantly affect desired properties of the thermoplastic compositions.

Among the phase transfer catalysts that may be used in interfacial polymerization are catalysts of the formula $(R)_4Q^+X$, wherein each R is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is a halide (such as $F^-$, $Cl^-$, $Br^-$, or $I^-$), a $C_{1-8}$ alkoxy group, a $C_{6-18}$ aryloxy group, hydroxide, or a $C_{1-20}$ carboxylate. In an embodiment, a specifically useful phase transfer catalyst is $CH_3[CH_3(CH_2)_3]_3NCl$ (methyl tri-n-butyl ammonium chloride). An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of dihydroxy aromatic compound in the phosgenation mixture.

The copolymers described herein may also be prepared by interfacial polymerization. Typically, a reactive derivative of the desired aromatic or aliphatic dicarboxylic acid is used. In an embodiment, the dicarboxylic acid dihalide is used, in particular dicarboxylic acid dichlorides, which are condensed under interfacial polymerization conditions as described above (biphasic solvent, pH of 4 to 11, and addition of base to maintain a desired pH) with dihydroxy aromatic compounds in a pre-carbonate condensation to form the polyester units. In an exemplary embodiment, instead of using isophthalic acid, terephthalic acid, or combinations thereof, it is desirable to use isophthaloyl dichloride, terephthaloyl dichloride, and combinations thereof in the preparation of polyesters having arylate ester units. After interfacial polymerization to condense the dicarboxylic acid derivative and dihydroxy aromatic compound, sometimes referred to as polyester oligomerization, the resulting polyester polymer or oligomer is co-condensed with a dihydroxy aromatic compound under interfacial polycarbonate reaction conditions to form the polyester-polycarbonate. In an exemplary embodiment, a dihydroxy aromatic compound of formula (3), (4), (6), or (7) is used in either or both of the polyester oligomerization or the interfacial polycarbonate reaction.

Alternatively, melt processes may be used to make the polysiloxane copolymers described herein. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making aromatic carbonate units uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing. In addition, exemplary transesterification catalysts may include phase transfer catalysts of formula $(R)_4Q^+X$, wherein each R, Q, and X are as defined above. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

It will be understood that all traditional ways of making polyester, polycarbonate, and polyester-polycarbonate in solution are useful for preparing the polysiloxane copolymer composition polymers. In an embodiment, the polysiloxane copolymer composition is prepared by interfacial polymerization. Generally, the polysiloxane copolymer compositions are provided by the reaction of a diacid derivative, a difunctional polysiloxane polymer, a dihydroxy aromatic compound, and where desired, a carbonyl source, in a biphasic medium comprising an immiscible organic phase and aqueous phase. In an embodiment, the arylate unit is formed by reacting a dihydroxy aromatic compound and a dicarboxylic acid dichloride in a biphasic medium in the presence of a base. The order and timing of addition of these components to the polymerization reaction may be varied to provide a polysiloxane copolymer composition having different distributions of the polysiloxanes in the polymer backbone. The polysiloxane may be distributed with the ester units in the polyester units, the carbonate units in the polycarbonate units, or with the ester and carbonate units in both the polyester and polycarbonate units.

In an embodiment, an exemplary method for forming a polysiloxane copolymer composition comprises combining the hydroxy end-capped polysiloxane, a diacid derivative, a dihydroxy aromatic compound, a base, and a solvent, in a medium. Exemplary bases include, for example, triethylamine, sodium hydroxide, sodium carbonate, sodium bicarbonate, sodium acetate, sodium gluconate, sodium citrate, sodium tartrate, and the like, or a combination comprising at least one of the foregoing. The medium can be maintained at a suitable pH while combining and reacting, and is biphasic, having a solvent phase and an aqueous phase. In an embodiment, the pH is of 4 to 11.5 more specifically 4 to 8.5. The pH may be adjusted by addition of a suitable base, for example sodium hydroxide as a concentrated solution in water, as needed during the reaction. In an embodiment, the diacid derivative compound is 1,4-terephthaloyl dichloride, 1,3-isophthaloyl dichloride, or a mixture of these acid chlorides. After the polysiloxane copolymer composition is formed, then the mixture may be charged with an additional dihydroxy aromatic compound, a carbonyl compound, additional solvent, chain stopper, and base to maintain the pH of the reaction from 8.5 to 11. In an embodiment, the carbonyl compound is phosgene. In other embodiment, the method of preparing the polysiloxane copolymer compositions herein, a chain stopper is included.

In another embodiment, the dihydroxy aromatic compound and/or the hydroxy end-capped polysiloxane may be pre-reacted with the carbonyl compound, prior to condensing to form the polysiloxane copolymer composition. In an embodiment, pre-reacting may be done using phosgene to form a mono- or bis haloformate of the polysiloxane polymer. Pre-reacting may be done with isolating of the pre-reacted intermediate, or in situ wherein pre-reacting is done prior to addition of other components and prior to starting the polyarylate oligomerization and/or polycarbonate formation.

In an embodiment, where a polyester-polycarbonate arylate-containing unit is desired, the polyester unit is formed separately from the polycarbonate unit. The polyester unit is derived from a polyester polymer or oligomer, comprising a hydroxy end-capped polyester, that is subsequently copolymerized with a carbonyl source and dihydroxy aromatic compounds including, for example, bisphenols of formulas (3), (4), and (6), and resorcinols of formula (7) to form the polycarbonate unit. In an embodiment, the hydroxy end-capped polyarylate oligomer is prepared using resorcinol, wherein the resorcinol-OH moiety comprises the oligomer end groups. The optical properties of the polysiloxane copolymer composition may be affected by a combination of the method of polymerization and the number of repeating siloxane units present in the end-group functionalized polysiloxane. Polysiloxanes with less than or equal to about 15 siloxane repeat units provide low haze with all polyester and/or polycarbonate and/or polyester-polycarbonate polymerization methods disclosed herein. Generally, polymerization methods which provide more uniform spacing between the siloxane units (such as by converting them to the corresponding chloroformates and reacting them with hydroxyl terminated polyarylate units) can allow for the production of lower haze polymers (i.e., polysiloxane copolymer compositions which are capable of being molded to form a test chip article of 2 mm thickness having a haze of less than or equal to 5%, according to ASTM D1003-00). In this way, polysiloxanes with greater than 20 siloxane units but less than or equal to 50 siloxane units can also provide low haze values for articles molded therefrom.

Another polymerization method for generating lower haze polymers by more uniformly spacing the polysiloxane units is by first preparing chloroformate terminated polyester oligomers and optionally chloroformate terminated dihydroxyaromatic compounds (and oligomers thereof) using a phase transfer catalyst and substantially no tertiary amine catalysts. Secondly the di-hydroxy-terminated polysiloxane is condensed with the chloroformate terminated polyester oligomers and optionally chloroformate terminated dihydroxyaromatic compounds. The condensation step can be catalyzed using phase transfer agents and or tertiary amines. In some cases, it is advantageous to phosgenate the mixture after the condensation step to ensure all the phenol end groups are substantially incorporated. Chain terminators can be incorporated in the polyester oligomers, in the chloroformate terminated dihydroxyaromatic compounds or with the di-hydroxy-terminated polysiloxane.

In an embodiment, the dihydroxy aromatic compound comprises a resorcinol, a bisphenol, or a combination of these. In an embodiment, where both a resorcinol and a bisphenol are used, the resorcinol is combined with the reactants such that the number of resorcinol-ester linkages in the resulting polymer is maximized relative to the number of bisphenol-ester linkages. In a more specific embodiment, the polysiloxane unit may be pre-reacted with some or all of the dicarboxylic acid derivative with a suitable base and optionally a catalyst prior to the co-reaction of the dicarboxylic acid derivative and the resorcinol.

In an embodiment, the polysiloxane copolymer composition comprises end group functionalized polysiloxane units and is randomly copolymerized with the dicarboxylic acid derivative and dihydroxy aromatic compound (e.g., a resorcinol). Random polymerization is achieved where the polymer feed initially includes both the unreacted polysiloxane and dihydroxy aromatic compound in the presence of the dicarboxylic acid derivative. The polysiloxane and dihydroxy aromatic compound each react with the dicarboxylic acid derivative to form ester linkages. Where there is a disparity in the relative reactivity of the dihydroxy aromatic compound and the end group functionalized polysiloxane, the distribution of the polysiloxanes in the polyester backbone may be less randomly distributed, with the lower reactivity group (e.g., the eugenol end-capped polysiloxane) enriched in the polymer chains that form late in the polymerization. In this way, an oligomer comprising the reaction product of the polysiloxane, the dicarboxylic acid derivative, any unreacted siloxane and the dihydroxy aromatic compound is formed. In an embodiment, after formation of the oligomer, a second dihydroxy compound (such as a resorcinol and/or bisphenol) can be added to the oligomer and polymerized by the addition of a carbonyl source. In a specific embodiment, the carbonyl source is phosgene. In an embodiment, where the end group functionalized polysiloxane has less than or equal to 15 siloxane units, a polysiloxane copolymer composition prepared according to this method has low haze, meaning that it can be used to form a test chip having less than 5% haze as described above.

In another embodiment, the end group functionalized polysiloxane is added to the monomer feed comprising the dicarboxylic acid derivative after the dihydroxy aromatic compound is added. In this way, a portion of the end-group functionalized polysiloxane reacts to form ester linkages, while the remaining portion of end-group functionalized polysiloxane remains unreacted in the initial esterification reaction to form the oligomer. To the reaction mixture comprising this partially un-reacted functionalized polysiloxanes, a second dihydroxy compound (such as a resorcinol and/or bisphenol) can be added to the oligomer and polymerized by the addition of a carbonyl source. In a specific embodiment, the carbonyl source is phosgene. In this way, the polysiloxane copolymer composition can have polysiloxane units distributed through the polyarylate unit and polycarbonate unit. In an embodiment, where the end group functionalized polysiloxane has less than or equal to 20 siloxane units, a polysiloxane copolymer composition prepared according to this method has low haze.

In another embodiment, the end-group functionalized polysiloxane can be allowed to react with an excess of dicarboxylic acid derivative prior to addition of the dihydroxy aromatic compound. It has been observed that the eugenol hydroxy end-group functionalized polysiloxanes react more slowly than dihydroxy aromatic compounds, such as bisphenols and/or resorcinols. By allowing the polysiloxane to react prior to addition of the dihydroxy aromatic compound, a more uniformly spaced distribution of polysiloxane units and ester units in the polysiloxane copolymer composition structure can be achieved. In an embodiment, a hydroxy end-capped polysiloxane and approximately one mole of amine catalyst/base per functional hydroxyl end group are reacted with an excess of dicarboxylic acid derivative prior to the addition of a resorcinol. Alternatively, the end-group functionalized polysiloxane (and approximately two moles of an amine catalyst) can be pre-reacted with all or part of the dicarboxylic acid derivative to form an oligomer. In an exemplary embodiment, the amine catalyst comprises triethylamine, tripropyl amine, tributylamine, diisopropylethylamine, dimethylaminopyridine, 4-pyrrolidinopyridine, or a combination comprising at least one of the foregoing amines. In another embodiment, the dicarboxylic acid derivative and end-group functionalized polysiloxane can be reactively mixed in an appropriate pre-reactor such as, for example, a tubular reactor, to form a pre-condensed reaction product that is subsequently charged to the polymerization reactor along with the resorcinol. In an embodiment, after formation of the oligomer, a second dihydroxy compound (such as a resorcinol and/or bisphenol) can be added to the oligomer and co-polymerized by the addition of a carbonyl source. In a specific embodiment, the carbonyl source is phosgene. In an embodiment, where the end group functionalized polysiloxane has less than or equal to 50 siloxane units, a polysiloxane copolymer composition prepared according to this method may have low haze. In another embodiment, where the end group functionalized polysiloxane has less than or equal to 15 siloxane units, a polysiloxane copolymer composition prepared according to this method has low haze.

In an embodiment, the polysiloxane copolymer composition is prepared using the above-described random or pre-reaction methods, and comprises only polysiloxane units and polyester units and does not include carbonate units. In an embodiment, where the end group functionalized polysiloxane has less than or equal to 15 siloxane units, a polysiloxane copolymer composition prepared according to either of these methods has low haze.

Alternatively, it may be desirable to distribute the polysiloxane units in the polycarbonate units, and thereby exclude the formation of polysiloxane-ester linkages. In an embodiment, oligomerization to form the polyester unit is completed in the absence of the end-group functionalized polysiloxane, and the end group functionalized polysiloxane is charged to the reaction concomitantly with a dihydroxy aromatic compound, followed by addition of a carbonyl source. In an embodiment, the end-group functionalized polysiloxane is a hydroxy end-capped polysiloxane. In another embodiment, the hydroxy end-capped polysiloxane is added prior to the dihydroxy aromatic compound, and is reacted with a portion of the charge of the carbonyl source. Some of the hydroxy end-capped polysiloxanes (e.g., those derived from eugenol) as discussed herein, can have lower reactivity than dihydroxy aromatic compounds such as resorcinol and/or bisphenols, and hence may provide a distribution of polysiloxane which is more enriched in the polymer segments formed late in the reaction. In another embodiment, the dihydroxy aromatic compound and carbonyl source are added in portions to the polymerization after addition of the hydroxy end-capped polysiloxane. In an embodiment, where the end group functionalized polysiloxane has less than or equal to 15 siloxane units, a polysiloxane copolymer composition prepared according to this method has low haze.

In another embodiment, wherein it is desirable to distribute the polysiloxane units randomly with carbonate units in the polycarbonate unit, the dihydroxy aromatic compound and/or hydroxy end-capped polysiloxane is converted to its corresponding bis-chloroformate prior to condensation to form the carbonate linking groups of the polycarbonate. In this process, the polyarylate oligomer is initially prepared in a biphasic medium using a phase transfer catalyst, without an amine or condensation catalyst present. In an embodiment, the polyarylate oligomer is prepared using a resorcinol, where the resorcinol comprises the oligomer end groups. The polyarylate oligomer and excess resorcinol are generally phosgenated at pH of 2 to 11. In an embodiment, the polyarylate oligomer is phosgenated at pH of 4 to 10, specifically 5 to 8 to provide chloroformate end groups, and are subsequently reacted with the hydroxy end-capped polysiloxane at a pH of about 8.5 to about 11, for a sufficient time, e.g., less than or equal to 20 min. A further charge of dihydroxy aromatic compound, such as a resorcinol and/or bisphenol, and additional charge of carbonyl source (e.g., phosgene) can be made. Molecular weight of the polymer may be increased in the reaction by addition of a condensation catalyst such as, for example, a tertiary amine. Optionally, additional phosgene may be added to ensure that substantially all of the phenolic end groups are incorporated. In another embodiment, oligomerization to prepare the hydroxy end-capped polyarylate is performed using a phase transfer catalyst, and the hydroxy end-capped polysiloxane is added. In an exemplary embodiment, a useful phase transfer catalyst has the formula $(R)_4Q^-X$, wherein R, Q, and X are as defined above. The combination is phosgenated to convert the phenolic hydroxy end groups to chloroformate groups, at a pH or 2 to 11, specifically at a pH of 4 to 10, and more specifically at a pH of 4 to 7. A second dihydroxy aromatic compound, such as a resorcinol and/or bisphenol, is added to the combination of chloroformates and condensed at a pH of 7.7 to 11.5, specifically at a pH of 8 to 9, and the chloroformates and dihydroxy aromatic compound are reacted with additional phosgene and tertiary amine. Additional phosgene may be added if required to complete the polymerization.

In another embodiment, the polysiloxane copolymer composition may be prepared using a hydroxy end-capped polysiloxane that has first been converted to its corresponding bis-chloroformate. Bis-chloroformates of hydroxy end-capped polysiloxanes can be made in according to U.S. Pat. No. 6,723,864 to Silva et. al., incorporated herein by reference. This method involves passing the dihydroxy aromatic compound and a carbonyl source, specifically phosgene, and a base such as sodium hydroxide in aqueous solution, simultaneously through a cooled tube reactor to form the bis-chloroformate of the dihydroxy aromatic compound in a continuous process. An advantage to this process is that the bis-chloroformates are formed in high yield, minimizing the formation of mono-chloroformate intermediates that may lead to unbalanced reactivity for the chloroformate end and the hydroxy end of the polysiloxane.

In an embodiment, where a chloroformate method is used and the end group functionalized polysiloxane has less than or equal to 50 siloxane units, a polysiloxane copolymer composition prepared according to this method may have low haze. In another embodiment, where a pre-reaction of the end group functionalized polysiloxane is performed with the dicarboxylic acid derivative, a polysiloxane copolymer composition prepared according to this method may have low haze. In another embodiment, where the end group functionalized polysiloxane has less than or equal to 15 siloxane units, a polysiloxane copolymer composition prepared according to this method has low haze.

The resulting polysiloxane copolymer composition may be isolated by precipitation from the organic phase by addition to a non-solvent. In an embodiment, the organic phase is methylene chloride, and the non-solvent is methanol. In another embodiment, the organic phase is methylene chloride and the solvent is removed by steam precipitation. In another embodiment, where the organic phase is methylene chloride the solvent is removed by adding the organic phase to hot water. In another embodiment, where the organic phase is methylene chloride, the solvent is removing the solvent in a process referred to as "gel crush", in which resin powder is produced by feeding the solution continuously while heating, mixing and kneading the solution. The kneading is accomplished by producing a limited back and forth (or "to and fro" movement of the polycarbonate solution with the aid of a set of spiral blades mounted on rotating shafts in an elongated barrel. This "gel crush" process is further described in U.S. Pat. No. 4,074,864 to Narita et al., incorporated herein by reference. In another embodiment, where the organic phase contains chlorobenzene, the solvent is removed in a wiped film evaporator, depolarization extruder, or a combination of these processes. Proportions, types, and amounts of the reaction ingredients may be selected by one skilled in the art to provide polysiloxane copolymer compositions having specific desirable physical properties including but not limited to, for example, heat release rate, smoke test, toxicity, haze, transparency, molecular weight, polydispersity, glass transition temperature, impact properties, ductility, melt flow rate, and weatherability.

Thermoplastic materials prepared from the polysiloxane copolymer composition may be used as materials of construction for components used in a confined or sealed area, such as, for example, the interior of an aircraft. For such applications, various flame retardant properties are of high importance. In the airline transportation industry, useful flame retardant properties, in particular the heat release rate, of thermoplastic materials is typically measured and regulated according to Federal Aviation Regulations (FARs), in particular FAR/JAR 25.853 (d). The heat release rate standard described in FAR F25.4 (FAR Section 25, Appendix F, Part IV) is one such specified property, and thermoplastic materials conforming to this standard are required to have a 2 minute integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In some more stringent applications where a greater heat release rate performance is called for, a 2 minute integrated heat release rate of less than or equal to 55 kW-min/m$^2$ and a peak heat release rate of less than 55 kW/m$^2$ (abbreviated as OSU 55/55) may be required. In addition, for many applications, the thermoplastic materials need to have a smoke density ($D_s$) as described in FAR F25.5 (FAR Section 25, Appendix F, Part V) of less than 200, measured after 4 minutes in either flame or non-flame scenario, according to ASTM F814-83.

Use of high levels of added brominated or chlorinated (i.e., halogenated) flame retardant compounds may impose conflicting demands on the properties of the thermoplastics and result in compromised properties such as leaching properties, mechanical properties, optical properties, thermal flow properties, or smoke toxicity (due to the presence of HCl or HBr). However, use of halogenated flame retardants in amounts sufficient to provide the desired flame retardant properties such as heat release rate performance, but low enough to provide other properties within acceptable limits, such as smoke toxicity, may be used. Thermoplastics such as, for example, polyimides, polysiloxane-polyimides, polysulfones, acrylics, polyvinylchlorides (PVC), and alloys of these, can have the desired heat release rate performance properties, and smoke density as described in FAR F25.5 (FAR Section 25, Appendix F, Part V). However, such materials may have other properties that are undesirable in the manufacture of specific articles for use in, for example, aircraft interiors. For example, it has been observed that polysulfones, such as RADEL® A polyphenylsulfone from Solvay Specialty Polymers, and polyimides such as ULTEM® blends from GE Plastics, may have inadequate thermoformability for sheet applications and/or inadequate melt flow for injection molding applications, and/or limited ductility. Blends or alloys of PVC, including acrylic/PVC blends such as Kydex® sheets from Kleerdex Company, may have undesirably high toxic emissions of halogenated chemical by-products (e.g., HCl) upon combustion.

Further, thermoplastics such as polyimides, polysulfones, acrylics, polyvinylchlorides, and alloys of these, do not have both the heat release rate properties and the desired optical properties that would impart usefulness for transparent or high-gloss applications, such as windows and panel gauge lenses.

It has been found that addition of polysiloxane units to polyester-polycarbonate compositions can increase the heat release rate performance of the resulting polysiloxane copolymer composition, where increasing amounts of polysiloxane-polycarbonate can provide increased heat release rate performance. However, the use of amounts of polysiloxane at concentrations of greater than 6 wt % of the total weight of the polysiloxane can lead to undesirable haze levels and/or a deterioration of the heat release rate performance.

In addition, it has been found that the size of the polysiloxane units may affect the haze and/or transparency of the polysiloxane copolymer composition. Units of a compositionally distinct composition in a copolymer, such as for example polysiloxane units in polycarbonate, polyester, or a combination, may order to form a large discrete phase in which the more ordered unit phase-separates from the surrounding thermoplastic matrix. These large, phase-separated domains can occur when either large units of polysiloxane (i.e., greater than 15 siloxane units), polyarylate units of greater than 30 arylate ester units, and/or polycarbonate units, are non-uniformly dispersed in the polymer chain. The units may thus form phase-separated regions (sometimes referred to herein as "domains"). A domain may be defined as a region within a surrounding matrix, having a discrete and observable boundary separating it from the surrounding matrix. The presence of specific domains of immiscible, phase-separated regions may be observed by appropriate analytical methods such as transmission electron microscopy (TEM). These phase-separated regions can vary greatly in size, but may typically have a long dimension of 20 to 200 nanometers or longer in contiguous length, with the length coincident with the direction of flow of the thermoplastic composition during extrusion or injection molding. It is believed that the presence of these phase-separated regions in the copolymer can scatter incident light. Increasing the size of the phase-separated regions, increasing the numbers of phase-separated regions, and increasing the intra-chain concentration of the phase-separating units, are each individually believed to correlate to increased scatter of incident light. The bulk properties of domain formation may therefore be observed using haze and/or light transmission measurements. Thus, absent a mechanism to prevent, reduce, mitigate, or eliminate the formation of these phase-separated regions, such domains may be observed to form where combinations of dissimilar, immiscible polymer units are used. Mechanisms for controlling the formation of domains include limiting unit size, limiting the concentration of units in the copolymer, and increasing the randomness and uniform spacing of the units distributed in the polycarbonate. Thus, smaller phase-separated regions and decreased numbers of phase-separated regions may decrease the amount of scattered incident light, and thereby decrease the measurable haze of the combination, and where desired, provide an increase in the light transmission.

It has further been found that increasing the unit length, while maintaining the total weight of the polysiloxane as a percentage of the weight of the polysiloxane copolymer composition, results in decreased heat release rate performance in the OSU test. Increasing the polysiloxane unit length to a value greater than 15 results in lower heat release rate performance for compositions comprising polysiloxanes of different unit lengths, but having a constant total polysiloxane loading. The highest heat release rate performance is obtained with short polysiloxane unit lengths (less than or equal to 15 repeating units) at a given total loading of polysiloxane unit (as a weight percentage of the polysiloxane-polycarbonate). In this way, the distribution of higher numbers of short polysiloxane through the polymer matrix provides greater flame retrace and optimum transparency. The best ductility is obtained by using the largest siloxane units. For compositions requiring high toughness and good FR performance, larger siloxane units or a combination of large and small siloxane units can be used. For compositions requiring moderate levels of toughness with good FR, shorter siloxane units are preferred.

It is therefore desirable to have a unit size for the polysiloxane unit of the polysiloxane copolymer compositions that is of large enough size to ensure that the polysiloxane copolymer composition has an efficient heat release rate performance based on the distribution of polysiloxane, and that the units are small enough not form domains of a size that can cause observable light scattering (i.e., haze). The units are also desirably present in sufficient concentration in the polysiloxane copolymer composition to provide the above desired impact properties while maintaining the low haze. Further, it is desirable that the units are distributed sufficiently randomly and uniformly spaced throughout the polysiloxane copolymer composition for the above reasons of improved heat release rate performance and low haze.

Surprisingly, a polysiloxane copolymer composition comprising low levels (less than or equal to 10 wt %) of a polysiloxane unit having relatively low numbers of siloxane repeat units (i.e., 4 to 50 siloxane units) distributed in the polyester unit, polycarbonate unit, or in both the polyester and polycarbonate units, has a low heat release rate as determined by combustion of an article consisting of the polysiloxane copolymer composition. Polysiloxane copolymer compositions of these compositions may be prepared by any known polycarbonate, polyester, or polyester-polycarbonate reaction, and the resulting polymer may be opaque, translucent, or transparent. The polysiloxane copolymer composition also desirably meets the FAR requirements for low smoke density and levels of toxic combustion by-products. In an embodiment, a polysiloxane copolymer composition comprising low levels (less than or equal to 6 wt %) of a polysiloxane unit having relatively low numbers of siloxane repeat units (i.e., 4 to 15 siloxane units) distributed in the polycarbonate unit or in both the polyester and polycarbonate units, has both low haze, and a low heat release rate as determined by combustion of an article consisting of the polysiloxane copolymer composition. A polysiloxane copolymer composition having these properties may be prepared by random copolymerization, pre-reaction methods, or chloroformate processes. In another embodiment, a polysiloxane copolymer composition comprising low levels (less than or equal to 6 wt %) of a polysiloxane unit having relatively high numbers of siloxane repeat units (i.e., greater than 15, and less than or equal to 50 siloxane units) distributed in the polycarbonate unit or in both the polyester and polycarbonate units, has both low haze, and a low heat release rate as determined by combustion of an article consisting of the polysiloxane copolymer composition.

The polysiloxane copolymer composition with polysiloxane units has improved intrinsic heat release properties when compared to polycarbonates, polyester-polycarbonates, and combinations comprising these. The polysiloxane copolymer composition further has comparable or lower haze and comparable or improved transparency properties when compared to polyimides and polysiloxane-polyimides having good heat release properties. The polysiloxane copolymer composition with polysiloxane units has lower haze, lower color and comparable or improved transparency properties when compared to polymers having good heat release properties but high haze and low transparency such as, for example, polyimides and polysiloxane-polyimides.

Further, the low haze of the polysiloxane copolymer composition with polysiloxane units provides for thermoplastic compositions having other desirable properties such as good weatherability, high gloss retention, and good weatherability. Polyarylates have greater resistance to weathering by ultra-violet radiation and/or moisture in air that is superior to other impact modified, flame retardant compositions. It is believed that the use of the aforementioned polyarylate units to prepare polysiloxane copolymer compositions provides excellent weathering according to an appropriate weathering protocol, such as that according to ASTM G155-04a. Further, the weather resistance of the polyarylate units provides an improvement in transparency, yellowness (as measured by change in yellowness index after weathering), surface gloss after weathering, and resistance to formation of haze in the polysiloxane copolymer composition. In addition, the use of the polysiloxane units, dispersed through the polymer chain as described herein, provides desirable heat release rate performance, impact properties, and ductility while maintaining or improving the desired low haze and transparency.

Also surprisingly, in an embodiment, a low loading of less than or equal to 0.25 weight percent of polysiloxane in the polysiloxane copolymer composition can provide the desired heat release properties, while maintaining the desired low haze. It will be understood by one skilled in the art that within such a limitation, combinations of parameters including polysiloxane unit size, number of polysiloxane units, distribution of polysiloxane units, and composition of the polysiloxane units, may also each be adjusted with respect to the other within the compositional parameters provided to achieve desirable haze and impact property performance from the polysiloxane copolymer composition. Compositions comprising the polysiloxane copolymer compositions disclosed herein can further have improved ductility, and lower melt viscosity at higher shear rates than other impact modified polycarbonates for improved melt-flow characteristics.

While it is not required to provide an explanation of how an invention works, such theories may be useful to for the purposes of better helping the reader to comprehend the invention. Thus, it is to be understood that the claims are not to be limited by the following theory of operation. It is believed that relatively small size of the siloxane units (where E is less than or equal to 15), and the low concentration of the units as a weight percentage of the polysiloxane copolymer composition provides for a more completely miscible unit which, where a domain can form, provides a domain having a size of less than 30 nm in the longest dimension. Alternatively, longer polysiloxane units (i.e., greater than 15 siloxane units) that are well randomized throughout the polymer chain can also provide domains of less than approximately 30 nm. The interphase boundary between the phases is therefore sufficiently small such that scattering of incident light is minimized, and the polymer composition attains a transparent appearance. The reduction, mitigation, or elimination of these phase-separated regions provides a thermoplastic composition having very low scattering of incident light, and hence low haze.

The thermoplastic composition from which the article for testing is molded can contain additives typically included with polycarbonates, such as mold release agents and antioxidants, wherein the presence of these additives in an amount effective to perform the intended function does not significantly adversely affect the desired properties of the thermoplastic composition. Typically the total amount of these additives is less than or equal to 5.0 weight percent (wt %), specifically less than or equal to 1 wt %, of the total weight of components present in thermoplastic composition. In an exemplary embodiment, additives present in the thermoplastic composition used to prepare a molded article optical testing (haze and/or percent transmission) may include 0.2 to 0.4 weight percent pentaerythritol tetrastearate as a mold release agent, and 0.01 to 0.06 weight percent of an aryl phosphonite (e.g., Sandostab® P-EPQ, available from Clariant) as an antioxidant.

Thus, in an embodiment, a molded article having a thickness of 2.0±0.12 millimeters and consisting of the polysiloxane copolymer composition has a haze of less than or equal to 10%, specifically less than or equal to 5%, more specifically less than or equal to 3%, still more specifically less than or equal to 2.5%, and still yet more specifically less than or equal to 2%, when measured according to ASTM D1003-00.

In another embodiment, a molded article having a thickness of 2.0±0.12 millimeters and consisting of the polysiloxane copolymer composition may have a light transmittance (% T) of greater than or equal to 70%, specifically greater than or equal to 75%, more specifically greater than or equal to 78%, still more specifically greater than or equal to 80%, and still yet more specifically greater than or equal to 82%, when measured according to ASTM D1003-00.

The increase in yellowness of a thermoplastic composition after weathering by ultraviolet light exposure according to ASTM G155-04a may be determined by measuring the yellowness index (YI) of a molded article prepared from the thermoplastic composition, and comparing to the YI of the article before weathering. The difference in YI value, i.e., subtraction of the pre-weathering YI value from the post-weathering YI value is referred to as the increased change in yellowness index and abbreviated as dYI. The YI of the thermoplastic composition can be measured using transmittance and/or reflective spectroscopic methods depending upon the combination of transparency, color, and surface finish appearance of the article molded from the thermoplastic composition. Where a molded article prepared from the thermoplastic composition is either transparent or translucent; is colorless, white, or off-white; and is glossy, semi-glossy, or non-glossy, the YI of the molded article may be determined according to ASTM D1925-70. Where the molded article is opaque; is off-white or non-white; and has a glossy surface finish, the YI may be determined using reflectance measurement according to ASTM E313-73.

Thus, in an embodiment, a molded article having a thickness of 2.0±0.12 millimeters and consisting of the polysiloxane copolymer composition and less than or equal to 1.0 wt % additive based on the total weight of the article has, after weathering according to ASTM G155-04a at a total exposure of 1,000 kJ/m$^2$ using a xenon arc lamp, and when measured according to ASTM D1925-70, an increase in the change in yellowness index (dYI) of less than or equal to 12, specifically less than or equal to 10, more specifically less than or equal to 8, and still more specifically less than or equal to 6, when compared to the unweathered molded article.

Polysiloxane copolymer compositions may provide excellent gloss retention upon weathering according to ASTM G155-04a. In an embodiment, a molded black color chip of 2.0±0.12 mm thickness and consisting of the thermoplastic composition has, upon weathering according to ASTM G155-04a at a total exposure of 3,629 kJ/m$^2$ using a xenon arc lamp and when measured at an angle of 60 degrees (°) and calibrated using a black glass standard of 100 gloss units (GU) according to ASTM D2457-03, a loss of surface gloss of less than or equal to 30 GU, specifically less than or equal to 25 GU, still more specifically less than or equal to 20 GU, still more specifically less than or equal to 15 GU, and still more specifically less than or equal to 10 GU, when compared to the unweathered molded color chip.

The mechanical properties of the polysiloxane copolymer compositions can be measured using impact strength. Generally, a molded article having a thickness of 3.2±0.12 millimeters and consisting of the polysiloxane copolymer composition has a Notched Izod Impact (NII) strength of greater than or equal to 160 joules per meter (J/m), measured at 23° C. according to ASTM D256-04. In an embodiment, a molded article having a thickness of 3.2±0.12 millimeters and consisting of the polysiloxane copolymer composition has a NII strength of 160 to 1,000 J/m, specifically 500 to 900 J/m, measured at 23° C. according to ASTM D256-04. In another embodiment, a molded article having a thickness of 3.2±0.12 millimeters and consisting of the polysiloxane copolymer composition has a % ductility of greater than or equal to 80%, specifically greater than or equal to 85%, and more specifically greater than or equal to 90%, measured at 23° C. according to ASTM D256-04. In another embodiment, the polysiloxane copolymer composition has improved retention of impact properties upon heat aging over impact-modified polycarbonates. In another embodiment, the polysiloxane copolymer composition has improved thick section impact strength over impact-modified polycarbonates.

The polysiloxane copolymer composition has smoke density levels to pass the requirements described in Airbus Test Specifications ATS 1000.0001 and ABD 0031, and Boeing Standard Specification BSS 7238, in accordance with Federal Aviation Regulation FAR 25.853 (d), appendix F25.5. To pass, the polysiloxane copolymer composition has an optical smoke density measured at a 4.0 minutes ($D_s$ at 4.0 min), of less than or equal to 200 according to ASTM F814-83. In an embodiment, in flaming mode, the polysiloxane copolymer composition has an optical smoke density measured at a 4.0 minutes ($D_s$ at 4.0 min), of less than or equal to 100, specifically less than or equal to 75, and more specifically less than or equal to 50, according to ASTM F814-83 (and ASTM E 662-83). In another embodiment, in non-flaming mode, the polysiloxane copolymer composition has an optical smoke density measured at a 4.0 minutes ($D_s$ at 4.0 min), of less than or equal to 10, specifically less than or equal to 5, and more specifically less than or equal to 2, according to ASTM F814-83.

The polysiloxane copolymer composition has toxic emissions levels to pass the requirements for toxicity described in Airbus Test Specifications ATS 1000.0001 and ABD 0031, and Boeing Standard Specification BSS 7239. In an embodiment, the toxicity results to pass as determined using a draeger tube are, for flaming conditions, less than 150 parts per million (ppm) hydrogen cyanide (HCN), less than 3,500 ppm carbon monoxide (CO), less than 100 ppm nitrogen oxides (NO and $NO_2$), less than 100 ppm sulfur dioxide ($SO_2$), and less than 150 ppm hydrogen chloride (HCl); and for non-flaming conditions, less than 150 parts per million (ppm) hydrogen cyanide (HCN), less than 3,500 ppm carbon monoxide (CO), less than 100 ppm nitrogen oxides (NO and $NO_2$), less than 100 ppm sulfur dioxide ($SO_2$), and less than 150 ppm hydrogen chloride (HCl).

In an embodiment, the polysiloxane copolymer composition has a melt volume rate (MVR) of 1 to 30 cc/10 min, specifically 1 to 20 cc/10 min., when measured at 300° C. under a load of 1.2 kg according to ASTM D1238-04. In another embodiment, the polysiloxane copolymer composition has a $T_g$ of 120 to 160° C., specifically 125 to 155° C., and still more specifically 130 to 150° C.

The polysiloxane copolymer composition polymer may be used to prepare a thermoplastic composition. The thermoplastic composition can further comprise an additive such as an additional resin including: polycarbonates as described above including homopolycarbonates, copolycarbonates, and polyester-polycarbonates; polysiloxane-polycarbonates; and polyesters. Other additives ordinarily incorporated with thermoplastic compositions of this type may be used as well. Combinations of additives may be used. Such additives may be included during the mixing of the components to form the thermoplastic composition. Use of additives in the thermoplastic composition carries the proviso that the additive and amount are selected such that its inclusion does not significantly adversely affect the haze of the thermoplastic composition, and does not significantly adversely affect the desired mechanical properties of the thermoplastic composition, such as for example the impact properties.

The polysiloxane copolymer composition is used in the thermoplastic composition in an amount effective to improve the OSU heat release properties of the thermoplastic composition, while maintaining the haze at a suitably low level. Effective amounts are readily determined by one of ordinary skill in the art, and will vary depending upon the type of additional resin(s) and/or additives used, the type and amount of each of these resins and/or additives, and the intended use of the composition. The polysiloxane copolymer compositions are generally completely miscible with resorcinol polyarylates, and possess equivalent physical and rheological properties to the resorcinol polyarylate.

Polymers which can be combined with the polysiloxane copolymer composition include polycarbonates, polyester-polycarbonates, and polysiloxane-polycarbonates, as described hereinabove. In addition, combinations of the polycarbonate with other thermoplastic polymers, for example combinations of homopolycarbonates and/or polycarbonate copolymers with polyesters, may be used. Suitable polyesters may include, for example, polyesters having repeating units of formula (8), which include poly(alkylene dicarboxylates), liquid crystalline polyesters, and polyester copolymers. The polyesters described herein are desirably completely miscible with the polycarbonates when blended. Where a polyester is combined with the polysiloxane copolymer composition, the polyester desirably comprises or contributes a minimum amount of saturated hydrocarbon in the form of substituents or structural groups such as bridging groups or other connective groups. In another embodiment, less than or equal to 20 mol %, specifically less than or equal to 10 mol %, and still more specifically less than or equal to 5 mol % of the combined non-arylate ester units, arylate ester units, and carbonate units comprise alkyl, alkoxy, or alkylene groups. In a specific embodiment, less than or equal to 30 mol %, specifically less than or equal to 25 mol %, and still more specifically less than or equal to 20 mol % of the ester units comprise alkyl, alkoxy, or alkylene groups, based on the combined moles of arylate ester units and carbonate units. In another embodiment, the arylate ester units and the carbonate units are not substituted with non-aromatic hydrocarbon-containing substituents.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (8), wherein D and T are each arylene groups as described hereinabove. In an embodiment, useful aromatic polyesters may include, for example, poly(isophthalate-terephthalate-resorcinol)esters, poly(isophthalate-terephthalate-bisphenol-A)esters, poly[(isophthalate-terephthalate-resorcinol)ester-co-(isophthalate-terephthalate-bisphenol-A)]ester, or a combination comprising at least one of the foregoing. Also contemplated are aromatic polyesters with a minor amount, e.g., from 0.5 to 10 percent by weight, of units derived from an aliphatic diacid and/or an aliphatic polyol to make copolyesters.

Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically suitable poly(cycloalkylene diester) is poly(1,4-cyclohexanedimethylene terephthalate) (PCT). Combinations comprising at least one of the foregoing polyesters may also be used.

Copolymers comprising alkylene terephthalate repeating ester units with other suitable ester groups may also be useful.

Specifically useful ester units may include different alkylene terephthalate units, which can be present in the polymer chain as individual units, or as units of poly(alkylene terephthalates). Specifically suitable examples of such copolymers include poly(1,4-cyclohexanedimethylene terephthalate)-co-poly(ethylene terephthalate), abbreviated as PETG where the polymer comprises greater than or equal to 50 mole % of poly(ethylene terephthalate), and abbreviated as PCTG where the polymer comprises greater than 50 mole % of poly(1,4-cyclohexanedimethylene terephthalate).

Suitable poly(cycloalkylene diester)s may include poly(alkylene cyclohexanedicarboxylate)s. Of these, a specific example is poly(1,4-cyclohexane-dimethanol-1,4-cyclohexanedicarboxylate) (PCCD), having recurring units of formula (34):

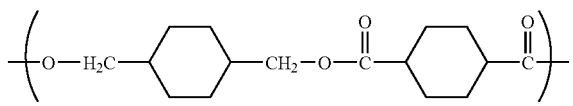

wherein, as described using formula (8), D is a dimethylene cyclohexane group derived from cyclohexane dimethanol, and T is a cyclohexane ring derived from cyclohexanedicarboxylate or a chemical equivalent thereof and is selected from the cis-isomer, trans-isomer, or a combination of cis- and trans-isomers. In an embodiment, a composition comprises a polycarbonate and PCCD. Such a composition desirably has greater chemical stability than a polycarbonate alone.

The polysiloxane copolymer composition and polyester may be used in a weight ratio of 1:99 to 99:1, specifically 10:90 to 90:10, and more specifically 30:70 to 70:30, based on the total weight of polysiloxane copolymer composition and polyester, and depending on the function and properties desired.

Where a polyester is used, it is desirable for such the polyester and polysiloxane copolymer composition blend to have a melt volume rate of 2 to 150 cc/10 min., specifically 3 to 100 cc/10 min, more specifically 3 to 80 cc/10 min, and still more specifically 5 to 60 cc/10 min., measured at 300° C. and a load of 1.2 kilograms according to ASTM D1238-04.

Other resins suitable for use in the thermoplastic composition can include polysiloxane-polycarbonate copolymers, also referred to as a polysiloxane-polycarbonate, comprising carbonate units of formula (1) and polysiloxane units of formula (17). The polysiloxane-polycarbonate may comprise 50 to 99.9 wt % of carbonate units and 0.1 to 50 wt % siloxane units. Within this range, the polysiloxane-polycarbonate copolymer may comprise 70 to 99 wt % carbonate units, specifically 75 to 98 wt % of carbonate units, and more specifically 80 to 98 wt % of carbonate units, based on the total weight of the polysiloxane-polycarbonate. Also within this range, the polysiloxane-polycarbonate copolymer may comprise 1 to 30 wt % siloxane units, specifically 2 to 25 wt % siloxane units, and specifically 2 to 20 wt % siloxane units, based on the total weight of the polysiloxane-polycarbonate.

In an embodiment, the polysiloxane-polycarbonate may comprise polysiloxane units, and carbonate units derived from bisphenol A, e.g., the dihydroxy aromatic compound of formula (3) in which each of $A^1$ and $A^2$ is p-phenylene and $Y^1$ is isopropylidene. Polysiloxane-polycarbonates may have an $M_w$ of 2,000 to 100,000 g/mol, specifically 5,000 to 50,000 g/mol as measured by GPC using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 Kg, of 1 to 50 cubic centimeters per 10 minutes (cc/10 min), specifically 2 to 30 cc/10 min. Combinations of polysiloxane-polycarbonates of different flow properties may be used to achieve the overall desired flow property.

Thus, in an embodiment, the thermoplastic composition comprises the polysiloxane copolymer composition and an additional polymer. The weight ratio of polysiloxane copolymer composition to additional resin in the thermoplastic composition can be, respectively, 1:99 to 99:1, specifically 10:90 to 90:10, more specifically 20:80 to 80:20, and still more specifically 30:70 to 70:30. It is understood that, where an added polymer, combination of polymers, or any other additive is used, the amount and type of the added polymer(s) or additive is selected such that the desired properties of the polysiloxane copolymer composition in the thermoplastic composition are not substantially adversely affected. In an embodiment, an additional polymer comprises homopolycarbonates, copolycarbonates, polyesters, copolyesters, polyester-polycarbonates, polysiloxane-polycarbonates, or a combination comprising at least one of the foregoing additional polymers. While it is contemplated that other resins may be used in the thermoplastic compositions described herein, the polysiloxane copolymer compositions are particularly suited for use in thermoplastic compositions that contain only polycarbonate-type resins or polycarbonate-type copolymer resins as described herein. Thus, in an embodiment, a thermoplastic composition consists essentially of a polysiloxane copolymer composition and a polycarbonate-containing polymer.

The thermoplastic composition may further contain one or more agents to improve the impact strength, i.e., an impact modifier. Useful impact modifiers include olefin-containing copolymers such as olefin acrylates and olefin diene terpolymers. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. Olefin diene terpolymers known in the art and generally fall into the EPDM (ethylene propylene diene monomer) family of terpolymers. They are commercially available such as, for example, EPSYN® 704 from Copolymer Rubber Company.

Various rubber polymers and copolymers can also be employed as impact modifiers. Examples of such rubber polymers are polybutadiene, polyisoprene, and various other polymers or copolymers having a rubbery dienic monomer, for example random copolymers of styrene and butadiene (SBR).

Other suitable thermoplastic impact modifiers are unit copolymers, for example, A-B diblock copolymers and A-B-A triblock copolymers having of one or two alkenyl aromatic units A, which are typically styrene units, and a rubber unit, B, which is typically an isoprene or butadiene unit. The butadiene unit may be partially hydrogenated. Mixtures of these diblock and triblock copolymers are especially useful.

Suitable A-B and A-B-A copolymers include but are not limited to polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as the selectively hydrogenated versions thereof, and the like. Mixtures of the aforementioned unit copolymers are also useful. Styrene-containing polymers can also be used as impact modifiers.

Other copolymers containing vinyl aromatic compounds, for example styrene, para-methyl styrene, or alpha methyl styrene and vinyl cyanides, for example acrylonitrile or methacrylonitrile, may also be useful as impact modifiers. One example is styrene-acrylonitrile (SAN), comprising 15 to 30 percent by weight acrylonitrile (AN) with the remainder styrene. The SAN may be further modified by grafting to a rubbery substrate such as a 1,4-polybutadiene to produce a rubber graft polymer, e.g., acrylonitrile-butadiene-styrene (ABS), and methacrylonitrile-butadiene-styrene (MBS). High rubber content (greater than about 50 wt %) resins of this type (e.g., HRG-ABS) may be especially useful.

These types of polymers are often available as core-shell polymers. The core usually consists substantially of an acrylate rubber or a butadiene rubber, wherein one or more shells have been grafted on the core. Usually these shells are built up from a vinyl aromatic compound, a vinyl cyanide, an alkyl acrylate or methacrylate, acrylic acid, methacrylic acid, or a combination of the foregoing. The core and/or the shell(s) often comprise multi-functional compounds that may act as a cross-linking agent and/or as a grafting agent. These polymers are usually prepared in several stages.

Other known impact modifiers include various elastomeric materials such as organic silicone rubbers, elastomeric fluorohydrocarbons, elastomeric polyesters, random unit polysiloxane-polycarbonate copolymers, and the like. A preferred organopolysiloxane-polycarbonate unit copolymer is a dimethylsiloxane-polycarbonate unit copolymer.

The impact modifier, when combined with a polysiloxane copolymer composition, desirably comprises or contributes a minimum amount of saturated hydrocarbon in the form of substituents or structural groups such as bridging groups or other connective groups. In an embodiment, the impact modifier has a low elastomer content and is not substituted with non-aromatic hydrocarbon-containing substituents. In another embodiment, the impact modifier is used in an amount so as to not substantially adversely affect the heat release rate performance of the polysiloxane copolymer composition. When present, impact modifiers can be present in the thermoplastic composition in amounts of 1 to 30 percent by weight, based on the total weight of polysiloxane copolymer composition and any additional polymer.

The thermoplastic composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, anthrones, dioxazines, phthalocyanines, and azo lakes; Pigment Brown 24, Pigment Red 101, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Blue 60, Pigment Green 7, Pigment Yellow 119, Pigment Yellow 147, or Pigment Yellow 150; or combinations comprising at least one of the foregoing pigments. Pigments can be used in amounts of 0.01 to 10 percent by weight, based on the total weight of the polysiloxane copolymer composition and any additional polymer.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Where it is desirable to use organic dyes and pigments, the dyes may be screened to determine their sensitivity to gamma radiation at a given exposure dose or range of exposure doses. Dyes can be used in amounts of 0.01 to 10 percent by weight, based on the total weight of the polysiloxane copolymer composition and any additional polymer.

The thermoplastic composition may further comprise an ionizing radiation stabilizing additive. Exemplary ionizing radiation stabilizing additives include certain aliphatic alcohols, aromatic alcohols, aliphatic diols, aliphatic ethers, esters, diketones, alkenes, thiols, thioethers and cyclic thioethers, sulfones, dihydroaromatics, diethers, nitrogen compounds, or a combination comprising at least one of the foregoing. Alcohol-based stabilizing additives may be selected from mono, di-, or polysubstituted alcohols, and can be straight, branched, cyclic and/or aromatic. Suitable aliphatic alcohols may include alkenols with sites of unsaturation, examples of which include 4-methyl-4-penten-2-ol, 3-methyl-pentene-3-ol, 2-methyl-4-penten-2-ol, 2,4-dimethyl-4-penten-2-ol, 2-phenyl-4-penten-2-ol, and 9-decen-1-ol; tertiary alcohols including 3-hydroxy-3-methyl-2-butanone, 2-phenyl-2-butanol, and the like; hydroxy-substituted tertiary cycloaliphatics such as 1-hydroxy-1-methyl-cyclohexane; and hydroxymethyl aromatics having an aromatic ring with carbinol substituents such as a methylol group (—$CH_2OH$) or a more complex hydrocarbon group such as (—CRHOH) or (—$CR_2OH$), wherein R is straight chain $C_{1-20}$ alkyl or branched $C_{1-20}$ alkyl. Exemplary hydroxy carbinol aromatics include benzhydrol, 2-phenyl-2-butanol, 1,3-benzenedimethanol, benzyl alcohol, 4-benzyloxy-benzyl alcohol, and benzyl-benzyl alcohol.

Useful classes of ionizing radiation stabilizing additives are di- and polyfunctional aliphatic alcohols, also referred to as aliphatic diols and aliphatic polyols. Specifically useful are aliphatic diols of formula (35):

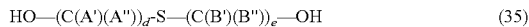

$$HO-(C(A')(A''))_d-S-(C(B')(B''))_e-OH \quad (35)$$

wherein A', A", B', and B" are each independently H or $C_{1-6}$ alkyl; S is $C_{1-20}$ alkyl, $C_{2-20}$ alkyleneoxy, $C_{3-6}$ cycloalkyl, or $C_{3-6}$ substituted cycloalkyl; and d and e are each 0 or 1, with the proviso that, when d and e are each O, S is selected such that both —OH groups are not connected directly to a single common carbon atom.

In formula (35), A', A", B', and B" can each be independently selected from H, methyl, ethyl, n-propyl, isopropyl, n-butyl, sec-butyl, t-butyl, n-pentyl, 2-pentyl, 3-pentyl, isopentyl, neopentyl, n-hexyl, 2-hexyl, 3-hexyl, 2-methyl pentyl, 3-methylpentyl, 2,2-dimethylbutyl, 2,3-dimethylbutyl, and the like, and a combination comprising at least one of the foregoing alkyl groups.

Spacer group S can be selected from methanediyl, ethanediyl, 1,1-ethanediyl, 1,1-propanediyl, 1,2-propanediyl, 1,3-propanediyl, 2,2-propanediyl, 1,1-butanediyl, 1,2-butanediyl, 1,3-butanediyl, 1,4-butanediyl, 2,2-butanediyl, 2,3-butanediyl, 1,1-pentanediyl, 1,2-pentanediyl, 1,3-pentanediyl, 1,4-pentanediyl, 1,5-pentanediyl, 2,2-pentanediyl, 2,3-pentanediyl, 2,4-pentanediyl, 3,3-pentanediyl, 2-methyl-1,1-butanediyl, 3-methyl-1,1-butanediyl, 2-methyl-1,2-butanediyl, 2-methyl-1,3-butanediyl, 2-methyl-1,4-butanediyl, 2-methyl-2,2-butanediyl, 2-methyl-2,3-butanediyl, 2,2-dimethyl-1,1-propanediyl, 2,2-dimethyl-1,2-propanediyl, 2,2-dimethyl-1,3-propanediyl, 3,3-dimethyl-1,1-propanediyl, 3,3-dimethyl-1,2-propanediyl, 3,3-dimethyl-2,2-propanediyl, 1,1-dimethyl-2,3-propanediyl, 3,3-dimethyl-2,2-propanediyl, 1,1-hexanediyl, 1,2-hexanediyl, 1,3-hexanediyl, 1,4-hexanediyl, 1,5-hexanediyl, 1,6-hexanediyl, 2,2-hexanediyl, 2,3-hexanediyl, 2,4-hexanediyl, 2,5-hexanediyl, 3,3-hexanediyl, 2-methyl-1,1-pentanediyl, 3-methyl-1,1-pentanediyl, 2-methyl-1,2-pentanediyl, 2-methyl-1,3-pentanediyl, 2-methyl-1,4-pentanediyl, 2-methyl-2,2-pentanediyl, 2-methyl-2,3-pentanediyl, 2-methyl-2,4-pentanediyl, 2,2-dimethyl-1,1-butanediyl, 2,2-dimethyl-1,2-butanediyl, 2,2-dimethyl-1,3-butanediyl, 3,3-dimethyl-1,1-butanediyl, 3,3-dimethyl-1,2-butanediyl, 3,3-dimethyl-2,2-butanediyl, 1,1-dimethyl-2,3-butanediyl, 3,3-dimethyl-2,2-butanediyl, and the like; isomers of octanediyl, decanediyl, undecanediyl, dodecanediyl, hexadecanediyl, octadecanediyl, icosananediyl, and docosananediyl; and substituted and unsubstituted cyclopropanediyl, cyclobutanediyl, cyclopentanediyl, cyclohexanediyl, wherein substituents may be the points of radical attachment, such as in 1,4-dimethylenecyclohexane, or may include branched and straight chain alkyl, cycloalkyl, and the like. Additionally, the spacer group S may be selected from at least one difunctional group comprising polyalkyleneoxy units, such as ethyleneoxy, 1,2-propyleneoxy, 1,3-propyleneoxy, 1,2-butyleneoxy, 1,4-butyleneoxy, 1,6-hexyleneoxy, and the like; and a combination comprising at least one of the foregoing.

Specific examples of suitable aliphatic diols include ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,3-cyclobutanediol, 2,2,4,4-tetramethylcyclobutanediol, 1,2-cyclopentanediol, 1,2-cyclohexanediol, 1,3-cyclohexanediol, 1,4-cyclohexanediol, 1,4-dimethylolcyclohexane, and the like; branched acyclic diols such as 2,3-dimethyl-2,3-butanediol (pinacol), and 2-methyl-2,4-pentanediol (hexylene glycol); and polyalkyleneoxy-containing alcohols such as polyethylene glycol, polypropylene glycol, unit or random poly(ethylene glycol-co-propylene glycols), and diols of copolymers containing polyalkyleneoxy-groups. Useful polyols may include polyaryleneoxy compounds such as polyhydroxystyrene; alkyl polyols such as polyvinylalcohol, polysaccharides, and esterified polysaccharides. A combination comprising at least one of the foregoing may also be useful. Specifically suitable diols include 2-methyl-2,4-pentanediol (hexylene glycol), polyethylene glycol, and polypropylene glycol.

Suitable aliphatic ethers may include alkoxy-substituted cyclic or acyclic alkanes such as, for example, 1,2-dialkoxyethanes, 1,2-dialkoxypropanes, 1,3-dialkoxypropanes, alkoxycyclopentanes, alkoxycyclohexanes, and the like. Ester compounds (—COOR) may be useful as stabilizers wherein R may be a substituted or unsubstituted, aromatic or aliphatic, hydrocarbon and the parent carboxy compound may likewise be substituted or unsubstituted, aromatic or aliphatic, and/or mono- or polyfunctional. When present, substituents may include, for example, $C_{1-8}$ alkyl, $C_{1-8}$ alkyl ether, $C_{6-20}$ aryl, and the like. Esters which have proven useful include tetrakis(methylene[3,5-di-t-butyl-4-hydroxy-hydrocinnamate])methane, 2,2'-oxamido bis(ethyl-3-(3,5-di-t-butyl-4-hydroxyphenyl)propionate, and trifunctional hindered phenolic ester compounds such as GOOD-RITE® 3125, available from B.F. Goodrich in Cleveland Ohio.

Diketone compounds may also be used, specifically those having two carbonyl functional groups and separated by a single intervening carbon atoms such as, for example 2,4-pentadione.

Sulfur-containing compounds, suitable for use as stabilizing additives, can include thiols, thioethers and cyclic thioethers. Thiols include, for example, 2-mercaptobenzothiazole; thioethers include dilaurylthiopropionate; and cyclic thioethers include 1,4-dithiane, 1,4,8,11-tetrathiocyclotetradecane. Cyclic thioethers containing more than one thioether group are useful, specifically those having a single intervening carbon between two thioether groups such as in, for example, 1,3-dithiane. The cyclic ring may contain oxygen or nitrogen members.

Aryl or alkyl sulfone stabilizing additives of general structure R—S(O)$_2$—R' may also be used, where R and R' comprise $C_{1-20}$ alkyl, $C_{6-20}$ aryl, $C_{1-20}$ alkoxy, $C_{6-20}$ aryloxy, substituted derivatives thereof, and the like, and wherein at least one of R or R' is a substituted or unsubstituted benzyl. When present, substituents may include, for example, $C_{1-8}$ alkyl, $C_{1-8}$ alkyl ether, $C_{6-20}$ aryl, and the like. An example of a specifically useful sulfone is benzylsulfone.

Alkenes may be used as stabilizing additives. Suitable alkenes may include olefins of general structure RR'C=CR"R'" wherein R, R', R", and R'" may each individually be the same or different and may be selected from hydrogen, $C_{1-20}$ alkyl, $C_{1-20}$ cycloalkyl, $C_{1-20}$ alkenyl, $C_{1-20}$ cycloalkenyl, $C_{6-20}$ aryl, $C_{6-20}$ arylalkyl, $C_{6-20}$ alkylaryl, $C_{1-20}$ alkoxy, $C_{6-20}$ aryloxy and substituted derivatives thereof. When present, substituents may include, for example, $C_{1-8}$ alkyl, $C_{1-8}$ alkyl ether, $C_{6-20}$ aryl, and the like. The olefins may be acyclic, exocyclic, or endocyclic. Examples of specifically useful alkenes include 1,2-diphenyl ethane, allyl phenol, 2,4-dimethyl-1-pentene, limonene, 2-phenyl-2-pentene, 2,4-dimethyl-1-pentene, 1,4-diphenyl-1,3-butadiene, 2-methyl-1-undecene, 1-dodecene, and the like, or a combination comprising at least one of the foregoing.

Hydroaromatic compounds may also be useful as stabilizing additives, including partially hydrogenated aromatics, and aromatics in combination with an unsaturated ring. Specific aromatics include benzene and/or naphthalene based systems. Examples of suitable hydroaromatic compounds include indane; 5,6,7,8-tetrahydro-1-naphthol; 5,6,7,8-tetrahydro-2-naphthol; 9,10-dihydro anthracene; 9,10-dihydrophenanthrene; 1-phenyl-1-cyclohexane; 1,2,3,4-tetrahydro-1-naphthol; and the like; or a combination comprising at least one of the foregoing.

Diethers, including hydrogenated and non-hydrogenated, and substituted and unsubstituted pyrans, may also be used as stabilizing additives. When present, substituents may include $C_{1-8}$ alkyl, $C_{1-8}$ alkyl ether, or $C_{6-20}$ aryl. The pyrans may have substituents including $C_{1-20}$ alkyl, $C_{6-20}$ aryl, $C_{1-20}$ alkoxy, or $C_{6-20}$ aryloxy, and which may be positioned on any carbon of the pyran ring. Specifically useful substituent groups include $C_{1-20}$ alkoxy or $C_{6-20}$ aryloxy, located on the ring at the six position. Hydrogenated pyrans are specifically useful. Examples of suitable diethers include dihydropyranyl ethers and tetrahydropyranyl ethers.

Nitrogen compounds which may function as stabilizers include high molecular weight oxamide phenolics, for example, 2,2-oxamido bis-[ethyl 3-(3,5-di-tert-butyl-4-hydroxyphenyl)propionate], high molecular weight oxalic anilides and their derivatives, and amine compounds such as thiourea.

Ionizing radiation stabilizing additives are typically used in amounts of 0.001 to 1 percent by weight, based on the total weight of the polysiloxane copolymer composition and any additional resin. In an embodiment, a specifically suitable ionizing radiation stabilizing additive is an aliphatic diol.

The thermoplastic composition may include fillers or reinforcing agents, provided that the inclusion of the filler or reinforcing agent does not significantly adversely affect the desired properties of the thermoplastic composition. The fillers and reinforcing agents may desirably be in the form of nanoparticles, i.e., particles with a median particle size ($D_{50}$) of less than or equal to 200 nanometers (nm), specifically less than or equal to 100 nm, and more specifically less than or equal to 80 nm, and still more specifically less than or equal to 50 nm. In another embodiment, a nanoparticle has a mean diameter of greater than or equal to 5 nm, specifically greater than or equal to 8 nm, and still more specifically greater than 10 nm, as determined using light scattering methods. Where used, suitable fillers or reinforcing agents include, for example, silicates and silica powders such as zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); glass spheres such as hollow and solid glass spheres, silicate spheres, cenospheres, aluminosilicate (armospheres), or the like; single crystal fibers or "whiskers" such as silicon carbide, alumina, boron carbide, iron, nickel, copper, or the like; fibers (including continuous and chopped fibers) such as carbon fibers and glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Other fillers contemplated herein include visual effects fillers that possess compositional, shape and dimensional qualities suitable to the reflection and/or refraction of light. Visual effect fillers include those having planar facets and can be multifaceted or in the form of flakes, shards, plates, leaves, wafers, and the like. The shape can be irregular or regular. A non-limiting example of a regular shape is a hexagonal plate. Visual effect fillers can be two dimensional, plate-type fillers, wherein a particle of a plate type filler has a ratio of its largest dimension to smallest dimension of greater than or equal to 3:1, specifically greater than or equal to 5:1, and more specifically greater than or equal to 10:1. The largest dimension so defined can also be referred to as the diameter of the particle. Plate-type fillers have a distribution of particle diameters described by a minimum and a maximum particle diameter. The minimum particle diameter is described by the lower detection limit of the method used to determine particle diameter, and corresponds to it. A typical method of determining particle diameters is laser light scattering, which can for example have a lower detection limit for particle diameter of 0.6 nanometers. It should be noted that particles having a diameter less than the lower detection limit may be present but not observable by the method. The maximum particle diameter is typically less than the upper detection limit of the method. The maximum particle diameter herein may be less than or equal to 1,000 micrometers, specifically less than or equal to 750 micrometers, and more specifically less than or equal to 500 micrometers. The distribution of particle diameters can be unimodal, bimodal, or multimodal. The diameter can be described more generally using the mean of the distribution of the particle diameters, also referred to as the mean diameter. Specifically, particles suitable for use herein have a mean diameter of 1 to 100 micrometers, specifically 5 to 75 micrometers, and more specifically 10 to 60 micrometers.

Visual effects fillers can be reflective or refractive. Reflective fillers have an optically dense surface exterior finish useful for reflecting incident light. Metallic and non-metallic fillers such as those based on aluminum, silver, copper, bronze, steel, brass, gold, tin, silicon, alloys of these, combinations comprising at least one of the foregoing metals, and the like, are specifically useful. Also specifically useful are inorganic fillers prepared from a composition presenting a surface that is useful for reflecting and/or refracting incident light. In contrast to a reflective filler, a refractive filler having refractive properties can be at least partially transparent, i.e., can allow transmission of a percentage of incident light, and can provide optical properties based on reflection, refraction, or a combination of reflection and refraction of incident light. Inorganic fillers having light reflecting and/or refracting properties suitable for use herein may include micas, alumina, lamellar talc, silica, silicon carbide, glass, combinations comprising at least one of the foregoing inorganic fillers, and the like.

It is believed that the use of visual effects fillers with polysiloxane copolymer compositions can provide an enhancement of the desired visual effects due to the increased transparency and/or lower haze of the polysiloxane copolymer compositions relative to compositionally different copolymers having lower transparency and/or greater haze. Such improved visual effects may be observable at a greater depth in an article comprising the polysiloxane copolymer composition than would be observed in an article that does not comprise the polysiloxane copolymer composition. In addition, such an improved appearance of an article comprising the visual effects filler may be obtained without substantially adversely affecting the mechanical properties of the polysiloxane copolymer composition.

The fillers and reinforcing agents may be coated with a layer of metallic material to facilitate conductivity, or surface treated with silanes to improve adhesion and dispersion with the polysiloxane copolymer composition matrix. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers can be used in amounts of 0 to 90 percent by weight, based on the total weight of the polysiloxane copolymer composition and any additional polymer.

The thermoplastic composition may also include suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like; or combinations comprising at least one of the foregoing antioxidants. An exemplary antioxidant is SANDOSTAB® P-EPQ phosphite stabilizer, commercially available from Clariant. Antioxidants can be used in amounts of 0.0001 to 1 percent by weight, based on the total weight of the polysiloxane copolymer composition and any additional polymer.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 percent by weight, based on the total weight of the polysiloxane copolymer composition and any additional polymer.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 5 percent by weight, based on the total weight of the polysiloxane copolymer composition and any additional polymer.

The thermoplastic composition may also include an ultraviolet (UV) absorbing additive, also referred to as a UV absorber. Suitable compounds for use as UV absorbing additives include, for example, hydroxybenzophenones; hydroxybenzotriazoles; hydroxybenzotriazines; cyanoacrylates; oxanilides; benzoxazinones; or a combination comprising at least one of the foregoing. Specifically useful commercially available UV absorbers include TINUVIN® 234, TINUVIN® 329, TINUVIN® 350, and TINUVIN® 360, commercially available from Ciba Specialty Chemicals; 2-(2H-benzotriazol-2-yl)-4-(1,1,3,3-tetramethylbutyl)-phenol (CYASORB® 5411), 2-hydroxy-4-n-octyloxybenzophenone (CYASORB® 531), 2-[4,6-bis(2,4-dimethylphenyl)-1,3,5-triazin-2-yl]-5-(octyloxy)-phenol (CYASORB® 1164), 2,2'-(1,4-phenylene)-bis-(4H-3,1-benzoxazin-4-one) (CYASORB® UV-3638), CYASORB® UV absorbers, available from Cyanamide; and 2,2'-(1,4-phenylene) bis(4H-3,1-benzoxazin-4-one), 1,3-bis[(2-cyano-3,3-diphenylacryloyl)oxy]-2,2-bis[[(2-cyano-3,3-diphenylacryloyl)oxy]methyl] propane, and 1,3-bis[(2-cyano-3,3-diphenylacryloyl)oxy]-2,2-bis[[(2-cyano-3,3-diphenylacryloyl)oxy]methyl]propane (UVINUL® 3030), commercially available from BASF. In addition, UV absorbers may include nano-size inorganic materials such as titanium oxide, cerium oxide, zinc oxide, or the like, all with particle size less than 100 nanometers, may be used. Combinations comprising at least one of the foregoing UV absorbers may be used. UV absorbers can be used in amounts of 0.0001 to 1 percent by weight, based on the total weight of the polysiloxane copolymer composition and any additional polymer.

Plasticizers, lubricants, and/or mold release agents may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; combinations of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 percent by weight, specifically 0.01 to 0.75 percent by weight, more specifically 0.1 to 0.5 percent by weight, based on the total weight of the polysiloxane copolymer composition and any additional polymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) unit copolymers, polyetheresteramide unit copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 available from Sanyo, Pebax® MH1657 available from Atofina, or Irgastat® P18 and P22 both available from Ciba-Geigy. Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In an embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 percent by weight, based on the total weight of the polysiloxane copolymer composition and any additional polymer.

Suitable flame retardants that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

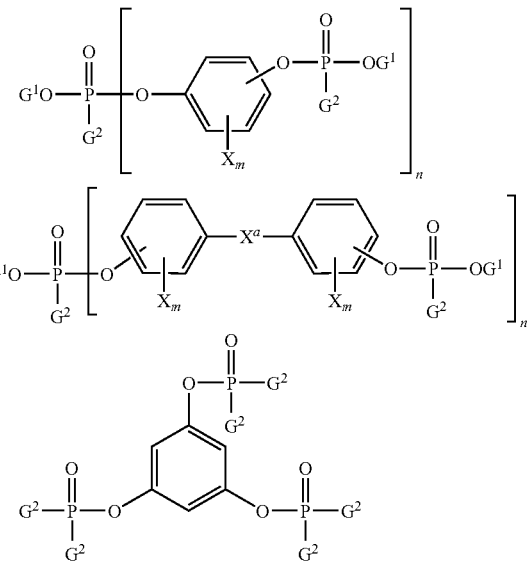

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants can be present in amounts of 0.1 to 10 percent by weight, based on the total weight of the polysiloxane copolymer composition and any additional polymer.

Halogenated materials may also be used as flame retardants, for example halogenated compounds and resins of formula (36):

(36)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (36) are each independently mono- or polycarbocyclic aromatic groups such as phenylene, biphenylene, terphenylene, naphthylene, or the like.

Y is an organic, inorganic, or organometallic group, for example: halogen, e.g., chlorine, bromine, iodine, fluorine; ether groups of the general formula OX', wherein X' is a monovalent hydrocarbon group similar to X; monovalent hydrocarbon groups of the type represented by R; or other substituents, e.g., nitro, cyano, and the like, the substituents being essentially inert provided that there is at least one, and specifically at least two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on the total weight of the polysiloxane copolymer composition and any additional polymer.

Inorganic flame retardants may also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 percent by weight, based on the total weight of the polysiloxane copolymer composition and any additional polymer.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN, and may also be used as a flame retardant. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. An exemplary TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 percent by weight, based on the total weight of the polysiloxane copolymer composition and any additional polymer.

Thus, in an embodiment, the thermoplastic composition may comprise an additive selected from filler, ionizing radiation stabilizer, antioxidant, heat stabilizer, light stabilizer, ultraviolet light absorber, plasticizer, lubricant, mold release agent, antistatic agent, pigment, dye, flame retardant, anti-drip agent, or a combination comprising at least one of the foregoing.

The thermoplastic composition may be manufactured by methods generally available in the art, for example, In an embodiment, in one manner of proceeding, powdered polycarbonate, polysiloxane copolymer composition, and other optional components including ionizing radiation stabilizing additive and/or other additives are first blended, in a HENSCHEL-Mixer® high speed mixer. Other low shear processes including but not limited to hand mixing may also accomplish this blending. The blend is then fed into the throat of an extruder via a hopper. Alternatively, at least one of the components may be incorporated into the composition by feeding directly into the extruder at the throat and/or downstream through a sidestuffer. Where desired, the polysiloxane copolymer composition and any desired additional resin and/or additives may also be compounded into a masterbatch and combined with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a polysiloxane copolymer composition and an additive. The melt combining can be done by extrusion. In an embodiment, the proportions of polysiloxane copolymer composition, any added resin, and additive, are selected such that the optical properties of the thermoplastic composition are maximized while mechanical performance is at a desirable level. In a further specific embodiment, an additive is combined with the polysiloxane copolymer composition to make the thermoplastic composition. In an embodiment, the proportions polysiloxane copolymer composition, additional resin, or other additive, are selected such that the optical properties of the thermoplastic composition are maximized while mechanical performance is at a desirable level.

In a specific embodiment, the extruder is a single or twin-screw extruder. The extruder is typically operated at a temperature of 180 to 385° C., specifically 200 to 330° C., more specifically 220 to 310° C., wherein the die temperature may be different. The extruded thermoplastic composition is quenched in water and pelletized.

In some embodiments, thermoplastic compositions comprising the polysiloxane copolymer composition are useful in the production of opaque, translucent, or transparent articles. For example, the article may comprise a film, sheet, molded object, membrane, or composite, wherein the film, sheet, molded object, or composite has at least one layer comprising the polysiloxane copolymer composition. Polysiloxane copolymer compositions may be made into articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultraviolet light resistance, aesthetic appeal, lubricity, and biocompatibility. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt, or roll followed by removal of the solvent.

The thermoplastic composition, comprising the polysiloxane copolymer composition, can be used to form a sheet. For example in an operation to make a sheet, the molten thermoplastic composition(s) (e.g., a thermoplastic composition that has been heated to a temperature greater than a glass transition temperature ($T_g$) of the thermoplastic composition) can be extruded from a slot die. Twin or single screw extruders and be used. Single or multi-manifold dies may be used. The extrusion temperatures of 200 to 320° C., specifically 220 to 290° C., and more specifically 230 to 260° C. The molten thermoplastic composition can then be passed through a nip (e.g., a space formed between two calendaring rolls), which when cooled can form the sheet. The temperature for the cooling rolls can be the same or different. The temperature of the rolls can be from 80 to 150° C., specifically 90 to 140° C., and more specifically 100 to 130° C. After passing through the nip, the thermoplastic composition can be cooled (e.g., to a temperature less than the $T_g$ of the thermoplastic composition), and can then be passed through pull rolls. A mask can optionally be applied to the cooled sheet to protect the sheet from damage or contamination. The sheet can be cut into lengths suitable for handling.

In various embodiments, the calendaring roll(s) can comprise a polished roll (e.g., a chrome or chromium plated roll). In other embodiments, the roll(s) can comprise a textured roll (e.g., a roll comprising an elastomeric material (e.g., an EPDM (ethylene propylene diamine monomer) based rubber)). Suitable materials for the rolls include plastic, metal (e.g., chrome, stainless steel, aluminum, and the like), rubber (e.g., EPDM), ceramic materials, and the like. Furthermore, it is generally noted that the size of the rolls, material of the rolls, number of rolls, the film wrap around the rolls, and the like, can vary with the system employed. Further, it is noted that processing conditions (e.g., the temperature of the calendaring rolls, the line speed, nip pressure, and the like) can also be varied.

The sheet can comprise a cap-layer to provided additional properties desirable in the sheet. In an embodiment, the cap-layer may be a hard coat, defined herein as a coating applied to the sheet to enhance scratch and abrasion resistance, chemical resistance, or other desirable surface properties. Cap-layers may also include a UV blocking layer applied to provide optical properties such as enhanced weatherability for underlying layers.

In an embodiment, the sheet comprises an OSU compliant layer. The term "OSU compliant layer", as used herein, is a layer of an article (such as, for example, a sheet) that comprises the polysiloxane copolymer composition and passes the OSU 65/65 requirements described hereinabove. In another embodiment, the sheet comprises as a cap-layer a hard coat disposed on a surface of the OSU compliant layer. In another embodiment, the sheet comprises as a cap-layer a UV blocking layer disposed on a surface of the OSU compliant layer. In another embodiment, the sheet comprises a multilayer cap-layer comprising a first cap-layer comprising a UV blocking layer disposed on a surface of an OSU compliant layer, and a second cap-layer comprising a hard coat disposed on a surface of the UV blocking layer opposite the OSU compliant layer. In another embodiment, the cap-layer can be disposed on one or both surfaces of the OSU compliant layer. In another embodiment, where a cap-layer is disposed on both surfaces of the OSU compliant layer, the cap-layer disposed on one surface of the OSU compliant layer is the same or different from the cap-layer on the opposing surface. In another embodiment, where a cap-layer is disposed on both surfaces of the OSU compliant layer, one cap-layer is a multilayer cap-layer. In another embodiment, where a cap-layer is disposed on both surfaces of the OSU compliant layer, both cap-layers are multilayer cap-layers. In a specific embodiment of a sheet having multilayer cap-layers, the sheet comprises an OSU compliant layer having a UV blocking layer disposed on both opposing surfaces of the OSU compliant layer, and a hard coat disposed on a surface of each of the UV blocking layers opposite the OSU compliant layer.

In an embodiment, in FIG. 1, a hard coated sheet 100 comprises a first layer 110 comprising the thermoplastic composition, and a second layer 140 comprising a hard coat. In another embodiment, in FIG. 2, a hard coated sheet 200 comprises a first layer 210, a second (hard coat) layer 220, and a primer layer 230 disposed between the first layer 210 and the second layer 220. As used herein, where a layer is disposed on another layer it will be understood that the layers are in at least partial contact with each other. It will be further understood that the hard coat may be disposed on one or both surfaces of a sheet.

While any suitable method of forming an article employing the thermoplastic composition can be used (e.g., thermoforming, profile extrusion, blow molding, injection molding, and the like), in a particular embodiment, the thermoplastic sheet composition can advantageously be formed by thermoforming, which can reduce the overall cost in manufacturing the article. It is generally noted that the term "thermoforming" is used to describe a method that can comprise the sequential or simultaneous heating and forming of a material onto a mold, wherein the material is originally in the form of a film, sheet, layer, or the like, and can then be formed into a desired window shape. Once the desired shape has been obtained, the formed article (e.g., a component of an aircraft window) is cooled below its glass transition temperature. For example, suitable thermoforming methods can include, but are not limited to, mechanical forming (e.g., matched tool forming), membrane assisted pressure/vacuum forming, membrane assisted pressure/vacuum forming with a plug assist, and the like.

In an embodiment, where scratch resistance is desired for the sheet or window, a hard coat may be applied. Hard coats comprise a hard coat composition that has a hardness after cure that is harder than the hardness of the over-coated article. Desirably, hard coats are also transparent and colorless, and still more desirably, can protect the underlying coated article from exposure to ultraviolet radiation. Hard coats are generally thermosetting, but may be thermoformable or non-thermoformable. Typically, a non-thermoformable hard coat is applied after the article to be hard coated has been shaped to its final shape, whereas a thermoformable hard coat may be applied prior to shaping (e.g., thermoforming, etc.) by coextruding, coating, or other suitable methods, and is subsequently cured to its desired final hardness during or after shaping to form the article. Hard coats may be a single layer of hard coat having sufficient scratch resistance. Hard coats comprise curable (i.e., cross-linkable) polymers, and may be based on hydroxy-containing organic polymers such as novolacs, organosilicon polymers such as polysilsesquioxane copolymers, acrylates, or a combination comprising at least one of the foregoing.

Organosiloxane polymers useful as silicone-based hard coats comprise the structure:

$$M_a D_b T_c Q_d,$$

wherein the subscripts a, b, c, and d are zero or a positive integer, subject to the limitation that if subscripts a and b are both equal to zero, subscript c is greater than or equal to two; M has the formula $R_3SiO_{1/2}$; D has the formula $R_2SiO_{2/2}$; T has the formula $RSiO_{3/2}$; and Q has the formula $SiO_{4/2}$, wherein each R group independently represents hydrogen, $C_{1-12}$ alkyl, $C_{2-12}$ alkenyl, $C_{6-12}$ aryl, or $C_{7-12}$ aralkyl. Exemplary alkenyl R-groups include vinyl, allyl, butenyl, pentenyl, hexenyl, and heptenyl, with vinyl being particularly useful. The alkenyl group can be bonded at the molecular chain terminals, in pendant positions on the molecular chain, or both. Other exemplary R groups include alkyl groups such as methyl, ethyl, propyl, butyl, pentyl, and hexyl; aryl groups such as phenyl, tolyl, and xylyl; aralkyl groups such as benzyl and phenethyl; reactive alkyl groups including epoxy endcapped alkyl or cycloalkyl groups such as glycidoxypropyl and (3,4-epoxycyclohexyl)ethyl groups and the like, alkoxysilane-terminated groups such as trialkoxysilylethyl, alkyldialkoxysilylethyl, and the like, as derived from, for example, monomers including glycidoxypropyl trialkoxysilane, glycidoxypropyl dialkoxy alkyl silane, 2,3-epoxycyclohexyl-4-ethyl trialkoxysilane, 2,3-epoxycyclohexyl-4-ethoxyethyl dialkoxyalkylsilane, or a combination comprising at least one of the foregoing alkoxysilane monomers, or (meth)acrylate terminated alkyl groups such as those derived from trialkoxysilylpropyl(meth)acrylates; and halogenated alkyl groups such as 3-chloropropyl and 3,3,3-trifluoropropyl. Methyl and phenyl are specifically useful.

Where at least one organosiloxane polymer is used, the organosiloxane polymer can comprise silanol end groups that are curable in the presence of moisture and an acid or base catalyst. In another embodiment, at least one organosiloxane polymer is used, wherein the organosiloxane polymer comprises one or more reactive groups such as epoxy or (meth) acrylate. Where the reactive groups comprise epoxy groups, the organosiloxane polymer may be cured to form a crosslinked network using dihydroxy organic compounds comprising at least two aromatic hydroxy groups, such as for example, resorcinol, bisphenol-A, or the like.

Alternatively, the hard coat composition comprises a curable hydroxy-containing organic polymer containing hydroxy aromatic groups such as a novolac or a resole polymer. Such polymers can be derived from phenol and/or a singly or multiply $C_{1-12}$ alkyl substituted phenol and an aldehyde such as formaldehyde, acetaldehyde, hexanal, octanal, dodecanal, or the like. The hydroxy-containing organic polymer may be derived from a hydroxystyrene-based polymer such as polyhydroxystyrene. The hydroxy-containing organic polymer may be substituted with reactive, i.e., crosslinkable groups such as epoxy groups. In a specific embodiment, the hydroxy-containing organic polymer is a novolac, an epoxy-substituted novolac, or a combination comprising at least one of the foregoing novolacs. In still another embodiment a carboxylic-acid based polymer may be used, such as poly(meth)acrylic acid-containing polymers, where the carboxylic acid containing polymer is used to crosslink with an epoxy-containing polymer.

In another embodiment, a combination of two polymers is used, wherein least 2 of the R groups in a first organosiloxane polymer are alkenyl groups, and at least 2 of the R groups in a second organosiloxane polymer are hydrogen groups (i.e., silicon hydride groups). The alkenyl-containing organopolysiloxane can have straight chain, partially branched straight chain, branched-chain, or network molecular structure, or may be a mixture of such structures. The alkenyl-containing organopolysiloxane is exemplified by trimethylsiloxy-endblocked dimethylsiloxane-methylvinylsiloxane copolymers; trimethylsiloxy-endblocked methylvinylsiloxane-methylphenylsiloxane copolymers; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked methylvinylphenylsiloxanes; dimethylvinylsiloxy-endblocked dimethylvinylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; and mixtures comprising at least one of the foregoing organopolysiloxanes.

The hydrogen-containing organopolysiloxane is exemplified by trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers; and dimethylhydrogensiloxy-endblocked methylphenylpolysiloxanes.

The hydrogen-containing organopolysiloxane component is used in an amount sufficient to cure the composition, specifically in a quantity that provides from about 1.0 to about 10 silicon-bonded hydrogen atoms per alkenyl group in the alkenyl-containing organopolysiloxane.

Where a combination of organosiloxane polymers, one having alkenyl groups and a second having hydrogen groups is used, the hard coat further comprises, generally as a component of the part containing the organopolysiloxane having at least two alkenyl groups per molecule, a hydrosilylation-reaction catalyst. Effective catalysts promote the addition of silicon-bonded hydrogen onto alkenyl multiple bonds to accelerate the cure. Such catalyst can include a noble metal, such as, for example, platinum, rhodium, palladium, ruthenium, iridium, or a combination comprising at least one of the foregoing. The catalyst can also include a support material, specifically activated carbon, aluminum oxide, silicon dioxide, thermoplastic resin, and combinations comprising at least one of the foregoing.

Platinum and platinum compounds known as hydrosilylation-reaction catalysts are preferred, and include, for example platinum black, platinum-on-alumina powder, platinum-on-silica powder, platinum-on-carbon powder, chloroplatinic acid, alcohol solutions of chloroplatinic acid, platinum-olefin complexes, platinum-alkenylsiloxane complexes and the catalysts afforded by the microparticulation of the dispersion of a platinum addition-reaction catalyst, as described above, in a thermoplastic resin such as methyl methacrylate, polycarbonate, polystyrene, silicone, and the like. Mixtures of catalysts may also be used. A quantity of catalyst effective to cure the present composition is used, generally from about 0.1 to about 1,000 parts per million by weight (ppm) of metal (e.g., platinum) based on the combined amounts of the reactive organopolysiloxane components.

Other additives may be included in the coating composition may be included to add or enhance the properties of the hard coat. For example, filler may be used to increase hardness. A specifically useful hard coat filler is a silica filler, which has good dispersibility in the hard coat composition. The silica is desirably of an average particle size of about 10 nm to 100 µm, and may be untreated, or treated with for example, a silane adhesion promoter. Where used, a filler is used in the hard coat in an amount of 0.1 to 50 wt % of the total weight of the organosiloxane polymer. Other additives include: methyl vinyl cycloalkyl cure retardants which bind the platinum at room temperature to prevent early cure, but release the platinum at higher temperatures to affect cure; ultraviolet absorbers (UVA's) such as, for example, benzotriazoles and hydroxybenzophenones, silylated UVA's such as 4,6-dibenzoyl-2-(trialkoxysilylalkyl)resorcinols (such as described in U.S. Pat. No. 5,391,795 to Pickett) and 4-(γ-triethoxysilane)propoxy-2-hydroxybenzophenone (such as those described in U.S. Pat. No. 4,373,061 to Ching). UV absorbers, where used, may be included in the composition used to form the UV absorbing layer in an amount of 0.2 to 10 wt %, based on the total weight of the coating composition. In another embodiment, a coating composition is a UV absorbing layer comprising polycarbonate, and additional polymer such as, for example, PCCD. Additives, where used, may be present in an amount of 0.1 to 20 wt %, based on the total weight of the polymer.

The hard coat composition further comprises a solvent, such as water, or a branched or straight chain $C_{1-12}$ alcohol, ether alcohol, diol, polyol, or ether-acetate, or other $C_{1-12}$ organic solvent miscible with these alcohols.

Once coated, the hard coat layer is dried to form the uncured hard coat, and can be cured thermally, or by photo initiation wherein the hard coat composition comprises a photolytic cure catalyst and curable groups reactive with the cure catalyst.

The hard coat can also comprise a primer layer which is disposed on the article to be coated prior to the hard coat layer. Useful primer layers include those based on copolymers comprising $C_{1-12}$ alkyl(meth)acrylates, (meth)acrylic acid, substituted methacrylates such as hydroxyalkyl(meth)acrylates, silane substituted methacrylates including alkoxysilane substituted methacrylates, epoxy-substituted methacrylates, and the like. Other non-(meth)acrylate monomers co-polymerizable with the (meth)acrylate monomers including styrenes, $C_{1-12}$ olefins, $C_{1-12}$ vinyl ethers, $C_{1-12}$ (meth)acrylamides, meth(acrylonitrile), and the like.

Exemplary curable (thermosetting) hard coats comprising a hard coat layer and a primer layer include thermally curable silicone hard coat systems AS4700 hard coat layer with FHP470 primer layer, and AS4000 hard coat layer with SHP401 primer layer, both available from GE Silicones. UV curable hard coats may also be used. An example of a UV curable acrylic hard coat would be UVHC 3000 S (also available from GE Silicones). Other exemplary hard coats can be prepared according to the compositions and methods described in U.S. Pat. No. 5,679,820, the disclosure of which is incorporated herein by reference.

In another embodiment requiring additional scratch resistance with the ability to thermoform after hard coating, thermoformable hard coat systems can be used. An example of a thermoformable phenolic hard coat is FMR Clear Coat AEG21153 from Red Spot Paint and Varnish Company. Sheet or film prepared with a coating such as the FMR coating can be thermoformed as described above to give the desired window shape without damaging the hard coat. Other exemplary thermoformable hard coats Examples of suitable thermoformable hard coats can be prepared according to the compositions and methods described in U.S. Pat. No. 6,350,521, the disclosure of which is incorporated herein by reference.

In an embodiment, the thermoplastic composition is used to prepare a window article. As used herein, a "window article" comprises a frame, and a sheet supported by the frame. Also as disclosed herein, "sheet" can mean a shaped or unshaped sheet, and may further mean a molded or extruded article of substantially uniform thickness and which is unshaped or is further shaped. Also as disclosed herein, "supported by" means wherein the window article is in contact with and is fixed or movable with respect to the frame, and where the frame can be fixed or movable with respect to a surrounding element (such as, for example, a fuselage of an aircraft), such that the frame is intervening between the window article and surrounding element, and the sheet does not directly contact the surrounding element. In an embodiment, a window comprises the window article. In an embodiment, window articles can be a component of a window for an aircraft, a train, a ship, a bus, or the like. In another embodiment, the window article can be a window for an aircraft, a train, a ship, a bus, or the like. In exemplary embodiments, the window article is used in a military aircraft, such as for the canopy of a jet fighter aircraft, or in aircraft windows for commercial passenger aircraft. Window articles can be transparent, translucent, or opaque, and can be fixed or movable relative to the window. In an embodiment, a window article can be a transparent or opaque interior covering for an aircraft window. An exemplary transparent window article is a "dust cover", which is fixed relative to the window. In another embodiment, an opaque window article that is movable relative to the window is a window shade.

In an embodiment, a transparent window article is an interior covering, also referred to herein as a "dust cover" for the interior section of an aircraft window. The dust cover can be used for aircraft windows for a commercial or non-commercial (i.e., military) passenger aircraft, or for a cargo transport aircraft as desired. Such aircraft windows can comprise at least three elements: an outer window, an inner window, and the dust cover. In an embodiment, in FIG. 3, a window for a commercial aircraft 300 comprises an outer window 310, an inner window 320, and a dust cover 330. The outer window 310 and inner window 320 are generally thicker than the dust cover 330 and are thus engineered to be load bearing where the outer window 310 and the inner window 320 are structural members of the fuselage of the aircraft. The outer window 310 is additionally part of the pressurized envelope of the aircraft fuselage. The dust cover 330 protects the inner window 320 and outer window 310 from damage.

Figure 3:
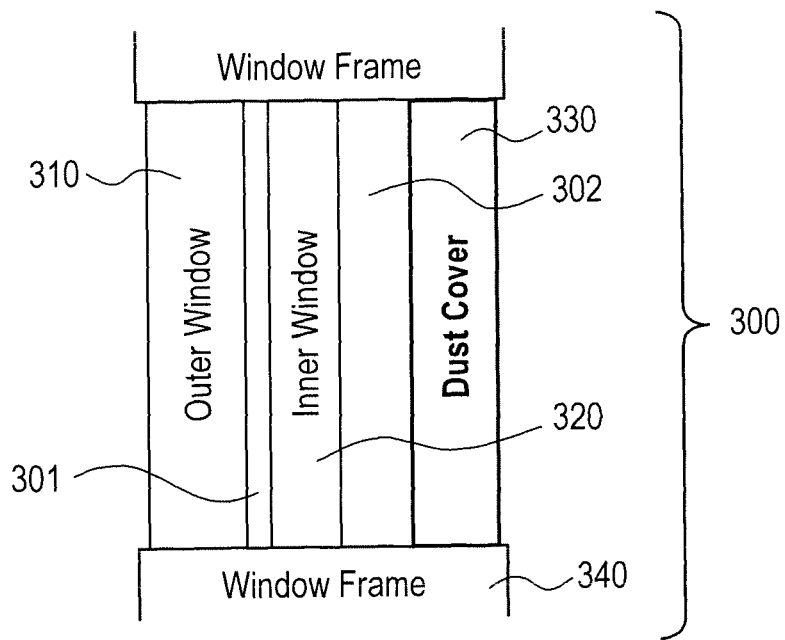
FIG. 3 is a diagram of a window article for an aircraft.

Also in FIG. 3, the inner window 320 and outer window 310 are typically made from an acrylic polymer composition. The dust cover 330 is prepared from a flame retardant polycarbonate such as that of the thermoplastic composition described herein. It may be advantageous to hard coat the polycarbonate dust cover 330 to increase the scratch resistance of the dust cover 330, and to thereby increase the interior transparency, hardness, and smoke release capability of dust cover 330. Inner window 320 and outer window 310 are separated by a space 301, and inner window 320 and dust cover 330 are also separated by a space 302. The outer window 310, inner window 320, and dust cover 330 are each contacted by their edges to a frame 340, such that the frame 340 provides support for and holds in place the outer window 310, inner window 320, and dust cover 330. In another embodiment, windows structures for commercial aircraft may also further contain a moveable shade (not shown) that allows the passenger to unit outside light.

Figure 4:
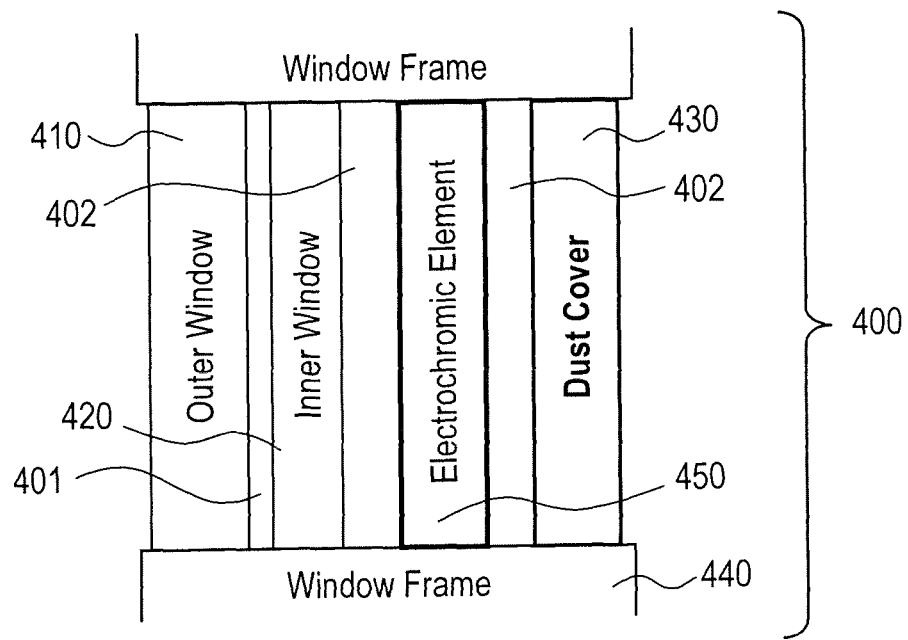
FIG. 4 is a diagram of a window article for an aircraft.

In another embodiment, new designs for commercial passenger aircraft can comprise at least four major elements. In FIG. 4, a new design comprises an outer window 410 comprising a transparent material, an inner window 420 comprising a transparent material, and dust cover 430. The outer window 410 and inner window 420 are thicker and are engineered to be load bearing, where at least the outer window element a part of the pressurized envelope of the aircraft fuselage. However, the dust cover 430 is prepared from a flame-retarded polycarbonate (i.e., the thermoplastic composition). It may be advantageous to hard coat the polycarbonate dust cover 430 to increase the scratch resistance of the dust cover 430, and to thereby increase the interior transparency, hardness, and smoke release capability of the dust cover 430. Inner window 420 and outer window 410 are separated by a space 401, and inner window 420 and dust cover 430 are also separated by a space 402. The outer window 410, inner window 420, and dust cover 430 are each contacted by their edges to a frame 440, such that the frame 440 provides support for and holds in place the outer window 410, inner window 420, and dust cover 430. The frame 440 holding the outer window 410 and the inner window 420 may be the same as or different from the frame holding the dust cover 430. The "dust cover" protects the inner and outer element from damage. In lieu of a moveable shade to unit the light, an electrochromic element 450 can be included. In an example, the electrochromic element 450 can be inserted between the inner window 420 and the dust cover 430, in space 402. Such dimmable windows have been announced commercially for the 787 aircraft by PPG Aerospace.

On commercial passenger aircraft, materials, and articles prepared therefrom including window articles, for the interior often are required to pass the OSU 65/65 heat release requirements. Although the dust covers are typically prepared from flame-retarded polycarbonate they are, for reasons disclosed hereinabove, still incapable of passing the OSU 65/65 requirements. A dust cover comprising the thermoplastic composition is capable of meeting at least the OSU 65/65 requirement.

The thermoplastic composition for use in the dust covers can further be tinted using standard dyes and pigments know to be effective in use with polycarbonate. The thermoplastic composition can be formed into the dust cover by extrusion of sheet (followed by optionally thermoforming) or injection molding. Optionally where needed the dust cover can be hard coated one or both sides using the hard coat and primer layers described above. The hard coats can be applied to the sheet after extrusion or to the formed window. The dust cover has a thickness of about 1 to about 4 mm.

The thermoplastic composition may also be used to form multilayer sheets or films. Such multilayer sheets or films may be opaque, transparent, or luminant (i.e., translucent). Sheet articles that generate or release only low levels of heat and smoke when exposed to a flame are useful in the transportation industry (aircraft, marine, rail) since the use of such materials increases the time available for the occupants of, for example, an airplane, to escape in event of a fire. Sheet articles may have substantial resistance to color shift or hazing when exposed to UV light. Also depending on the application, the articles may have various levels of opacity, transparency, and diffusive nature. Depending on the service of the part, differing levels of scratch resistance are also required. Finally, depending on the part geometry, the sheet or film may be thermoformed to provide the final shape of an article prepared from the sheet.

For multilayer sheets used in the transportation industry, the heat release rate is typically measured and regulated by the OSU test described herein (FAR/JAR 25.853 Amendment 25-83 Part IV). For many applications, materials need to have a rating of 65/65 (2 min/peak heat release rate). In some applications a rating of 55155 is required. In the transportation industry, the smoke density is typically measured and regulated by the ASTM E-662 test (FAR/JAR 25.853 Amendment 25-83 Part V FAA Smoke Density). For many applications, materials also must have a smoke density of less than 200. A sheet prepared using the thermoplastic composition having such heat release performance may be said to be OSU compliant, and may comprise at least one such OSU compliant layers.

In addition to the heat release, smoke, and toxic gas emission criteria described hereinabove, the sheet may have a low yellowness index (YI), and hence good color capability. The sheet can be tinted or colored as needed, and has good color stability when exposed to UV light. Such as sheet desirably has good color capability, The sheet may have good luminance in which the transparent sheet provides a high level of transmission of incident light (such as for example natural light through a window or skylight, or artificial light) with a minimum light loss by reflectance or scattering, where it is not desirable to either see the light source or other objects on the other side of the sheet or film. A sheet having a high degree of hiding power (i.e., luminance) allows a significant amount of light through, but is sufficiently diffusive so that a light source or image is not discernable through the panel. Luminance may be provided in a sheet by addition of a diffusive agent such as Tospearl® polymethylsilsesquioxanes available from GE Silicones, crosslinked PMMA, or low levels of $TiO_2$, added to either the thermoplastic composition used in the OSU compliant layer and/or the UV blocking layer. A diffusive sheet is therefore useful for preparing diffusive components where good luminance (translucence) from the outside or a light source is desired, but where it is not desirable to either see the light source or other objects on the other side of the sheet. The diffusive sheet can be thermoformable, and can comprise a thermoformable hard coat layer or non-thermoformable hard coat layer. Such sheet or film may be suitable for the manufacture of luminant components such as skylights, windows, diffusive partitions, lighting, and optical displays.

The sheet can be a multilayer sheet. A layer added to the OSU compliant layer may be a UV blocking layer comprising a thermoplastic and an ultraviolet absorber (UVA). In an exemplary embodiment, the UV blocking layer comprises a polycarbonate layer which includes a homopolycarbonate, copolycarbonate, a branched polycarbonate, or a combination comprising at least one of the foregoing polycarbonates. Optionally, the UV blocking layer may contain an effective amount of a flame retardant, as previously described. In a specific embodiment, where improved chemical resistance is needed, the UV blocking layer comprises a blend of a polycarbonate with a polyester, such as PCCD. The UV blocking layer also includes at least one UVA, such as, for example, benzotriazoles, o-hydroxybenzophenones, dibenzoylresorcinols, cyanoacrylates, triazines, formamidines, oxanilides and benzoxazinones. Other UVA's may be used without limitation. In a specific embodiment, a UV blocking layer has a thickness 10 to 250 μm. In another specific embodiment, the UV blocking layer comprises 2 to 10 wt % UVA based on the total weight of thermoplastic. In another specific embodiment, the UV blocking absorber is co-extruded on one or both surfaces side of the multilayer sheet or film.

The multilayer sheet or film may be coated with a hard coat to provide a higher level of scratch resistance than would be obtained for the uncoated multilayer sheet or film, thereby making the sheet or film scratch and mar resistant by addition of the hard coat. Optionally, the multilayer sheet or film can be coated with a hard coat layer on one or both sides of the multilayer sheet or film to increase the scratch or chemical resistance of the film or sheet.

In an embodiment, the sheet or multilayer sheet can have a color shift of less than or equal to 4 yellowness index (YI) units when exposed to UV light, or in other words, the change in yellowness index dYI can be less than or equal to 4, as measured according to ASTM D11925-70.

Aromatic arylates are highly reactive to light yielding the photo-Fries reaction as shown in formulas (10) and (11) above, which provides a weatherable surface layer which includes the material of formulas 10 and 11. Where the sheet is a hard coated multilayer sheet, the layer of the hard coated sheet that comprises the thermoplastic composition can undergo photo-Fries reaction at the interface of the hard coat and thermoplastic composition, and loss of adhesion between the hard coat and aromatic arylates (of the ITR layer) can occur. It is believed that the ITR units can become less polar upon rearrangement and hence can reduce adhesion to an adjoining layer after photo-Fries rearrangement.

Suppression of the photo-Fries formation (and hence yellowing) in sheets or multilayer sheets can be accomplished by adding UVAs or UVAs and a bleachable yellow dye to the thermoplastic composition of the OSU compliant layer. Another method for mitigating or preventing yellowing caused by the photo-Fries rearrangement includes applying a hard coat containing a UV stabilizer present in it which is known to protect polycarbonates (U.S. Pat. No. 6,350,521; see Table 2; and herein incorporated by reference), to the sheet. It has been found that by selection of the UVA, UVA concentration, and thickness of the UVA cap layer, a sheet can be prepared that passes the OSU test, has high light transmission, and has a low YI shift upon exposure to UV light. Desirable cap-layers (including hard coat layers) have the ability to absorb UV light and mitigate or prevent the photo-Fries rearrangement and dYI in the OSU compliant layer; have minimal color shift in the coating layer itself; and provide low color, high transmission OSU compliant sheets without significantly adversely affecting the heat release rate (OSU) properties of the sheets, multilayer sheets, or articles prepared therefrom.

The multilayer sheet or film may be prepared by coextrusion, laminating, calendaring, or injection molding, or other method suitable for preparing a multilayer sheet or film. In a specific embodiment, the multilayer sheet or film is prepared by coextrusion. Articles may be prepared from such sheets or films for the aircraft, marine, or rail transportation industries where low heat release materials and articles are desirable, and may be shaped from the sheets or films to form an article of the desired shape using standard thermoforming techniques. Different articles may be prepared using the different types of sheets or films as described above. For example, opaque articles prepared from opaque sheets include sidewalls and ceilings panels, other flat panels, or specific thermoformed parts such as contoured panels, hatches, bins, bin doors, and the like. Transparent articles prepared from transparent sheets have a high light transmittance and/or low degree of haze. Transparent articles include for example skylights, windows, transparent partitions, lighting and optical displays. Such articles may alternatively have good luminance (i.e., may be translucent), and may be prepared from sheets or films having high luminance. The articles may be flat or have various levels of curvature. Articles having curvature are desirably prepared using thermoformable sheets.

Figure 5:
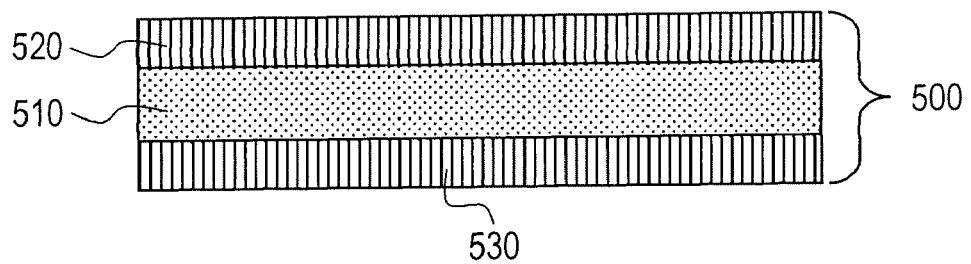
FIG. 5 is a diagram of a multilayer sheet or film.

In an embodiment, a multilayer sheet or film 500 comprises an OSU compliant layer 510 comprising the thermoplastic composition (which meets at least the heat release criteria disclosed herein), and a UV blocking layer 520 disposed on a surface of the OSU compliant layer 510 (as shown in FIG. 5). The OSU compliant layer 510 can further meet the smoke test or toxicity testing requirements disclosed herein, and generates or releases only low levels of both heat and smoke when exposed to a flame. Further, in an embodiment, the OSU compliant layer 510 may release only low levels of toxic gases when exposed to a heat and or flame. UV blocking layer 520 is UV stable such that it does not substantially shift in color on exposure to UV light of a wavelength of 275 to 410 nm. In addition, the UV blocking layer 520 is of a sufficient thickness to provide the desired UV protection to substantially prevent the incident light from causing the Photo-Fries rearrangement in the OSU compliant layer 510, but is present in a film thickness that does not cause the multilayer sheet or film 500 to fail the OSU, toxicity testing, or smoke testing requirements. In a specific embodiment, a second UV blocking layer 530 is optionally co-extruded on the side of the OSU compliant layer opposite the first UV blocking layer.

In another embodiment, the multilayer sheet or film may comprise an additional layer (not shown) on a side of the OSU compliant layer 510 opposite UV blocking layer 520. In a specific embodiment, the additional layer is a UV blocking layer. In another embodiment, the OSU compliant layer 510 has a reflective layer disposed on a side opposite the UV blocking layer 520. In another embodiment, the OSU compliant layer 510 has a reflective layer disposed between the OSU compliant layer 510 and UV blocking layer 520.

Figure 6:
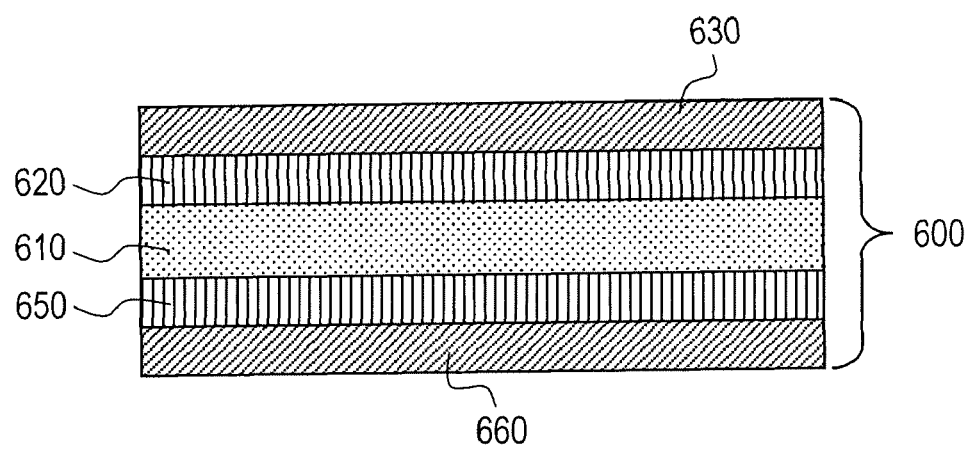
FIG. 6 is a diagram of a multilayer sheet or film.

In another embodiment, a multilayer sheet or film 600 comprises an OSU compliant layer 610 comprising the thermoplastic composition (which meets at least the heat release criteria disclosed herein), a UV blocking layer 620 disposed on a surface of the OSU compliant layer 610, and a hard coat layer 630 disposed on a surface of the UV blocking layer 620 opposite the OSU compliant layer 610 (as shown in FIG. 6). The hard coat layer 630 may further comprise a primer layer (not shown) disposed between the hard coat 630 and the UV blocking layer 620. Desirably, the OSU compliant layer 610 further meets the smoke test or toxicity testing requirements disclosed herein, and generates or releases only low levels of both heat and smoke when exposed to a flame. Further, the OSU compliant layer 610 releases only low levels of toxic gases when exposed to a heat and or flame. The UV blocking layer 620 is UV stable such that it does not substantially shift in color on exposure to UV light of a wavelength of 275 to 410 nm. In addition, the UV blocking layer 620 is of a sufficient thickness to provide the desired UV protection to substantially prevent the incident light from causing the Photo-Fries rearrangement in the OSU compliant layer 610, but is present in a film thickness that does not cause the multilayer sheet or film 600 to fail the OSU, toxicity testing, or smoke testing requirements. The UV blocking layer 620 may, in an embodiment, comprise a polycarbonate homopolymer, polycarbonate copolymer, branched polycarbonate, or a blend comprising at least one of the foregoing polycarbonates. Optionally, the UV blocking layer can contain an effective amount of a flame retardant, as previously described. In a specific embodiment, where improved chemical resistance is needed, the UV blocking layer comprises a blend with a polyester, such as PCCD. Hard coat layer 630 is added to provide a scratch and mar resistance to the sheet or film, and can be applied to one or both sides. In an exemplary embodiment, suitable hard coats include AS4000 or AS4007 silicone hard coats, both available from GE Silicones.

The multilayer sheet or film 600 may be prepared by coextrusion, laminating, calendaring, or injection molding, or other method suitable for preparing a multilayer sheet or film. In a specific embodiment, the multilayer sheet or film is prepared by coextrusion. Further, the hard coat layer 630 as disposed on the UV blocking layer 620 can also be coextruded, spray coated, dip coated, curtain coated, and the like, or otherwise coating using a suitable coating method for providing a hard coat. The hard coat layer, when applied using an application method such as spray coating dip coating, curtain coating, or the like, may be subsequently dried by air drying, oven drying, vacuum drying, or a combination of these to form a pre-cured layer. The pre-cured layer is then cured to form the hard coat layer using thermal cure, radiation cure, or a combination comprising at least one of these, to effect the cure of the hard coat layer 630. The multilayer sheet or film 600 may be thermoformed. In an embodiment, the hard coat layer 630 is partially cured prior to thermoforming the sheet or film, and the hard coat layer is fully cured during or after thermoforming. In another embodiment, the hard coat layer 630 is applied to a partial sheet or film comprising OSU compliant layer 610 and UV blocking layer 620. In another embodiment, the multilayer sheet or film 600 may optionally comprise an additional layer 650 on a side of the OSU compliant layer 610 opposite UV blocking layer 620. In an embodiment, the additional layer is a UV blocking layer. In another specific embodiment, the multilayer sheet or film may further optionally comprise a second additional layer 660. In another embodiment, the second additional layer is a hard coat.

In a specific embodiment, a multilayer sheet or film 500 is an opaque sheet. For the opaque sheet, pigments and colorants can be added to either the OSU resin layer or the UV blocking layer, or both. In addition, fillers such as, for example, glass and/or mica can be added to one or more of these layers. Addition of such fillers may also increase the modulus of the OSU layer and thereby can increase the modulus of the sheet, whereas addition of fillers to the UV blocking layer can decrease the gloss of sheet. In another specific embodiment, a multilayer sheet or film 600 is a scratch and mar resistant opaque sheet with substantially the same properties as the above opaque sheet, except that the sheet comprises a hard coat. The hard coat may be applied to one or both exposed sides of the opaque sheet, and desirably does not significantly adversely affect the properties of the opaque sheet.

In another specific embodiment, a multilayer sheet or film 600 is an opaque sheet having a hard coat 630, wherein the hard coat is thermoformable.

In another specific embodiment, the multilayer sheet or film 500 is a transparent sheet having a high transparency by having either a high percent transmittance or a low haze. For the transparent sheet, low levels pigments and colorants can be added to either the OSU resin layer or the UV blocking layer or both. In another specific embodiment, the multilayer sheet 600 is a scratch and mar resistant, transparent sheet comprising a thermally cured hard coat. In applications in which UV is expected from both sides of the sheet, the UV absorbing layer can be applied to both sides of the sheet. This is also useful to prevent the installation of the incorrect side of the sheet towards the UV light. In an exemplary embodiment, suitable hard coats include AS4000 (and primer SHP401) or AS4007 (and SHP470) silicone hard coats, both available from GE Silicones. In another specific embodiment, a multilayer sheet or film 600 is a scratch and mar resistant formable transparent sheet comprising a thermoformable hard coat layer 630.

In another embodiment, the multilayer sheet or film 500 comprises a thermoformable, diffusive sheet having a high degree hiding power in combination with good luminance. For the diffusive sheet, low levels pigments and colorants can be added to either the OSU compliant layer 510 or the UV blocking layer 520 or both. To obtain the diffusive optical requirements the appropriate about of a diffusive agent can be added to either the OSU layer and/or the UV blocking layer.

In another specific embodiment, a multilayer sheet or film 600 is a scratch and mar resistant, diffusive sheet comprising a hard coat layer 630 that is thermally curable. In another specific embodiment, a multilayer sheet comprises a scratch and mar resistant formable, diffusive sheet comprising a hard coat layer 630 that is thermoformable.

In another specific embodiment, a plastic mirror comprising the polysiloxane copolymer composition is also provided. The plastic mirror 700 comprises a sheet 710, a hard coat 720 disposed on a surface of the sheet, and a metal layer 730 disposed on a surface of the sheet opposite the hard coat 720. The hard coat may further comprise a primer layer (not shown) disposed between the hard coat 720 and the sheet 710. Optionally, in some embodiments, there is a UV layer (not shown) disposed between the hard coat 720 and the sheet 710. In an embodiment, the metal layer comprises aluminum, wherein the aluminum is applied to the sheet using a method designed to provide a high optical quality such as, for example, sputtering or vapor deposition performed under high vacuum. In another embodiment, the metal layer has a thickness of 2 to 50 nm. In another specific embodiment, a protective layer 740 can optionally be applied a surface of the metal layer opposite the OSU compliant layer 710, to protect the metal layer from abrasion.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: (a.) Providing a single or multi-layer thermoplastic substrate having optionally at least one colors on the surface, for instance, using screen printing or a transfer dye; (b.) Conforming the substrate to a mold configuration such as by forming and trimming a substrate into a three dimensional shape and fitting the substrate into a mold having a surface which matches the three dimensional shape of the substrate; (c.) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including but not limited to heat-setting, texturing, embossing, corona treatment, flame treatment, plasma treatment and vacuum deposition may further be applied to the above articles to alter surface appearances and impart additional functionalities to the articles.

Other shaped, formed, or molded articles comprising the thermoplastic composition are also provided. The thermoplastic composition may be molded into useful shaped articles by a variety of methods such as injection molding, extrusion, rotational molding, blow molding and thermoforming. Articles prepared from these resins include injection-molded parts such as aircraft parts including oxygen mask compartment covers; and thermoformed and non-thermoformed articles prepared from sheets of thermoplastic such as: light fixtures; lighting appliances; light covers, cladding or seating for public transportation; cladding or seating for trains, subways, or buses; meter housings; and like applications. Other specific applications include opaque articles that may be prepared from the polysiloxane copolymer composition, such as, for example, window shades (injection molded or thermoformed), air ducts, compartments and compartment doors for storage, luggage, seat parts, arm rests, tray tables, oxygen mask compartment parts, air ducts, window trim, and other parts used in the interior of aircraft, trains or ships; transparent applications include windows for transportation applications (aircraft, rail, marine), transparent partitions, sight glasses, see-through doors, covers for gauges, display films, film used in lighting applications, and other transparent parts requiring OSU 65/65 ratings; and translucent articles include window shades, windows, display's or display film, film used in lighting applications. Additional fabrication operations may be performed on articles, such as, but not limited to molding, in-mold decoration, baking in a paint oven, lamination, hard coating, and/or thermoforming. In an embodiment, multi-layer structures, such as 100, 200, 300, 400, 500 and 600, as shown in FIGS. 1 to 6, can be used as extruded lighting covers.

In an embodiment, the thermoplastic composition and articles comprising the thermoplastic composition, including a sheet, window article, window, and other articles disclosed herein may exhibit at least one of the following desirable properties: a 2 minute integrated heat release rate of less than or equal to 65 kilowatt-minutes per square meter (kW-min/m$^2$), specifically less than or equal to 55 kW-min/m$^2$, and a peak heat release rate of less than 65 kilowatts per square meter (kW/m$^2$), specifically less than or equal to 55 kW/m$^2$ as measured using the method of FAR F25.4, in accordance with Federal Aviation Regulation FAR 25.853 (d); a percent haze of less than or equal to 10%, more specifically less than or equal to 5%, and more specifically less than or equal to 3%, when measured at a thickness of 2.0±0.12 mm according to ASTM D1003-00; a melt volume ratio (MVR) of 1 to 25, more specifically 2 to 20 cm$^3$/10 minutes, measured at 300° C. under a load of 1.2 kg in accordance with ISO 1133; a heat deformation temperature (HDT) of 110 to 170° C. when measured at 0.455 mega-Pascals (MPa) according to ISO 179; or a Notched Izod Impact (NII) strength of 160 to 1,000 Joules per meter (J/m), when measured according to ASTM D256-04 at 23° C. The thermoplastic composition may further have a % tensile elongation of 30 to 120%, when measured in accordance with ASTM D256-04. Further, the thermoplastic composition may have a yellowness index (YI) of less than or equal to 15, as measured according to ASTM D1925-70 on 2.0±0.12 mm thick test specimens.

In another embodiment, a core layer material may be formed which comprises discontinuous, randomly oriented reinforcing fibers bonded together using a thermoplastic composition comprising the polysiloxane copolymer composition. In an exemplary embodiment, the thermoplastic composition is initially formed into particles having a desired shape and size, and which are dispersed randomly with the discontinuous reinforcing fibers, and thermally treated to melt and flow the thermoplastic composition such that the thermoplastic composition adheres adjoining fibers together upon cooling. In this way, an interconnected network of fibers and thermoplastic composition can be formed, which has an amount by weight of thermoplastic composition high enough to effect bonding but low enough to avoid densifying the core material to a solid mass. The network so prepared has high loft and low density of the structure, compared to a densified structure having a higher level of thermoplastic composition.

In an embodiment, a manufacturing process comprises initially applying a dispersed medium comprising particles of the thermoplastic composition comprising the polysiloxane copolymer composition, and discontinuous reinforcing fibers, to a porous surface, and removing excess of the dispersed medium. The excess dispersed medium can be removed by suctioning through the porous surface by applying vacuum to a side of the porous surface opposite the side having the dispersed medium disposed thereon.

Particles of the polysiloxane copolymer composition, as included in the dispersed medium, have a desirable upper and lower size limit. For optimal manufacturing, a substantial portion of the particles have the desired size. As used herein, "substantially portion" means that greater than or equal to 80%, specifically greater than or equal to 85%, and most specifically greater than or equal to 90% of the particles of polysiloxane copolymer composition are of a size useful in the manufacture of the core material. Particle size control is useful for controlling consistency and quality, defectivity, mechanical properties, and yield in the core material or a composite comprising the core material, by allowing the formation of a fibrous mat comprising uniformly dispersed polysiloxane copolymer composition and discontinuous reinforcing fibers.

The upper size limit has been observed to be approximately the largest particle size that allows the polysiloxane copolymer composition to bond adequately with the reinforcing fibers, and that can provide rapid, uniform melting characteristics on the time scale of the bonding process. The particles are additionally of a size and shape that allows formation of a foam or a slurry in a manufacturing process. Particles may be substantially uniform in shape, having a spheroid, unit, linear, curvilinear, or irregular shape, and meet the criteria for the upper particle size. Particles may also have a larger second dimension in addition to a smaller first dimension, wherein adding the larger second dimension may improve contact with reinforcing fibers. The lower particle size limit is observed to be the particle size that occludes pores in the porous surface (e.g., a porous conveyor belt), on which the fibrous mat is formed. Particle sizes commensurate with the pore diameter of the porous surface can cause blockage of the pores that prevents the proper draining of liquid during vacuum removal of excess dispersed medium during formation of the fibrous mat. Particles are large enough that they do not unit the pores of the porous surface but instead are captured by the fibrous mat. In an exemplary embodiment, particles may have a first dimension of 0.02 to 1.5 millimeters (mm), a second dimension of 0.02 to 30 mm, a total volume or not more than 30 cubic mm, and a surface area to volume ratio greater than about 4:1.

Particles of the polysiloxane copolymer composition may be formed by conventional means, such as by grinding of extruded or molded polysiloxane copolymer composition. Ground particles of the desired size range may be prepared by control of the grinding process to reduce the incidence of fine particulates of less than the lower particle size limit. Outlier particles may be removed mechanically by sieve, filtration, or other means, or removed as flow-through waste or other by-product of the manufacturing process. Alternatively, particles of the polysiloxane copolymer composition may be prepared by cutting or shaving a mass of the polysiloxane copolymer composition into slivers where the mass of the polysiloxane copolymer composition is a sheet, unit, bar, ribbon, or layered structure. The mass of polysiloxane copolymer composition may specifically comprise a bar that is turned or reciprocated in engagement with a cutting tool to generate the slivers. The slivers can have a first dimension and a second dimension suitable to the use described hereinabove. In another method, particles of a suitable size may be formed by cutting or chopping a fine diameter extrudate of the polysiloxane copolymer composition into desired lengths along the axis of extrusion. It will be understood that the methods of forming particles provided herein are exemplary, and the preparation of particles is not to be considered as limited to these methods.

Reinforcing fibers are used in combination with the polysiloxane copolymer composition. The reinforcing fibers may be glass, a compatible non-glass material, or a combination of these. As used herein, the term "compatible non-glass material" refers to a non-glass material having at least surface adhesion and wetting properties similar to those of glass, which will allow for uniform dispersion of and bonding with reinforcing fibers and the polysiloxane copolymer composition. In one embodiment, the reinforcing fibers are discontinuous, in the form of single discrete fibers. Where glass fibers are used and are received in the form of chopped strand bundles, the bundles are broken down into single fibers before the structure is formed.

Typically, discontinuous reinforcing fibers as used to form the core material can be greater than or equal to 3 millimeters in the longest dimension, where shorter reinforcing fibers do not provide adequate reinforcement in the core material, composite comprising the core material, and ultimately in a molded article prepared from one of these. Discontinuous reinforcing fibers can be generally less than or equal to 50 mm in the longest dimension, where longer fibers are difficult to handle in the manufacturing process for the core material. Specifically, discontinuous reinforcing fibers are 3 to 25 mm, more specifically 4 to 15 mm, and still more specifically 5 to 13 mm in the longest dimension. In addition, the discontinuous reinforcing fibers may be 2 to 16 micrometers (μm) in diameter. Where discontinuous reinforcing fibers are used to confer a greater degree of structural strength, the diameter of the discontinuous fibers may be less than or equal to 13 micrometers. Discontinuous reinforcing fibers having a diameter of greater than 16 micrometers may be less efficient on a per-unit weight basis than thinner fibers in reinforcing the plastics matrix after molding.

Reinforcing fibers that are useful includes those formed from glass. Lime-aluminum borosilicate glass that is soda-free ("E" glass) is useful. In addition, carbon fibers, ceramic fibers, aramid fibers such as those sold under the trade names Kevlar® and Nomex®, stainless steel fibers, and metal coated graphite fibers can also be used. Suitable reinforcing fibers generally include fibers having a modulus higher than 10 GigaPascals (GPa).

The ratio of polysiloxane copolymer composition to discontinuous reinforcing fiber may be varied according to the properties desired of the core material, and to the composite that can be prepared therefrom. The weight ratio of discontinuous reinforcing fiber to polysiloxane copolymer composition in the core material can be 20:80 to 70:30, specifically 25:75 to 65:35, and more specifically 30:70 to 60:40. A higher proportion of reinforcing fiber to polysiloxane copolymer composition is used where both a higher degree of stiffness and strength, and a more porous structure, is desired in the core material.

The particulate polysiloxane copolymer composition and the fiber component are combined in a liquid medium to form a dispersed medium. As used herein, the term "dispersed medium" refers to the combination of particles of polysiloxane copolymer composition and discontinuous reinforcing fiber, wherein the particles of the polysiloxane copolymer composition are substantially uniformly suspended and distributed with the reinforcing fibers throughout the medium. In one embodiment, the combining is performed by introducing the particulate polysiloxane copolymer composition and the discontinuous reinforcing fiber into an aqueous medium to provide a dispersed medium. The dispersed medium may be a slurry, dispersion, suspension, foam, or emulsion. The combining is performed so as to render the polysiloxane copolymer composition substantially evenly dispersed with the discontinuous reinforcing fibers in the aqueous medium, and may use agitation to establish and maintain the dispersion of these components. The dispersed medium may further comprise additives such as dispersants, buffers, anti-coagulants, surfactants, combinations comprising one or more of these, and the like, to adjust or improve the flow, dispersion, adhesion, or other properties of the dispersed medium. Specifically, the dispersed medium can be a foamed suspension comprising particles of the polysiloxane copolymer composition, discontinuous reinforcing fibers, water, and a surfactant.

The percentage by weight of solids (wt %) of the dispersed medium, comprising the polysiloxane copolymer composition and the discontinuous reinforcing fibers can be from 1 to 99 wt %, specifically 2 to 50 wt %. Additives may be present in an amount effective for imparting desired properties of foaming, suspension, flow, and the like.

The dispersed medium may be prepared in batch mode, and used directly or stored for later use. The dispersed medium may alternately be formed in a continuous manufacturing process wherein the polysiloxane copolymer composition particles and discontinuous reinforcing fibers are each combined to form the dispersed medium at a time just prior to the use of the dispersed medium.

In an embodiment, the dispersed medium is applied as a slurry to a porous surface, and the liquid and suspended components too small to remain on the porous surface are removed through the porous surface by use of vacuum, to leave a fibrous mat comprising a dispersion of particles of the polysiloxane copolymer composition and the discontinuous reinforcing fibers, on the porous surface. In an exemplary embodiment, the porous surface is a conveyor belt having pores, and of dimensions suitable to provide, after application of the dispersed medium and removal of liquid, a fibrous mat having a width of 2 meters and of continuous length. The dispersed medium may be contacted to the porous surface by distribution through a head box, which provides for application of a coating of the dispersed medium having a substantially uniform width and thickness over the porous surface. Typically, vacuum is applied to the porous surface on a side opposite the side to which the dispersed medium is applied, to draw the residual liquid and/or small particles through the porous surface, thereby providing the fibrous mat in substantially dried form. In an embodiment, the fibrous mat is dried to remove moisture by passing heated air through the fibrous mat.

Upon removal of the excess dispersed medium and/or moisture, the non-bonded, fibrous mat comprising the polysiloxane copolymer composition and the discontinuous reinforcing fibers is thermally treated to form a core material. In an embodiment, the fibrous mat is heated by passing heated air through the fibrous mat in a furnace. In this way, the fibrous mat may be dried using air heated at a temperature of greater than or equal to 100° C. under a flow of air. During heating of the fibrous mat, the polysiloxane copolymer composition melts and flows to form a common contact (e.g., a bridge) between two or more of the discontinuous reinforcing fibers, and forms an adhesive bond with the discontinuous reinforcing fibers upon cooling to a non-flowing state, thereby forming the core material. The hot core material conveyed through a nip roller to form compacted sheets of the core material, and cut into sheets or lengths of the desired size.

The fibrous mat comprising particles of the polysiloxane copolymer composition and reinforcing fiber is porous and allows a hot air furnace to be used for effecting bonding between the dispersed polysiloxane copolymer composition particles and the reinforcing fibers, after which the resulting core material remains porous through additional processing. The fibrous mat as formed on the porous surface comprises a uniform distribution of particles of polysiloxane copolymer composition and discontinuous reinforcing fibers. A binder may additionally be applied before or after bonding the fibrous mat to facilitate handling, to prevent damage to the fragile fiber structure and concomitant loss of fibers. The furnace is used to pass hot gases through the fibrous mat so as to cause the polysiloxane copolymer composition to at least partially soften and adhere to the fibers while bridging between different fibers, thereby bonding the discontinuous reinforcing fibers with the polysiloxane copolymer composition. In this way, a core material is produced, having a porous, interconnected structure that may be rigid, or alternatively flexible, depending on the processing time, temperature, the ratios of polysiloxane copolymer composition to discontinuous reinforcing fiber, and both the type and amount of reinforcing fiber used.

In one embodiment, the fibrous mat is heated sufficiently to cause the polysiloxane copolymer composition to bond the particles of polysiloxane copolymer composition and the discontinuous reinforcing fibers to form a core material having a lofted structure. The core material may be fragile and susceptible to damage and loss of fibers. A binder composition comprising a thermosetting resin may be contacted to the lofted core material, and the binder-treated lofted core material heated to set and prevent loss of discontinuous reinforcing fibers. Thermosetting resins may be used in the binder composition to impregnate the core material, and may include, for example, polyester resins, phenolic resins such as phenol-formaldehyde resin, urea-formaldehyde and melamine-formaldehyde resins, epoxy resins, unsaturated polyesters, polyurethanes, and a combination comprising one or more of these. Suitable binder compositions, concentrations, and processing conditions may be determined by one skilled in the art, and may be selected based on considerations such as desired density of the core material, desired binder composition and loading, ratio of polysiloxane copolymer composition to fiber in the core material, desired processing conditions for the core material, and the like.

The core material may be compacted to condense the structure for ease of storage, transportation, and handling during subsequent processing. The hot core material, subsequent to bonding, is passed through a nip roller to compact the structure, and the compacted core material is cut to the desired size. Compression of the structure of the core material puts tension on the reinforcing fibers, deforming them and locking the deformed fibers in place through the softened but non-flowing polysiloxane copolymer composition. In this way, the components of the core material may adhere to each other, but remain in a strained state after being compacted. Subsequent application of a sufficient amount of heat to the compacted core material is used to soften the polysiloxane copolymer holding the strained fibers in a compacted state, releasing the strain, and thus restore the lofted structure of the core material. Sufficient heat may be applied during a subsequent molding of the compacted core material to both form the core material into a desired shape and simultaneously restore the lofted structure. In one embodiment, the molding of a compacted core material is carried out at 190 to 205° C., a temperature sufficient to effect both molding and lofting of the compacted core material.

In an embodiment, prior to entering the nip roller, the core material may have one or more sheets of thermoplastic material, such as a scrim layer, applied to it. The scrim layer may be porous or non-porous. The core material and additional layer are then simultaneously laminated upon passing the hot core material through the nip roller, to form a composite.

Layers of thermoplastic material, woven and non-woven fabrics, and the like, may optionally be laminated to the porous web to form a composite structure having two or more layers. Lamination is effected by feeding one or more optional top layers of material, and/or one or more bottom layers of material, such as for example a scrim layer, into the nip roller simultaneously with the fibrous mat. The nip roller, which may be cooled by circulation of water through the rollers, can provide temperature control for the heated structure during application of pressure, and thus during formation of the composite. The roller pressure for compressing and/or compacting the fibrous mat and/or additional layers can be adjusted to maximize the final properties of the structure. In this way, layers such as adhesion layers, barrier layers, scrim layers, reinforcement layers, and the like, or a combination comprising at least one of the foregoing layers, may be applied to the core material. The layers may be continuous sheets, films, woven fabric, nonwoven fabric, and the like, or a combination comprising at least one of the foregoing. Materials useful for the layers include polyolefins such as polyethylene, polypropylene, poly(ethylene-propylene), polybutylene, adhesion-modified polyethylenes, and the like; polyesters, including polyethylene terephthalate, polybutylene terephthalate, PCTG, PETG, PCCD, and the like; polyamides such as nylon 6 and nylon 6,6, and the like; polyurethanes, such as pMDI based polyurethanes; and the like; or a combination comprising at least one of the foregoing.

The core material or composite prepared therefrom, so treated with heat and pressure, may be rolled, folded, or formed into sheets. The composite may be cut or rolled to an intermediate form. The cut core material and/or the composite may be molded and expanded to form an article of a desired shape, for use in manufacture of further articles. The intermediate rolled, folded, or sheeted core material or composite may further be molded into an article of a suitable shape, dimension, and structure for use in further manufacturing processes to produce further articles. The core material or, after lamination, the compacted composite, may remain in a compacted state (having a low loft and reduced insulating capability), until subject to thermoforming or other sheet molding process which include a heat treatment. Such processes, when applied to the core material or composite, release stresses present in the compacted structure and re-loft the fibrous structure. The re-lofted structure has significantly improved insulating capability over the corresponding unlofted (i.e., compacted) structure. In an embodiment, heat treatment during molding and simultaneous release of strain in the core material and/or composite is carried out at a temperature of 190 to 205° C.

Exemplary core materials and composites thereof include those used to fabricate interior panels for aircraft, trains, automobiles, passenger ships, and the like, and are useful where good thermal and sound insulation are desired.

The thermoplastic composition is further illustrated by the following non-limiting examples.

All thermoplastic compositions were compounded on a Sterling 1¾ inch (44.5 mm) single screw extruder (Length/Diameter (L/D) ratio=24/1, with a vacuum port located near die face) unless otherwise noted. The compositions are molded after drying at 121° C. for 4 hrs on a 260-ton (236 metric ton) Van Dorn molding machine operating at about 304° C. with a mold temperature of 82° C. Depending on part geometry, the compositions were compounded and molded at a temperature of 250 to 330° C. unless otherwise noted. It will be recognized by one skilled in the art that the method is not limited to these temperatures.

Polymerization. Polysiloxane copolymer compositions, as described herein, are prepared according to the methods provided below. Generally, the polymerizations are performed using a 75-liter polycondensation reactor or at pilot scale in a 300 gallon (1,125 L) phosgenation reactor. The polymerization methods are further described in the examples below. The resulting polymers are isolated as powders by steam precipitation, and are dried in a fluidized bed dryer using nitrogen at 82 to 107° C.

Testing. All molded samples were conditioned for at least 48 h at 50% relative humidity prior to testing.

Heat release testing was done on 15.2×15.2 cm plaques 2.0 mm thick using the Ohio State University (OSU) rate-of-heat release apparatus, as measured by the method listed in FAR 25.853 (d), and in Appendix F, section IV (FAR F25.4). Total heat release was measured at the two minute mark in kW-min/m$^2$ (kilowatt minutes per square meter). Peak heat release was measured as kW/m$^2$ (kilowatts per square meter). The heat release test method is also described in the "Aircraft Materials Fire Test Handbook" DOT/FAA/AR-00/12, Chapter 5 "Heat Release Test for Cabin Materials".

Smoke density testing (ASTM E-662-83, ASTM F-814-83, Airbus ABD0031, Boeing BSS 7238) was done on 7.5×7.5 cm plaques of 2.0 mm thickness according to the method listed in FAR 25.853 (d), and in Appendix F, section V (FAR F25.5). Smoke density was measured under flaming mode. Smoke density ($D_s$) at 1.5 min, 4.0 min, and max level were reported.

Draeger tube toxicity of gases testing was done on 7.5×7.5 cm plaques 2.0 mm thick according to Airbus ABD0031 (also Boeing BSS 7238).

Haze (%) and transmittance (% T) was determined according to ASTM D1003-00 using a Gardner Haze Guard Dual, on 2.0 millimeter thick molded plaques. Melt volume rate (MVR) was run on dried pellets as per ASTM D1238-04 at 300° C. using a 1.2 Kg weight. Notched Izod impact values were measured at room temperature on 3.2 mm thick bars according to ASTM D256-04. Yellowness Index (YI) for laboratory scale samples was determined using a HunterLab Color System at an illuminant observer of C/2', in accordance with ASTM D1925-70 on 2.0±0.12 millimeter thick molded plaques, both before and after weathering according to ASTM G155-04a. The increase in YI (dYI) is calculated by subtracting the yellowness index value of a non-weathered sample (molded article) from that of a weathered sample (molded article) of the same composition. Molecular weight was determined by gel permeation chromatography using a crosslinked styrene-divinyl benzene-packed column with an ultraviolet (UV) detector operating at 254 nm, a sample concentration of 1.0 mg/ml, and as calibrated against polycarbonate standards.

The following examples use a eugenol-capped polysiloxane (also referred to as eugenol siloxane), described in formula (25) where E=7 to 45, but are not to be considered as limited thereto.

Method 1. Examples 1-5, 1-7, 1-11, 1-14 through 1-17, and 1-19 through 1-23, and Comparative Examples 1-1 and 1-2 of Table 1: DAC-Siloxane-RS Random Oligomerization Process. The following procedure is a sample example of the "DAC-Siloxane-RS Random Oligomerization Process" using a one pot protocol to prepare the resins described by Table 1. The targeted compositions described in Table 1 were achieved by varying the siloxane unit length, siloxane charge, DAC charge, resorcinol charge, and/or bisphenol A charge. Oligomer Synthesis To a 75 L glass reactor equipped with condenser, agitator, pH probe, caustic, phosgene inlets, and recirculation loop were added methylene chloride (14 L), water (1994 mL), eugenol-capped siloxane (Formula (25), where E is approximately 10), 80.72 g; 0.067 mol), triethylamine (84 mL, 0.603 mol), resorcinol (2438 g, 22.1 mol), and p-cumylphenol (175 g, 0.82 mol). A molten mixture of isophthaloyl chloride and terephthaloyl chloride isomers (DAC, 1:1 molar ratio of isomers, 3,600 g, 17.7 mol, 240 g/min) was added to the reaction vessel while simultaneously adding sodium hydroxide (50% w/w sodium hydroxide solution, sodium hydroxide/DAC molar ratio 1.8) as a separate stream over a 15 min period. The pH decreased from pH 7-8 to pH ~4. After completion of DAC addition, sodium hydroxide was added to raise the pH to 7-8. The reactor contents were stirred for 10 min and sampled for oligomer molecular weight analyses. Phosgenation To the oligomer solution in the reactor were charged bisphenol A (450 g, 1.97 mol), water (7 L) and methylene chloride (8 L). Phosgene (1072 g, 80 g/min, 10.8 mol) was co-fed with sodium hydroxide to the reactor under ratio-pH control (sodium hydroxide/phosgene molar ratio 2.10 with targeted pH of 8.0) as separate streams, maintaining the pH between 7 and 9. The batch was sampled for molecular weight analyses and then re-phosgenated (200 g phosgene, 2.02 mol, sodium hydroxide/phosgene molar ratio 2.10 with targeted pH of 8.6). The pH was raised to about 9 with 50% w/w sodium hydroxide and the batch was transferred to a centrifuge feed tank, where hydrochloric acid was added to lower the pH of the batch to pH≦8. The resultant solution of polymer in methylene chloride was purified by acid wash and subsequent water washes by centrifugation. The final polymer was isolated by steam precipitation and dried under a stream of hot nitrogen.

Method 2. Examples 2-1 to 2-16, and Comparative Examples 2-1 to 2-7 of Table 2: DAC-Siloxane-RS Random Oligomerization Process. The following procedure is one example of a two-pot protocol followed to generate resins described by Table 2. The targeted compositions described in Table 2 were achieved by altering siloxane unit length, siloxane charge, DAC charge, resorcinol charge, and/or bisphenol A charge. Oligomer Synthesis To a 200 gal (750 L) glass lined reactor equipped with condenser, agitator, pH probe, caustic inlet, and recirculation loops were added eugenol-capped siloxane (Formula (25), E=approximately 12; 1.38 kg, 1.14 mol), methylene chloride (281 L), triethylamine (0.74 kg, 7.31 mol), an aqueous solution of resorcinol (92 Kg solution, 44.9% w/w, 374.4 mol), and a methylene chloride solution of p-cumylphenol (9.29 kg, 33% w/w, 14.4 mol). A molten mixture of isophthaloyl chloride and terephthaloyl chloride isomers (DAC, 1:1 molar ratio of isomers, 66.3 Kg, 326 mol, 4.3 Kg/min) was added to the reaction vessel while simultaneously adding sodium hydroxide (50% w/w sodium hydroxide solution, Kg sodium hydroxide/Kg DAC 0.7 or 1.77 molar sodium hydroxide/DAC ratio) as a separate stream over a 15 min period. The pH decreased from pH 7-8 to pH ~4. After completion of DAC addition, sodium hydroxide was added to raise the pH to 7-8.5. The reactor contents were stirred for 10 min and sampled for oligomer molecular weight analyses. Phosgenation To a 300 gal (1,125 L) glass-lined reactor equipped with condenser, agitator, pH probe, phosgene inlet, caustic inlet, and recirculation loop were charged bisphenol A (6.5 Kg, 28.2 mol), sodium gluconate (0.16 Kg), water (132 L) and methylene chloride (154 L). The entire oligomer solution from the olig reactor was transferred to the phosgenation reactor, rinsing the oligomer reactor and its condensers with 22.5 L of methylene chloride. Phosgene (18 Kg total, 183.4 mol) was co-fed with sodium hydroxide (50% w/w) to the reactor under ratio-pH control. The phosgene addition rate was maintained at 91 Kg/hr for the initial 80% of phosgene addition (14.5 Kg) and decreased to 68 Kg/hr for the remaining 20% of phosgene addition (3.6 Kg). The sodium hydroxide/phosgene ratio profile of the batch started with a Kg sodium hydroxide/Kg phosgene ratio of 2.30 which was changed to 2.20 at 10% of phosgene addition, 2.00 at 50% of phosgene addition, and 2.50 at 70% of phosgene addition. The targeted pH for the phosgenation was 8.2 for the initial 70% of phosgenation and 8.5 for the remaining 30% of phosgenation. The batch was sampled for molecular weight analyses and then re-phosgenated (4.5 Kg phosgene, 45.9 mol, pH target 9.0). The pH was raised to about 9 with 50% w/w sodium hydroxide and the batch was transferred to a centrifuge feed tank, where hydrochloric acid was added to lower the pH of the batch to pH≦8. The resultant solution of polymer in methylene chloride was purified by acid wash and subsequent water washes via centrifugation. The final polymer was isolated by steam precipitation and dried under a stream of hot nitrogen.

Method 3. Example 4-3 of Table 4. DAC-Siloxane Pre-reaction Process. Example 4-3 was prepared according to the method described in Example 2 of U.S. Pat. No. 6,861,482. DAC-Eugenol Siloxane Pre-reaction: To a 75 L glass reactor equipped with condenser, agitator, pH probe, caustic and phosgene inlets, and recirculation loop were added methylene chloride (14 L) and a molten mixture of isophthaloyl chloride and terephthaloyl chloride (DAC, in a 1:1 molar ratio, 31.11 g total, 0.153 mol). The reactor then was charged with a solution of eugenol-capped siloxane (Formula (25), E=approximately 12; 80.72 g, 0.067 mol), triethylamine (105 mL, 0.753 mol) and N,N-dimethylaminopyridine (DMAP, 0.840 g, 0.00688 mol) in methylene chloride (1 L) via addition funnel. The contents of the reactor were stirred for ~5 min. Oligomer Synthesis A solution of resorcinol (2438 g, 22.1 mol) in water (1994 mL) and a solution of p-cumylphenol (175 g, 0.82 mol) in methylene chloride (1 L) then were added to the reactor, followed by a 1.5 L rinse of methylene chloride. Molten DAC (3568.0 g, 17.6 mol, 240 g/min) and sodium hydroxide (50% w/w sodium hydroxide solution, sodium hydroxide/DAC molar ratio 1.8) were co-fed as separate streams to the reaction vessel over a 15 min period. The pH decreased from pH 7-8 to pH ~4. Sodium hydroxide (approximately 400-600 g) was added to raise pH to 7-8. The reactor contents were stirred for 10 min and sampled for oligomer molecular weight analyses. Phosgenation To the oligomer solution in the reactor were charged bisphenol-A (450 g, 1.97 mol), water (7 L) and methylene chloride (8 L). Phosgene (1,072 g, 80 g/min, 10.8 mol) and sodium hydroxide were co-fed as separate streams to the reactor under ratio-pH control (sodium hydroxide/phosgene molar ratio 2.10 with targeted pH of 8.0) maintaining the pH between 7 and 9. The batch was sampled for molecular weight analyses and then re-phosgenated (200 g phosgene, 2.02 mol, 80 g/min, sodium hydroxide/phosgene molar ratio 2.10 with targeted pH of 8.6). The pH was raised to about 9 by the addition of 50% w/w sodium hydroxide, reactor contents purged with nitrogen, and the batch was transferred to a centrifuge feed tank, where hydrochloric acid was added to lower the pH of the batch to pH≦8. The resultant solution of polymer in methylene chloride was purified by centrifugation via acid wash and subsequent water washes. The final polymer was isolated by steam precipitation and dried under a stream of hot nitrogen.

Method 4. Examples 4-4 and 4-5 of Table 4: DAC-Siloxane Pre-reaction. To a 75 L glass reactor equipped with condenser, agitator, pH probe, caustic and phosgene inlets, and recirculation loop were added methylene chloride (14 L) and a molten mixture of isophthaloyl chloride and terephthaloyl chloride (DAC, in a 1:1 molar ratio, 75.0 g total, 0.369 mol). The reactor then was charged with a solution of eugenol-capped siloxane (Formula (25), E=approximately 12; 80.72 g, 0.067 mol) and triethylamine (23 mL, 0.165 mol) in methylene chloride (1 L) via addition funnel. The contents of the reactor were stirred for ~5 min. Oligomer Synthesis A solution of resorcinol (2438 g, 22.1 mol) in water (1994 mL) and a solution of p-cumylphenol (175 g, 0.82 mol) and triethylamine (68 mL, 0.487 mol) in methylene chloride (1 L) then were added to the reactor, followed by a 1.5 L rinse with methylene chloride. Molten DAC (3525 g, 17.4 mol, 240 g/min) and sodium hydroxide (50% w/w sodium hydroxide solution, sodium hydroxide/DAC molar ratio 1.8) were co-fed as separate streams to the reaction vessel over a 15 min period. The pH decreased from pH 7-8 to pH ~4. Sodium hydroxide (approximately 400-600 g) was added to raise pH to 7-8. The reactor contents were stirred for 10 min and sampled for oligomer molecular weight analyses. Phosgenation To the oligomer solution in the reactor were charged bisphenol A (450 g, 1.97 mol), water (7 L) and methylene chloride (8 L). Phosgene (1072 g, 80 g/min, 10.8 mol) and sodium hydroxide were co-fed as separate streams to the reactor under ratio-pH control (sodium hydroxide/phosgene molar ratio 2.10 with targeted pH of 8.0) maintaining the pH between 7 and 9. The batch was sampled for molecular weight analyses and then re-phosgenated (200 g phosgene, 2.02 mol, 80 g/min, sodium hydroxide/phosgene molar ratio 2.10 with targeted pH of 8.6). The pH was raised to ~9 with 50% w/w sodium hydroxide and the batch was transferred to a centrifuge feed tank, where hydrochloric acid was added to lower the pH of the batch to pH≦8. The resultant solution of polymer in methylene chloride was purified by acid wash and subsequent water washes via centrifugation. The final polymer was isolated by steam precipitation and dried under a stream of hot nitrogen. Analysis of the polymer by proton NMR indicated that substantially all (i.e., greater than 99 mol %) of the eugenol linkages were connected to the arylate portion of the polysiloxane-polyester-polycarbonate terpolymer. This is in contrast to the eugenol compositions prepared using the DAC-Siloxane-RS Random Oligomerization Process where the eugenol siloxane is bound in both the ester and carbonate units and the compositions prepared using the Chloroformate Process where the eugenol siloxane is bonded to the carbonate units.

Method 5. Example 4-6 of Table 4: Chloroformate Process. To a 75 L glass reactor equipped with condenser, agitator, pH probe, caustic and phosgene inlets, and recirculation loop were added methylene chloride (18 L), water (1994 mL), resorcinol (2438 g, 22.1 mol), p-cumylphenol (175 g, 0.82 mol), and an aqueous solution of methyltributyl ammonium chloride (MTBA, phase transfer catalyst, 70% aqueous solution, 19 mL) Oligomer Synthesis A molten mixture of isophthaloyl chloride and terephthaloyl chloride isomers (DAC, 1:1 molar ratio of isomers, 3600 g, 17.7 mol, 240 g/min) was added to the reaction vessel while simultaneously adding sodium hydroxide (50% w/w sodium hydroxide solution, sodium hydroxide/DAC molar ratio 1.8) as a separate stream over a 15 min period. The pH decreased from pH 7-8 to pH ~4. Sodium hydroxide (approximately 400-600 g) was added to raise pH to 7-8. The reactor contents were stirred for 10 min. Chloroformate production: A solution of eugenol siloxane (Formula (25), E=approximately 12; 80.72 g, 0.067 mol) in methylene chloride (1 L) was added to the reaction using an addition pot. The polyester-containing siloxane-oligomer solution was phosgenated (650 g phosgene, 6.57 mole, 80 g/min) at pH 4 to 7 while co-feeding sodium hydroxide to the reaction vessel (sodium hydroxide/phosgene molar ratio 1.80 with targeted pH of 5). The pH was then increased to pH 8-8.5 by the addition of sodium hydroxide. The presence of chloroformates was confirmed using phosgene paper. Chloroformate condensation To the polyester oligomer/siloxane chloroformate solution in the reactor were charged bisphenol-A (450 g, 1.97 mol), water (5 L) and methylene chloride (5 L). After stirring the reaction mixture for 5 minutes, no chloroformates were detected using phosgene paper. Triethylamine (84 mL) was added to the reaction vessel using an addition funnel and the solution was stirred for 5 minutes. Then phosgene (200 g, 80 g/min, 10.8 mol) and sodium hydroxide were co-fed as separate streams to the reactor under ratio-pH control (sodium hydroxide/phosgene molar ratio 2.10 with targeted pH of 8.2) maintaining the pH between 7 and 9. The pH was raised to ~9 with 50% w/w sodium hydroxide and the batch was transferred to a centrifuge feed tank, where hydrochloric acid was added to lower the pH of the batch to pH≦8. The resultant solution of polymer in methylene chloride was purified by acid wash and subsequent water washes via centrifugation. The final polymer was isolated by steam precipitation and dried under a stream of hot nitrogen. Analysis of the polymer by proton NMR indicated that substantially 100% of the eugenol linkages were connected to the carbonate portion of the polysiloxane-polyester-polycarbonate terpolymer. This is in contrast to the eugenol compositions prepared using the DAC-Siloxane-RS Random Oligomerization Process where the eugenol siloxane is bound in both the ester and carbonate units and the compositions prepared using the DAC-Siloxane Pre-reaction Process where the eugenol siloxane is bonded to the ester units Examples 1-1 to 1-22, and Comparative Examples 1-1 and 1-2. Polysiloxane copolymer compositions prepared according to the above method, and blends thereof, are provided in Table 1, below. Haze values and OSU data are also provided.

TABLE 1[a]

|  | Total Siloxane (wt %)[c] | Siloxane Unit Length ("E length") | Haze (%) | OSU at 2 min (kW-min/m$^2$) | OSU at peak (kW/m$^2$) | Blend with:[b] |
|---|---|---|---|---|---|---|
| CEx. 1-1 | 0 | — | 1 | 32 | 76 | — |
| CEx. 1-2 | 0 | — | 1 | 32 | 81 | — |
| Ex. 1-1[b] | 0.5 | 9 | 2 | — | — | 1-3 |
| Ex. 1-2[b] | 0.5 | 9 | 2 | — | — | 1-5 |
| Ex. 1-3 | 1 | 9 | 2 | 21 | 30 | — |
| Ex. 1-4[b] | 1 | 9 | 3 | — | — | 1-5 |
| Ex. 1-5 | 3 | 9 | 3 | 17 | 32 | — |
| Ex. 1-6[b] | 0.5 | 12 | 1 | 16 | 36 | 1-9 |
| Ex. 1-7[b] | 0.5 | 12 | 3 | 29 | 28 | 1-15 |
| Ex. 1-8[b] | 0.5 | 12 | 3 | 26 | 33 | 1-14 |
| Ex. 1-9 | 1 | 12 | 2 | 13 | 34 | — |
| Ex. 1-10[b] | 1 | 12 | 11 | — | — | 1-15 |
| Ex. 1-11[b] | 1 | 12 | 7 | — | — | 1-14 |
| Ex. 1-12 | 3 | 12 | 2 | 14 | 35 | — |
| Ex. 1-13 | 3 | 12 | 2 | 13 | 32 | — |
| Ex. 1-14 | 5.8 | 12 | 2 | 34 | 52 | — |
| Ex. 1-15 | 10.8 | 12 | 11 | 48 | 69 | — |
| Ex. 1-16 | 1 | 14 | 10 | 14 | 33 | — |

TABLE 1[a]-continued

| | Total Siloxane (wt %)[c] | Siloxane Unit Length ("E length") | Haze (%) | OSU at 2 min (kW-min/m²) | OSU at peak (kW/m²) | Blend with:[b] |
|---|---|---|---|---|---|---|
| Ex. 1-17[b] | 0.5 | 16 | 4 | — | — | 1-18 |
| Ex. 1-18 | 1 | 16 | 10 | 14 | 33 | — |
| Ex. 1-19 | 3 | 16 | 17 | 17 | 43 | — |
| Ex. 1-20 | 1 | 22 | 10 | 14 | 40 | — |
| Ex. 1-21 | 3 | 22 | 39 | 14 | 43 | — |
| Ex. 1-22 | 3 | 22 | 20 | 15 | 44 | — |

[a] For all polymers, ITR/RS Carbonate/BPA Carbonate molar ratio = 73.5/18.3/8.2
[b] All resin blends are based on a blend of the specified polymer with 50 wt % of 80/11/9 ITR/RS/BPA terpolymer (CEx 4 from Table 2, prepared using Method 2).
[c] Wt % Siloxane equals (100 × wt of —(Si(CH₃)₂O))/total wt of polymer, where the weight of the siloxane and the total weight of polymer are in the same units (e.g., grams).

Table 1 shows data from copolymers made with a molar ratio of 74/18/8 (ITR/RS Carbonate/BPA Carbonate). The batches were made in an interfacial reaction by adding the dicarboxylic acid dichloride (DAC) to a mixture of TEA, polysiloxane of formula (25), RS and end cap in methylene chloride and water (DAC-Siloxane-RS Random Oligomerization Process, Method 1). Caustic was used as an acid scavenger. After the oligomerization was complete, BPA and phosgene was added and the mixture was polymerized. ITR Batches without the polysiloxane of formula (25) (Comparative Examples 1-1 and 1-2, Table 1) gave good clarity and color but failed the OSU performance test. Polymers of Examples 1-1 to 1-22 were made with added polysiloxane of formula (25) and show improved OSU performance. The most preferred compositions contain a siloxane unit having a number of siloxane repeating units E of less than 17 and a total weight of polysiloxane of less than about 3 wt %. Excellent OSU results were obtained with a siloxane loading as low as 0.25 wt % siloxane. Polysiloxane unit lengths of 17 to 52 siloxane repeating units meet the 65/65 OSU performance criteria, but have higher haze values using the "DAC-Siloxane-RS Random Oligomerization Process" Process. These compositions can be prepared using the Chloroformate Process described below and in Examples 8 & 9 in Davis, G. C.; Mullen, B. D.; Sybert, P. D., "Weatherable, Thermostable Polymers Having Improved Flow Composition," United States Patent Application No. 2005/0159577 A1, to provide compositions with good OSU performance and good clarity (Table 4, infra).

Examples 2-1 to 2-16, and Comparative Examples 2-1 to 2-7. Polysiloxane copolymer compositions prepared according to Method 2, above, are shown in Table 2, below. The Tg, melt viscosity (MVR), and OSU data are also provided.

TABLE 2

| | Copolymer Molar ratio | | | Wt % siloxane[f] | OSU | | % ester[g] | $T_g$ | MVR[h] |
|---|---|---|---|---|---|---|---|---|---|
| | ITR Ester | RS carbonate | BPA carbonate | | 2 min. (kW-min/m²) | Peak (kW/m²) | | | |
| CEx 2-1 | 58 | 17 | 25 | 0 | 73 | 108 | — | 141 | 9.9 |
| CEx 2-2[d] | 61 | 13 | 26 | 0 | 75 | 124 | — | 142 | 9.4 |
| CEx 2-3 | 64 | 9 | 27 | 0 | 60 | 100 | — | 146 | 8.1 |
| CEx 2-4 | 80 | 11 | 9 | 0 | 45 | 73 | — | 145 | 6.4 |
| CEx 2-5[d] | 73 | 10 | 17 | 0 | 58 | 108 | — | 146 | 7.5 |
| CEx 2-6[d] | 69 | 15 | 16 | 0 | 60 | 116 | — | 143 | 8.1 |
| CEx 2-7 | 82 | 11 | 7 | 0 | 47 | 80 | — | 145 | 6.6 |
| Ex 2-1[d] | 80 | 11 | 9 | 0.25 | 23 | 40 | — | 145 | 6.1 |
| Ex 2-2[d] | 82 | 11 | 7 | 0.25 | 27 | 42 | — | 145 | 6.3 |
| Ex 2-3[d] | 64 | 9 | 27 | 0.5 | 34 | 55 | — | 145 | 6.8 |
| Ex 2-4[d] | 69 | 15 | 16 | 0.5 | 27 | 40 | — | 142 | 7.1 |
| Ex 2-5[d] | 69 | 15 | 16 | 0.5 | 28 | 41 | — | 141 | 7.6 |
| Ex 2-6[d] | 80 | 11 | 9 | 0.5 | 17 | 30 | — | 144 | 6.3 |
| Ex 2-7[d] | 65 | 14 | 21 | 0.75 | 28 | 41 | — | 141 | 7.5 |
| Ex 2-8[d] | 80 | 11 | 9 | 0.75 | 16 | 33 | — | 143 | 5.8 |
| Ex 2-9[e] | 58 | 17 | 25 | 1 | 26 | 47 | 48.7 | 139 | 8.8 |
| Ex 2-10[e] | 58 | 17 | 25 | 1 | 29 | 56 | — | 139 | 9.5 |
| Ex 2-11[e] | 64 | 9 | 27 | 1 | 28 | 54 | 58 | 142 | 6.5 |
| Ex 2-12[e] | 64 | 9 | 27 | 1 | 32 | 45 | — | 143 | 6.9 |
| Ex 2-13[d] | 73 | 10 | 17 | 1 | 20 | 38 | 39 | 143 | 6.5 |
| Ex 2-14 | 80 | 11 | 9 | 1 | 14 | 32 | — | 147 | 5.9 |
| Ex 2-15[e] | 82 | 11 | 7 | 1 | 15 | 32 | 59 | 143 | 5.9 |
| Ex 2-16[e] | 82 | 11 | 7 | 1 | 19 | 38 | — | 144 | 5.6 |

[d] Resins were dry blended in a paint shaker and compounded on a Sterling 1¾ inch (44.5 mm) single screw extruder (Length/Diameter (L/D) ratio = 24/1) with a vacuum port located near the die face, unless otherwise noted.
[e] 10 is a replicate of 9; 12 is a replicate of 11; 16 is a replicate of 15.
[f] Wt % Siloxane equals 100 × wt of —(Si(CH₃)₂O)—/total wt of polymer.
[g] % Ester (Mole %) = 100 × Siloxane-Ester linkages/(Siloxane-Ester linkage + Siloxane-Carbonate linkage) by NMR.
[h] ASTM D1238-04, 300 C., 1.2 Kg, 6 min.

Table 2 shows the results of increased compositional range of the polymers studied. These resins were also prepared using the DAC-Siloxane-RS Random Oligomerization Process (Method 2). As seen with Comparative Examples 2-1 to 2-7, all copolymer prepared without the polysiloxane of formula (25) of formula (25) fail to provide OSU values that meet the 65/65 requirement. Compositions containing with as little as 0.25% siloxane gave values below 65/65 requirement and further, were transparent. A comparison of the results in Tables 1 and 2 show that good OSU values and good transparency as measured by low haze values can be obtained by this process for copolymers and blends comprising siloxane unit lengths (E) of 4 to 15.

Examples 3-1 to 3-6. Examples 3-1 to 3-6 were prepared according to the methods described above. The OSU and molecular weight data are provided in Table 3, below. Table 3.

TABLE 3[i]

| | | OSU | | | Blends of Resins | | | |
|---|---|---|---|---|---|---|---|---|
| Ex. No. | wt % siloxane | 2 min (kW-min/m$^2$) | Peak (kW/m$^2$) | Mw | Resin A | Resin B[g] | Weight Ratio (A:B) | Comment |
| 3-1 | 5.8 | — | — | 25,000 | — | — | — | — |
| 3-2 | 5.8 | — | — | 20,000 | — | — | — | — |
| 3-3 | 3.0 | 35 | 52 | — | 3-1 | a | 50:50 | — |
| 3-4 | 3.0 | 34 | 48 | — | 3-2 | a | 50:50 | — |
| 3-5 | 3.0 | 40 | 56 | — | 3-1 | b | 50:50 | — |
| 5-6 | 3.0 | 34 | 57 | — | 3-1 | b | 50:50 | — |
| 3-7 | 3.0 | 42 | 51 | 25,000 | 3-1 | a | 50:50 | 1.9 wt % TiO$_2$ |
| 3-8 | 3.5 | 40 | 49 | 25,000 | 3-1 | 2-14 | 50:50 | 1.9 wt % TiO$_2$ |
| 3-9 | 2.5 | 30 | 47 | 25,000 | 3-1 | 2-14 | 30:70 | 1.9 wt % TiO$_2$ |

[i]For all polymers, Resin A is ITR/RS Carbonate/BPA Carbonate molar ratio = 80/11/9, and the siloxane unit length E is ~45.
[j]Resin B is Comparative Example 2-4 with a. Mw of 20,000, and b. Mw of 25,000.

A comparison of the results in Tables 1, 2, and 3 highlights the OSU performance of the copolymers with varying lengths of the siloxane unit. According to the above data, shorter siloxane units give the best performance (Exs. 1-7, 1-14, and 1-15, where each has a siloxane unit length E of 9 to 14). The polysiloxane copolymer composition, where E is about 17 gives good OSU performance (Ex. 1-20). The longest siloxane unit, where E is about 45, also gives passing OSU values (Exs. 3-3 to 3-6).

Thus, these copolymers can be prepared by a variety of polymerization conditions including solution and interfacial conditions. It is preferred that the siloxane units are distributed substantially evenly through out the copolymer backbone for optimal transparency. Using the "Chloroformate Process" or the DAC-Pre-Reaction methods, transparent resins may be prepared that have larger siloxane unit sizes. For example, the longer polysiloxane unit containing resins (e.g., formula (25), wherein E is about 45), Examples 3-3 to 3-6 described in Table 3, can be prepared as described Davis, G. C.; Mullen, B. D.; Sybert, P. D., "Weatherable, thermostable polymers having improved flow composition", U.S. Patent Application Publ. No. 2005/0159577 A1, to afford substantially transparent resins. Thus, a variety of polymerization conditions can be used to control copolymer architecture. In general, although the transparency can be improved by selecting the appropriate polymerization conditions the flame retardant performance is substantially unaffected by the copolymer architecture.

Examples 4-1 to 4-6. Examples 4-1 to 4-6 were prepared according to the above methods, and the OSU, haze, and transmittance data are provided in Table 4, below.

TABLE 4

| Resin | Process | OSU at 2 min (kW-min/m$^2$) | OSU Peak (kW/m$^2$) | Haze (%) | % T | mol % Eugenol ester links[k] |
|---|---|---|---|---|---|---|
| Ex. 4-1 | One Pot | — | — | 2.6 | 83.37 | — |
| Ex. 4-2 | One Pot | 23 | 34 | 2.2 | 83.68 | — |
| Ex. 4-3 | A[m] | 16 | 31 | 1.4 | 86.49 | 100 |
| Ex. 4-4 | DAC-Pre-RXN | — | — | 1.4 | 85.91 | — |

TABLE 4-continued

| Resin | Process | OSU at 2 min (kW-min/m$^2$) | OSU Peak (kW/m$^2$) | Haze (%) | % T | mol % Eugenol ester links[k] |
|---|---|---|---|---|---|---|
| Ex. 4-5 | DAC-Pre-RXN | 22 | 36 | 1.7 | 85.34 | — |
| Ex. 4-6 | B[n] | 22 | 35 | 1.7 | 84.57 | 0 |

[k]mol % Eugenol (abbr. "Eu") ester links = (mol frxn Eu ester/(mol Frxn Eu ester + mol frxn Eu carbonate)) × 100
[m]a is prepared using the pre-reaction process without a phosgenation step.
[n]b is prepared using the chloroformate process.

For example, Table 4 shows that the preparation of these compositions using various polymerization processes. Using the "DAC-Siloxane Pre-reaction Process" the pre-reaction of DAC with the eugenol-terminated siloxane affords substantially 100% of the eugenol linkage groups as aromatic esters. The "DAC-Siloxane-RS Random Oligomerization Process" process where the eugenol-terminated siloxane is mixed with the resorcinol prior to DAC additions leads to mixture of eugenol-ester and eugenol-carbonate linkages (Table 2 and Table 4). The Chloroformate process (Example 4-6, Table 4) affords substantially 100% eugenol-carbonate linkage groups. Although various processes lead to differing levels of clarity depending on the siloxane unit length, the heat release rate performance as measured by the OSU values is substantially independent of the process (Table 4).

A comparison of properties for Comparative Example 2-4, Example 2-14, and Example 3-1 is shown in Table 5, below in which siloxane unit size (E in formula (25)) and siloxane loading (in wt %) were increased.

TABLE 5

| Resins | Copolymer Composition | | | | | Composition of the Blend/Resin (wt %) | | | |
|---|---|---|---|---|---|---|---|---|---|
| | Copolymer Molar Ratio | | | Siloxane | | | | | |
| | ITR Ester | RS Carbonate | BPA Carbonate | Length (E) | Wt % Siloxane | Comparative | Ex. 5-1 | Ex. 5-2 | Ex. 5-3 |
| CEx 2-4 | 80 | 11 | 9 | — | 0 | 100 | 0 | 0 | 0 |
| Ex 2-14 | 80 | 11 | 9 | 12 | 1 | 0 | 50 | 70 | 100 |
| Ex 3-1 | 80 | 11 | 9 | 47 | 5.8 | | 50 | 30 | 0 |
| Notched Izod Impact Strength (ft/lbs-in) | | | | | at 23° C. | 13.7 | 13.9 | 13.9 | 11.7 |
| | | | | | at 0° C. | 10.6 | 11.4 | 12.0 | 3.6 |
| | | | | | at −10° C. | 9.2 | 10.3 | 8.0 | 3.8 |
| Melt Flow at 300° C. and 1.2 Kg | | | | | g/10 min | 4.52 | 4.30 | 4.86 | 5.85 |
| $T_g$ | | | | | ° C. | | 143 | — | 147.1 |

The excellent ductility of these resins is highlighted in Table 5. Composition 5-3 containing 1 wt % eugenol-capped polysiloxane with fewer siloxane repeat units (formula (25), where E is about 12,) has excellent toughness as measured by the notched Izod impact strength. For applications requiring even greater toughness, compositions 5-1 and 5-2 containing eugenol capped polysiloxane with more siloxane repeat units (formula (25), where E is about 45) have even greater toughness especially at lower temperatures (as measured by the notched Izod impact strength).

All the compositions in Table 1 through 5 have $T_g$ between 120 and 150° C. and therefore are easily processed by thermoforming. For opaque compositions where extremely high toughness is required, higher loading levels of siloxane and polysiloxanes with longer unit lengths of greater than 16 may be desired (Table 5). For good toughness, lower unit lengths are acceptable, or mixtures of polymers having low and high siloxane unit lengths can be used.

Figure 7:
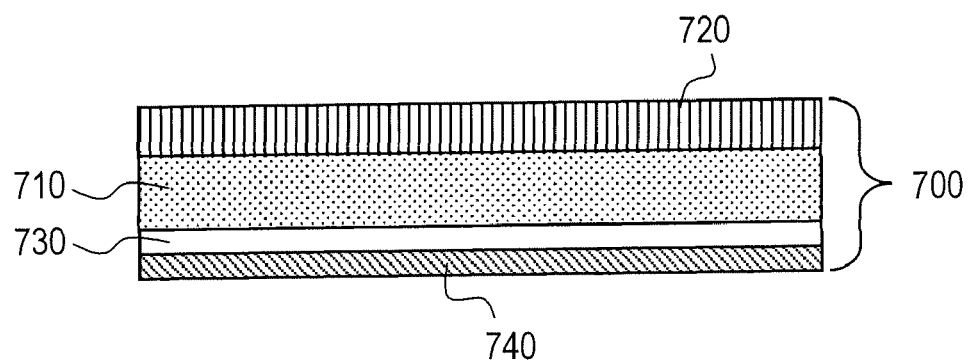
FIG. 7 is a diagram of a plastic mirror.
Figure 8:
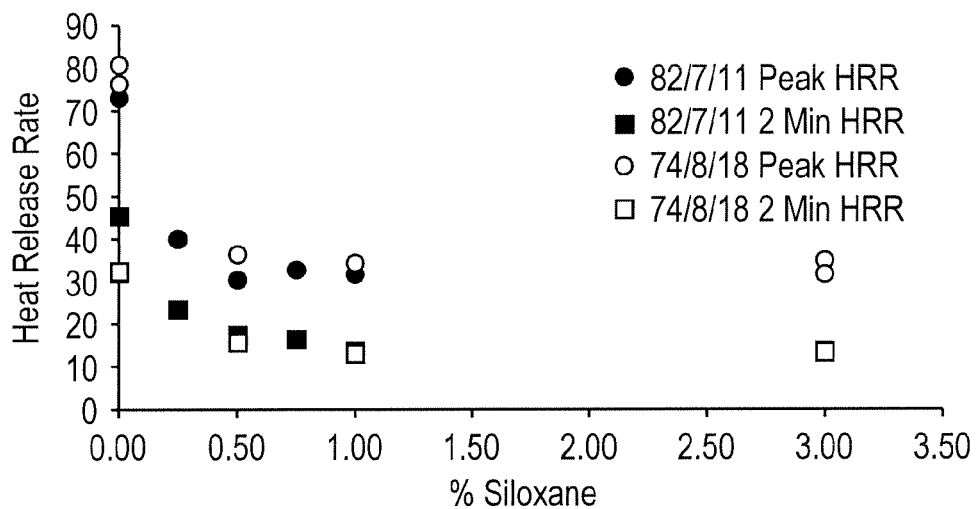
FIG. 8 is a plot of OSU performance versus siloxane loading at a constant unit size.

FIG. 8 is a plot of OSU performance versus siloxane loading at a constant unit size (E=12) where the OSU performance plateaus with increasing siloxane loading. In FIG. 7, it can be seen that the greatest benefit for OSU results is obtained at a siloxane loading of 0.5 wt % or greater.

Figure 2:
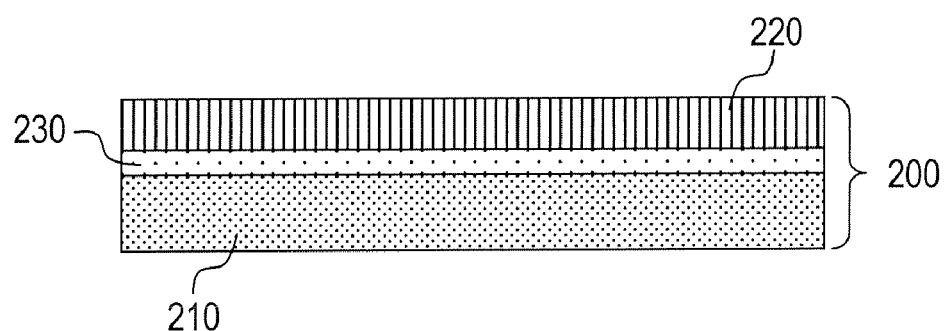
FIG. 2 is a diagram of a hard coated sheet.
Figure 9:
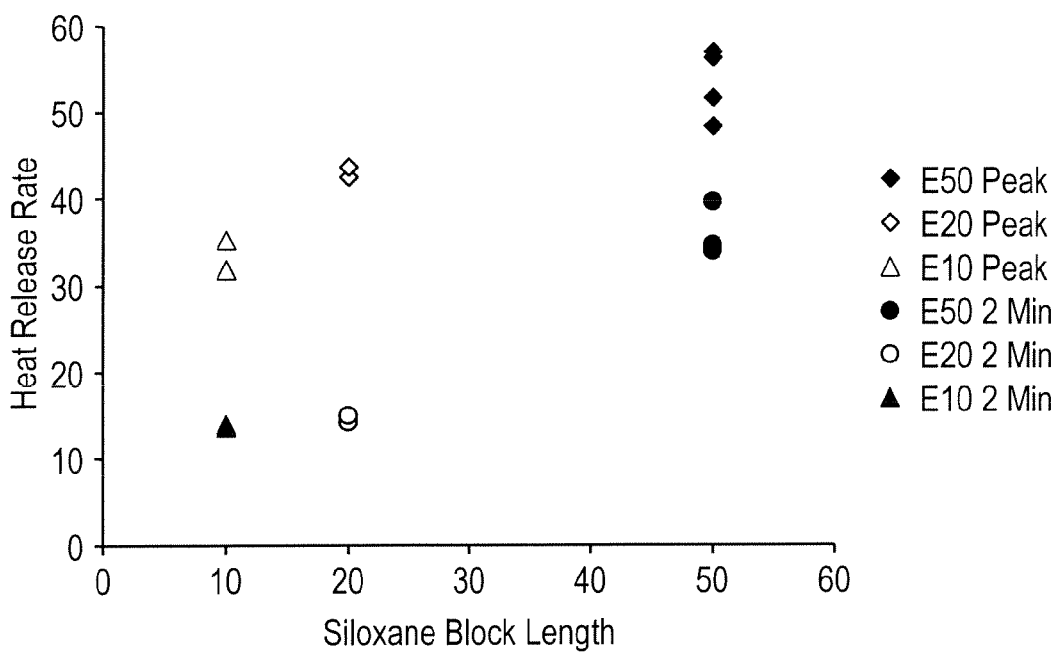
FIG. 9 is a plot of OSU performance versus siloxane unit length at a constant siloxane loading.

FIG. 9 is a plot of OSU performance versus siloxane unit length at a constant siloxane loading (about 3 wt % siloxane). In FIG. 2, it can be seen that, for a given loading of siloxane, the OSU performance increases as the unit size decreases, and continues to follow this trend to a value of less than about 20 siloxane repeat units (E is about 20).

Figure 10:
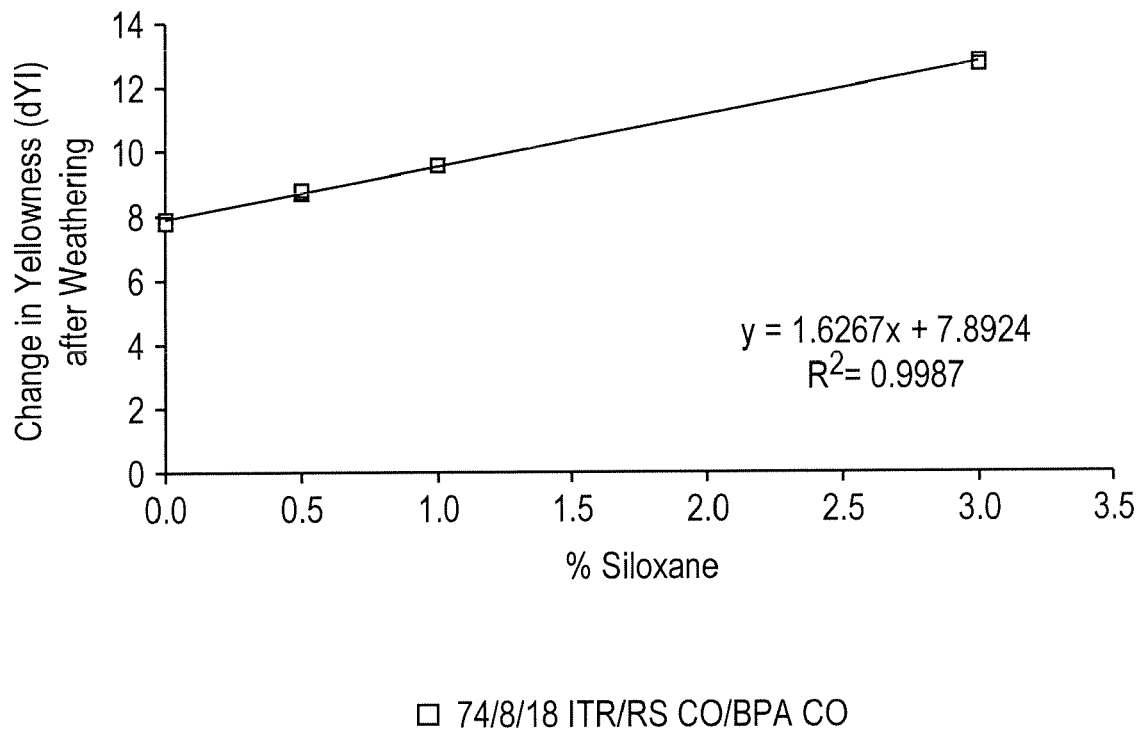
FIG. 10 is a plot of color shift versus eugenol siloxane level.

FIG. 10 shows a plot of color shift versus eugenol siloxane level. As seen in FIG. 3, increasing eugenol siloxane can increases the color shift on exposure to UV light. Thus for color sensitive applications lower eugenol siloxane levels (0.25 to 1.0 wt % eugenol-capped polysiloxane of formula (25)) are most preferred. Alternatively, the siloxane linking groups that are free of the eugenol group maybe used. Some examples are shown below where the siloxane-linking group has been reacted with the DAC. In the Chloroformate Process or the DAC-Siloxane-RS Random Oligomerization Process, the linking groups are either all carbonate or a mixture of carbonate and ester, respectively.

Table 6 shows smoke density and toxicity values for select compositions.

TABLE 6

| | Example | | |
|---|---|---|---|
| | Comparative Ex. 2-7 | Example 2-2 | Example 2-15 |
| ITR Ester | 82 | 82 | 82 |
| RS Carbonate | 11 | 11 | 11 |
| BPA Carbonate | 7 | 7 | 7 |
| Wt % Siloxane | 0 | 0.25 | 1 |
| NBS Smoke Density ASTM F814/E662 Reference: ABD0031, BSS 7238 Flaming Mode Criteria: Ds @ 4.0 m = 200 max | | | |
| Ds @ 1.5 m | 5 | 1 | 1 |
| Ds @ 4.0 m | 40 | 13 | 23 |
| Ds max | 40 | 13 | 23 |
| Ds max Time | 3.99 | 4.00 | 3.98 |
| NON-Flaming Mode Criteria: Ds @ 4.0 m = 200 max | | | |
| Ds @ 1.5 m | 0 | 0 | 0 |
| Ds @ 4.0 m | 1 | 0 | 0 |
| Ds max | 1 | 1 | 1 |
| Ds max Time | 3.68 | 2.88 | 2.38 |
| Toxicity Draeger Tube Ref: BSS 7239, ATS 1000/ABD0031 Flaming | | | |
| HCN <150 PPM | <1 | <1 | 1 |
| CO <3500 PPM[1] | 50 | 100 | 100 |
| NO + NO2 <100 PPM | 1 | 2 | <1 |
| SO2 <100 PPM | <1 | <1 | <1 |
| HF <100 PPM | 3 | 3 | <1 |
| HCL <150 PPM | 50 | 10 | 15 |
| NON-Flaming | | | |
| HCN <150 PPM | <1 | <1 | <1 |
| CO <3500 PPM[1] | 25 | 25 | 25 |
| NO + NO2 <100 PPM | <1 | <1 | <1 |
| SO2 <100 PPM | <1 | <1 | <1 |
| HF <100 PPM | <1 | <1 | <1 |
| HCL <150 PPM | 10 | 4 | 5 |

[1]CO <1000 PPM for Airbus internal standard

As seen in the above data in Table 6, the tested compositions pass the emissions requirements.

Use of Added Flame Retardants. Examples 7-1 to 7-5 were prepared according using the polymers and additives in the proportions described in Table 7, below. The examples were prepared using added flame retardant (FR) additives (Table 7): potassium diphenyl sulfone-3-sulfonate (KSS), 1,1,2,2,3,3,4,4,4-nonafluoro-1-butanesulfonic acid, potassium salt (also referred to as perfluoro-n-butanesulfonic acid, potassium salt; Rimar Salt; and KPFBS), or Teflon-encapsulated styrene-acrylonitrile copolymer (TSAN; prepared as described in U.S. Patent Application Publication No. 2006/0030647 A1), and were prepared as follows: All components were dry-blended in a paint shaker for about 3 min. with 0.06 phr of aryl phosphite stabilizer (Sandostab® P-EPQ, available from Clariant), 0.3 phr of a release agent (pentaerythritol tetrastearate), 0.03 phr of a cycloaliphatic epoxide resin (Ebecryl® ERL-4221E, available from Johnson Polymer, a subsidiary of BASF), 2 phr of $TiO_2$, 0.00028 phr of C.I. Solvent Violet 36, 0.012 phr of C.I. Pigment Blue 28, and 0.00005 phr of Sicotan® Yellow K 1010 (available from BASF). The blended powder compositions were extruded on a 30 mm twin-screw, vacuum vented extruder at 280 to 300° C., at a screw speed of about 450 rpm under vacuum. The extrudate was cooled, pelletized and dried at 120° C. for 4 hours. The pellets were injection molded into test parts at a set temperature of 280 to 310° C. and a mold temperature of 82° C.

TABLE 7[P]

| Raw Material | Examples | | | | |
|---|---|---|---|---|---|
| | 7-1 | 7-2 | 7-3 | 7-4 | 7-5 |
| CEx 2-4 24,500 MW | 50.00 | 50.00 | 50.00 | 50.00 | 50.00 |
| Ex 2-14 25,000 MW | 50.00 | 50.00 | 50.00 | 50.00 | 50.00 |
| KSS | — | — | 0.300 | — | 0.300 |
| KPFBS | — | 0.060 | — | 0.060 | — |
| T-SAN | — | 0.5 | 0.5 | — | — |
| OSU Testing Specimen thickness = 0.080" | | | | | |
| OSU at 2 min (kW-min/m$^2$) | 31 | 41 | 51 | 36 | 41 |
| OSU Peak (kW/m$^2$) | 40 | 52 | 57 | 43 | 45 |
| NBS Smoke Density ASTM F814/E662 Flaming mode Reference: ABD0031, BSS 7238 | | | | | |
| Criteria: Ds @ 4.0 m = 200 max | | | | | |
| Smoke mean Ds 1.5 m | 2 | 4 | 6 | 2 | 1 |
| Smoke mean Ds 4.0 m | 20 | 41 | 49 | 17 | 31 |
| Smoke mean Ds max | 20 | 41 | 49 | 17 | 31 |
| Smoke mean Ds max Time | 4.00 | 3.98 | 3.99 | 4.00 | 4.00 |
| Toxicity Draeger Tube (Flaming mode) Reference: BSS7239, ATS 1000/ABD0031 | | | | | |
| HCN <150 ppm | <1 | <1 | <1 | <1 | <1 |
| CO <3500 ppm 1 | 120 | 120 | 400 | 120 | 200 |
| NOX <100 ppm | <1 | <1 | 1 | 1 | 1 |
| SO2 <100 ppm | <1 | <1 | <1 | <1 | <1 |
| HF <100 ppm | <1 | <1 | <1 | <1 | <1 |
| HCL <150 ppm | 4 | 4 | 8 | 8 | 8 |

[P]Note: All raw material amounts are given in parts per hundred (phr).

Table 7 shows that these FR formulations pass the OSU, Smoke, and Toxicity requirements.

Figure 11:
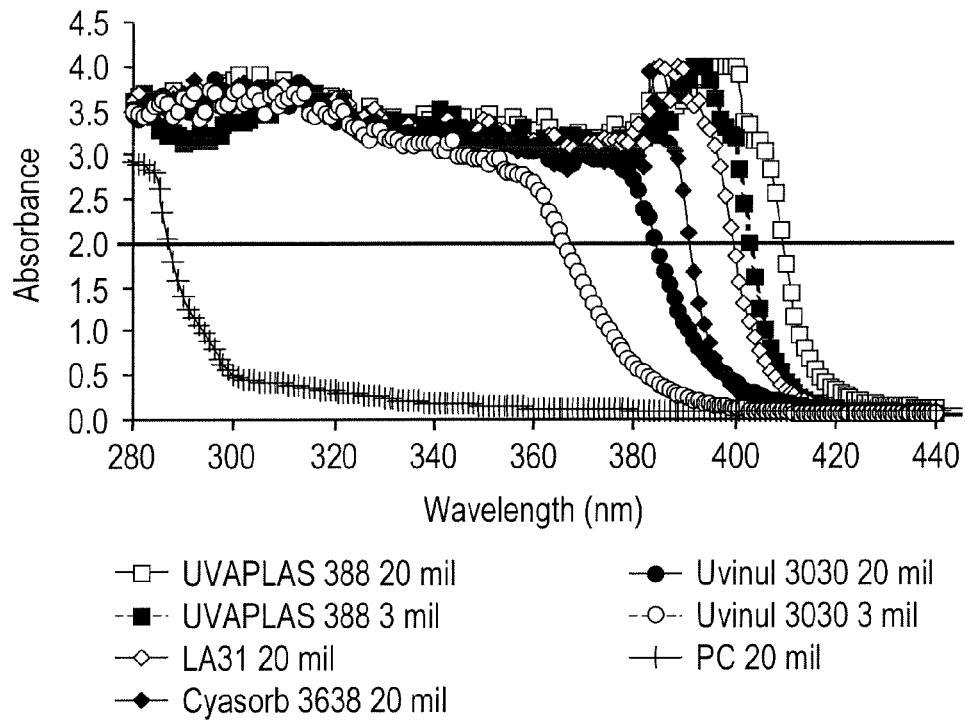
FIG. 11 is a plot of UV-VIS absorbance spectra for UVA-containing films.

Use of UV absorbers. Examples 8-1 to 8-5 and Comparative Examples 8-1 to 8-4 show data for UVA-containing films prepared using bisphenol-A polycarbonate with commercially available UVAs (UVAPLAST® 388 from ColorChem International; LA-31RG, from Amfine Chemicals; CYASORB® 3638 from Cytec; UVINUL® 3030 from BASF) at different levels and different film thickness as shown in Table 8. The absorbance spectrums of these films were plotted (FIG. 11).

TABLE 8

| Example | UVA | UVA loading (wt %) | Film tks (μm) |
|---|---|---|---|
| Ex. 8-1 | UVAPLAST® 388 | 2 | 510 |
| Ex. 8-2 | UVAPLAST® 388 | 2 | 75 |
| Ex. 8-3 | LA-31RG | 5 | 510 |
| Ex. 8-4 | CYASORB® 3638 | 5 | 510 |
| Ex. 8-5 | UVINUL® 3030 | 5 | 510 |
| Ex. 8-6 | UVINUL® 3030 | 5 | 75 |
| CEx. 8-1 | PC (control) | 0 | 510 |

The films were placed over a 3.2 mm thick chip of a poly((isophthalate-terephthalate-resorcinol ester)-co-(bisphenol A carbonate)) resin (ITR-BPA-PC resin) with a molar ratio of ITR to BPA-PC of 90:10 and containing 1 wt % $D_{10}$ Siloxane (also referred to as ITR-Siloxane resin) and weathered according to ASTM G155-04a by UV exposure (1,800 kJ/m$^2$) through the film. The change in color shift data, determined by the difference in yellowness before and after weathering according to ASTM D1925-70 for the ITR-Siloxane chip covered with the corresponding films in Table 8 containing the various UV cut offs, is shown in Table 9. The data shows that UVA containing films having an absorbance of less than 2 at 384 nm give unacceptably high YI shifts. Thus, films having higher UV cut offs are desirable.

TABLE 9

| Example | Film Composition | UV Cut-off at Abs. = 2 (nm)[a] | dYI[b] |
|---|---|---|---|
| CEx. 9-1 | Control - No UVA film | 280 | 9.0 |
| CEx. 9-2 | CEx 8-1 (PC film only, no UVA) | 287 | 8.4 |
| CEx. 9-3 | Ex. 8-6 (UVA = Uvinul® 3030, 75 μm) | 366 | 8.9 |
| CEx. 9-4 | Ex. 8-6 (UVA = Uvinul® 3030, 75 μm) | 366 | 7.7 |
| Ex. 9-1 | Ex. 8-5 (UVA = Uvinul® 3030, 510 μm) | 384 | 2.7 |
| Ex. 9-2 | Ex. 8-4 (UVA = Cyasorb® 3638, 510 μm) | 391 | 1.8 |
| Ex. 9-3 | Ex. 8-3 (UVA = LA-31RG, 510 μm) | 399 | −0.6 |
| Ex. 9-4 | Ex. 8-3 (UVA = LA-31RG, 510 μm) | 399 | −1.1 |
| Ex. 9-5 | Ex. 8-1 (UVA = Uvaplast® 388, 510 μm) | 409 | −2.4 |

[a]Highest wavelength with an absorbance value of 2 or greater.
[b]Delta YI (dYI) shifts of 3.2 mm thick chip of 90:10 molar ratio ITR:BPA-PC resin containing 1 wt % $D_{10}$ Siloxane.

Preparation of UVA cap layer coated sheets. A UVA absorbing layer with 7.4 phr LA-31RG UVA was prepared by first preparing a UVA containing composition by dry blending a bisphenol A homopolycarbonate resin having an Mw of 35,000 (100 phr), a benzotriazole UVA absorber (LA-31RG, from Amfine Chemicals, 7.4 phr), 0.5 phr PETs mold release, and 0.1 phr of a phosphite heat stabilizer (Sandostab® PEP-Q, available from Clariant), followed by compounding in a twin screw extruder operating at a temperature of about 250 to about 300° C. A UVA capped sheet was then prepared in an ABA layer structure, wherein A represents a UVA cap-layer, and B represents a layer comprising the ITR-Siloxane resin with a molar ratio of ITR to BPA-PC of 90:10 and containing 1 wt % $D_{10}$ Siloxane, as follows.

The sheet was prepared without UVA cap layer on a Werner and Pfleiderer lab extruder with 25 mm diameter and 24:1 length-diameter ratio, at a rate of 114 Kg/hr. The molten OSU compliant thermoplastic composition was extruded through a 76 cm flat coat-hanger die, controlled-heated using electric heaters operating at 250 to 270° C., and passed through a pair of polished steel nip rollers each having a diameter of 30 cm, and controlled-cooled by oil circulation at a temperature of 105 to 125° C. The sheet thickness was varied from 1 to 4.5 mm by adjusting the line speed and nip roll opening.

The co-extruded samples were produced by feeding the UVA containing composition through a separate 5 cm diameter outboard extruder. The two polymers were joined inside a co-extrusion feedblock used to distribute thin layers of the second polymer above and below the layer containing the OSU compliant thermoplastic polycarbonate composition. By adjusting the feed rate of the outboard co-extruder and the line speed, the thickness of the co-extruded cap-layers can be varied. Three samples were prepared, each having cap layer thicknesses of approximately 50, 125, and 250 micrometers (2, 5, and 10 mils, respectively) above and below the OSU compliant layer.

Preparation of UVA cap layer coated sheets by lamination. A UVA absorbing layer with 5 phr LA-31RG UVA was prepared by first preparing a UVA containing composition by dry blending a bisphenol A homopolycarbonate resin having an Mw of 30,000 (100 phr), a benzotriazole UVA absorber (LA-31RG, from Amfine Chemicals, 5 phr), and 0.1 phr of a phosphite heat stabilizer (Sandostab® PEP-Q available from Clariant) followed by compounding in a twin screw extruder operating at a temperature of about 250 to about 300° C. A UVA capped sheet was then prepared by lamination in hot press as an AB layer structure, wherein A represents a UVA cap-layer, and B represents a layer comprising 1 wt % siloxane in ITR 9010, as follows. Film and sheet were pre-dried before lamination at approximately. 120° C. for 4 hrs. The platen on cap layer side was at about 200° C. and the platen for the sheet side was at about 150° C.

Figure 12:
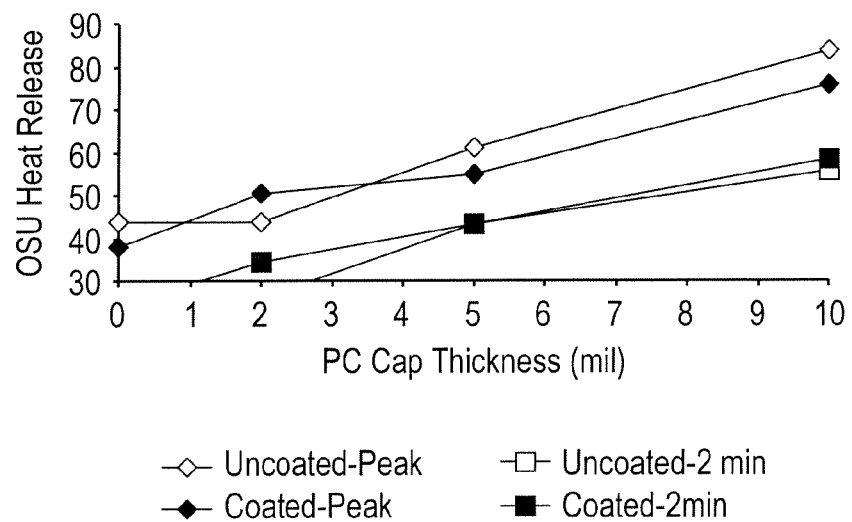
FIG. 12 is a plot of OSU performance versus cap-layer thickness.

OSU evaluation of UVA cap layer coated sheets with and without hardcoat on two layer (AB) and three-layer (ABA) sheets (where the A layer represents a UVA coating layer, and B is the OSU compliant layer). Samples at each thickness and with or without coating with a silicone hard coat were measured for OSU heat release rate. For the AB sheet, the cap-layer as placed in the OSU chamber with the cap layer towards the flame. The results in FIG. 12 show that both hard-coated and non-hard coated ABA sheet samples pass the OSU test with heat release rate values of less than 65/65 (2 min and peak). Both the hard coated and non-hard coated samples with UVA cap-layers of 250 micrometers thickness failed the OSU peak neat release test.

Figure 13:
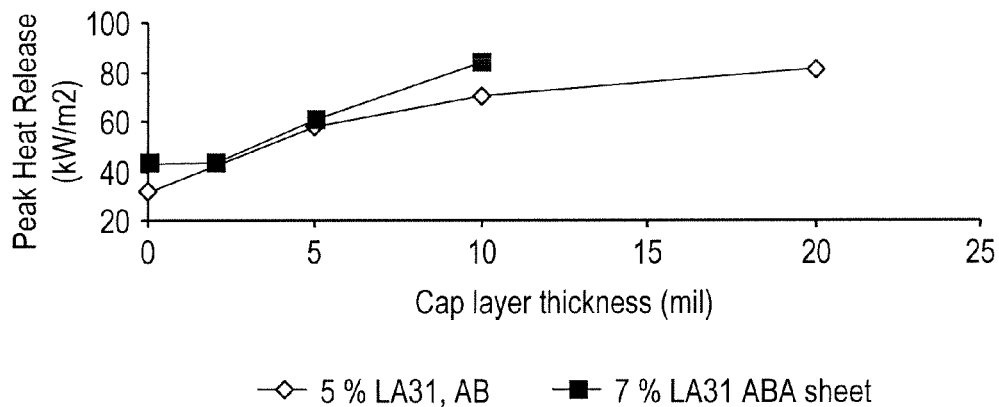
FIG. 13 is a plot of peak heat release versus cap-layer thickness.

In FIG. 13, UVA cap layer films containing LA-31RG UVA were prepared and laminated on the layer comprising 1 wt % siloxane in ITR 9010 resin as described above. Laminates having one UV cap-layer (AB layer structure) containing 5 wt % of LA-31RG UVA, and laminates having two opposing UV cap-layers (ABA layer structure) containing 7 wt % of LA-31RG UVA were tested according to the OSU test, and the results compared in FIG. 13. It can be seen that samples having a cap layer thickness of greater than about 125 micrometers fail the OSU test, where as samples having a cap-layer thickness of less than about 125 micrometers meet or exceed the OSU 65/65 requirements, irrespective of UVA loading, or whether the coating was single or double layer. Thus, UVA cap layers desirably provide the requisite absorbance at a cap layer thickness of less than 125 micrometers.

Figure 14:
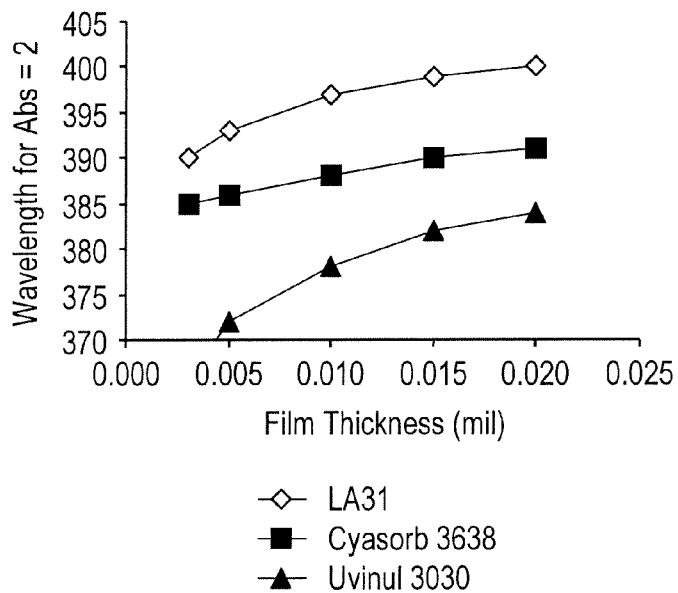
FIG. 14 is a plot of UV absorbance versus film thickness for cap-layers.

In FIG. 14, a plot of the maximum wavelength to achieve an absorbance (abs) of 2 versus film thickness shows that of the common UVAs, benzotriazoles such as LA-31RG UVA have desirable OSU performance properties.

Compounds are described herein using standard nomenclature. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The notation "±0.12 mm" means that the indicated measurement can be from an amount that is 0.12 mm lower to an amount that is 0.12 mm higher than the stated value.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A window article comprising:

a frame and a sheet supported by the frame, wherein the sheet comprises a polysiloxane copolymer composition comprising:

a.) a polysiloxane unit of the formula:

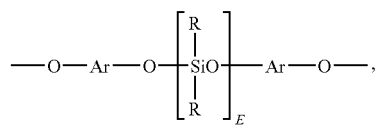

or of the formula:

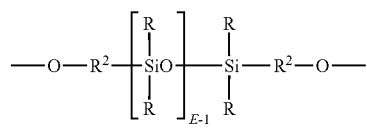

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and b.) an arylate-containing unit consisting of:

50 to 100 mole percent of arylate ester units, wherein the arylate ester units are isophthalate-terephthalate-resorcinol ester units of the formula:

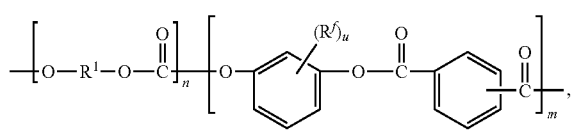

less than 50 mole percent aromatic carbonate units, wherein the aromatic carbonate units comprise less than 30 mole percent resorcinol carbonate units of the formula:

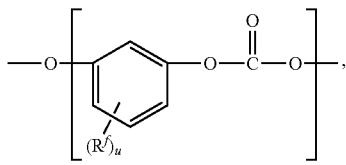

and
less than 35 mole percent bisphenol carbonate units of the formula:

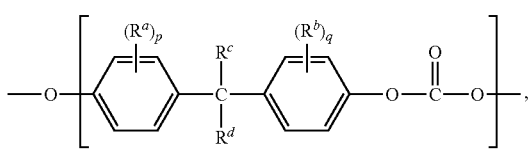

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, wherein m is 5 to 75 and n is 3 to 50, and the sum of the mole percentages of isophthalate-terephthalate-resorcinol ester units, resorcinol carbonate units, and bisphenol carbonate units is 100 mole percent, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the sheet has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

2. The window article of claim 1, wherein the polysiloxane copolymer consists of the polysiloxane unit and the arylate-containing unit.

3. The window article of claim 1, wherein the siloxane units are present in an amount of 0.2 to 6 wt % based on the weight of the polysiloxane copolymer composition.

4. The window article of claim 1, wherein E is 4 to 15.

5. The window article of claim 1, wherein E is 16 to 50.

6. The window article of claim 1, wherein the polysiloxane unit is of the formula:

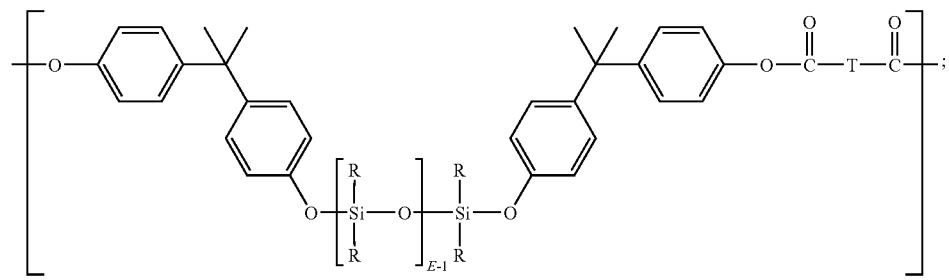

or of the formula:

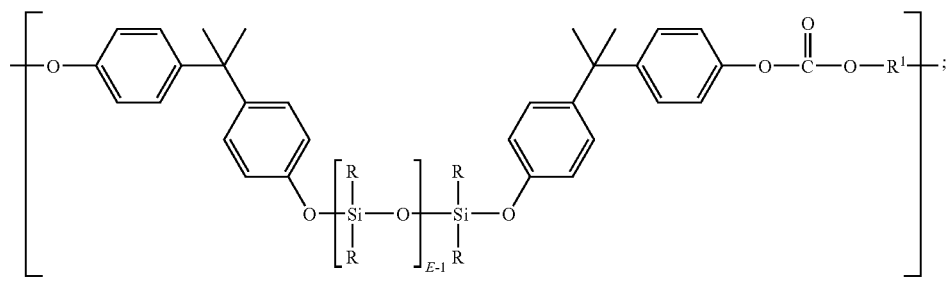

or of the formula:

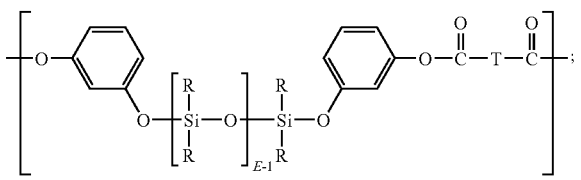

or of the formula:

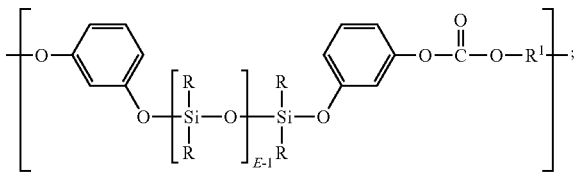

or a combination comprising two or more of the foregoing polysiloxane units, wherein each R is the same or different and is $C_{1-13}$ alkyl, or $C_{6-12}$ aryl, E is 4 to 50, T is a $C_{6-20}$ arylene group; and $R^1$ in is a $C_{6-30}$ arylene group.

7. The window article of claim 1, wherein the polysiloxane unit is of the formula:

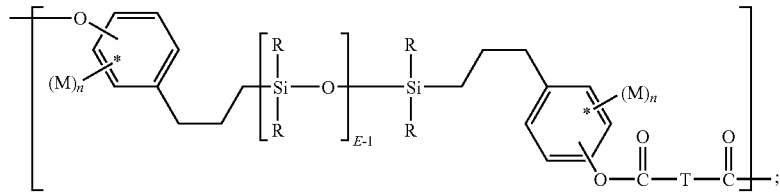

or of the formula

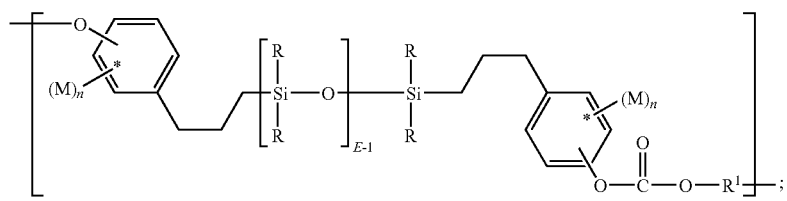

or a combination comprising the foregoing polysiloxane units, wherein each R is the same or different, and is $C_{1-8}$ alkyl or $C_{6-13}$ aryl; n is 0 or 1; each M is a $C_{1-3}$ alkoxy; E is 4 to 50, T is a $C_{6-20}$ arylene group; and $R^1$ is a $C_{6-30}$ arylene group.

8. The window article of claim 1, wherein the sheet has a 2 minute integrated heat release rate of less than or equal to 55 kilowatt-minutes per square meter (kW-min/m²) and a peak heat release rate of less than 55 kilowatts per square meter (kW/m²) as measured using the method of FAR F25.4, in accordance with Federal Aviation Regulation FAR 25.853 (d).

9. The window article of claim 1, wherein the sheet further comprises an additional polymer not identical to the polysiloxane copolymer composition.

10. The window article of claim 9, wherein the additional polymer is a polycarbonate homopolymer, a copolycarbonate, a polyarylate, a copolyarylate, polyarylate-polycarbonate, a polysiloxane-polycarbonate, a polysiloxane-polyarylate, a polysiloxane-polyarylate-polycarbonate, or a combination comprising at least one of the foregoing additional polymers.

11. The window article of claim 10 wherein the additional polymer consists essentially of:
50 to 100 mole percent of arylate ester units, and
0 to 50 mole percent aromatic carbonate units.

12. The window article of claim 9, wherein the additional polymer is present in an amount of greater than 0 to 90 weight percent based on the total weight of polysiloxane copolymer composition and additional polymer.

13. The window article of claim 1, wherein the polysiloxane copolymer further comprises a flame retardant, wherein the flame retardant is a perfluoroalkyl sulfonate salt, a fluoropolymer encapsulated vinylaromatic copolymer, potassium diphenylsulfone-3-sulfonate, sodium trichlorobenzenesulfonate, or a combination comprising at least one of the foregoing flame retardants.

14. The window article of claim 13, wherein the flame retardant is present in an amount of greater than 0 to 1 weight percent, based on the total weight of polysiloxane copolymer composition and additional polymer.

15. The window article of claim 1, wherein the polysiloxane copolymer composition further comprises an additive comprising an impact modifier, a filler, a reinforcing agent, a thermal stabilizer, an antioxidant, a light stabilizer, a gamma-irradiation stabilizer, a plasticizer, a colorant, an antistatic agent, a lubricant, a mold release agent, an anti-drip agent, or a combination comprising one or more of the foregoing additives.

16. The window article of claim 1, wherein the article is a dust cover for the interior section of an aircraft window.

17. The window article of claim 1, wherein the sheet further comprises a hard coat.

18. The window article of claim 17, wherein the hard coat comprises a cured acrylate primer coat disposed on and in at least partial contact with the sheet, and a silica-based hard coat disposed on and in at least partial contact with the cured acrylate primer coat.

19. A window article consisting essentially of:
a frame and a sheet supported by the frame, wherein the sheet consists essentially of:
a polysiloxane copolymer composition consisting essentially of:
  a.) a polysiloxane unit comprising siloxane units, wherein
    the polysiloxane unit is of the formula:

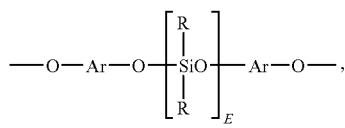

or of the formula:

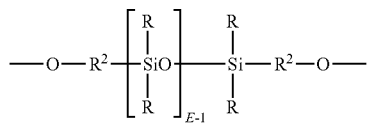

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and
  b.) an arylate-containing unit consisting of:
    50 to 100 mole percent of arylate ester units, wherein the arylate ester units are isophthalate-terephthalate-resorcinol ester units of the formula:

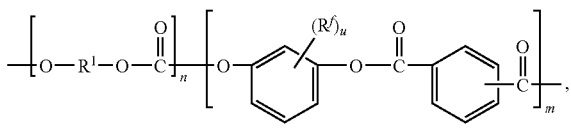

less than 50 mole percent aromatic carbonate units, wherein the aromatic carbonate units comprise
less than 30 mole percent resorcinol carbonate units of the formula:

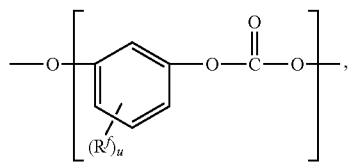

and
less than 35 mole percent bisphenol carbonate units of the formula:

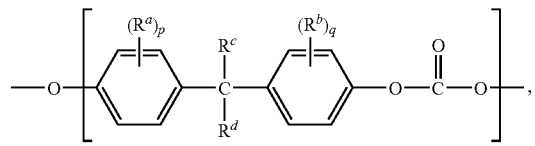

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75 and n is 3 to 50, and the sum of the mole percentages of isophthalate-terephthalate-resorcinol ester units, resorcinol carbonate units, and bisphenol carbonate units is 100 mole percent,
wherein the siloxane units of the polysiloxane unit are present in the polysiloxane copolymer composition in an amount of 0.2 to 10 wt % based on the weight of the polysiloxane copolymer composition,
wherein the properties of the polysiloxane composition are such that it can be molded into a test chip having a thickness of 2.0±0.12 millimeters that has a haze of less than or equal to 3%, according to ASTM D1003-00, and
wherein the sheet has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

20. The window article of claim 19, further consisting essentially of a flame retardant.

21. The window article of claim 19, wherein the sheet further consists essentially of an additional polymer, wherein the additional polymer is not identical to the polysiloxane copolymer composition.

22. A window article comprising:
a polysiloxane copolymer composition comprising:
  a.) a polysiloxane unit comprising siloxane units, wherein
    the polysiloxane unit is of the formula:

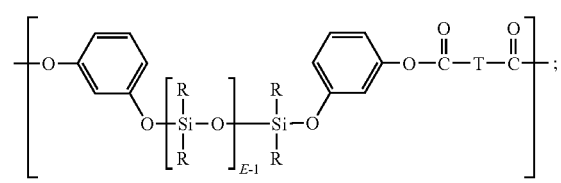

or of the formula:

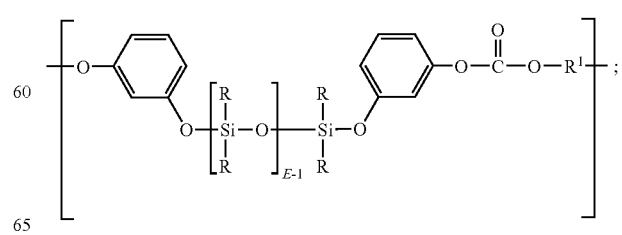

or of the formula:

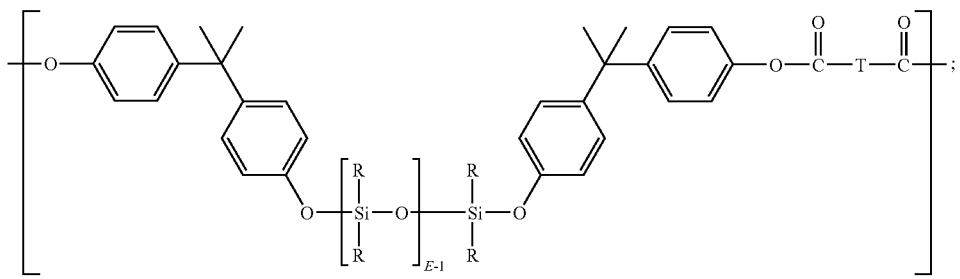

or of the formula:

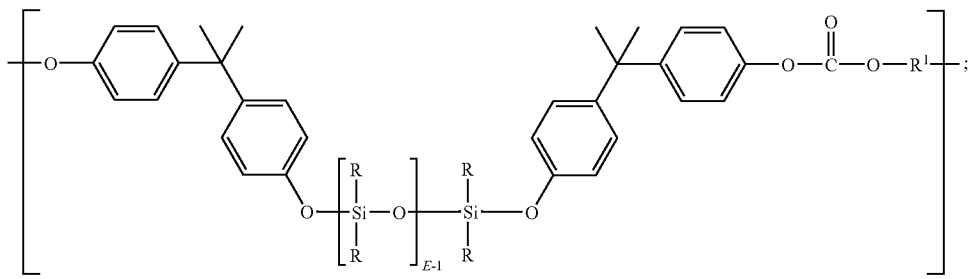

or a combination comprising these polysiloxane units, wherein each R is the same or different and is C1-8 alkyl or C6-12 aryl, E is 4 to 50, T is a C6-20 arylene group; and R1 is a C6-30 arylene group, or the polysiloxane unit is of the formula:

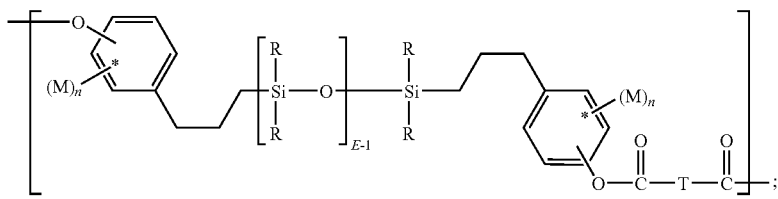

or of the formula

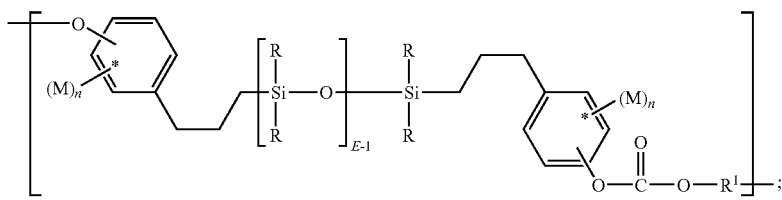

or a combination comprising these polysiloxane units, wherein each R is the same or different, and is $C_{1-13}$ alkyl; n is 0 or 1; each M is a $C_{1-3}$ alkoxy; E is 4 to 50, T is a $C_{6-20}$ arylene group; and $R^1$ is a $C_{6-30}$ arylene group, and b.) an arylate-containing unit consisting of:

50 to 100 mole percent of arylate ester units, wherein the arylate ester units are isophthalate-terephthalate-resorcinol ester units of the formula:

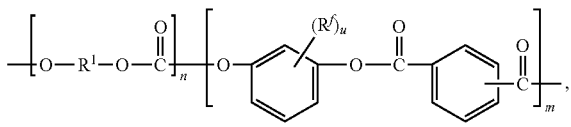

less than 50 mole percent aromatic carbonate units, wherein the aromatic carbonate units comprise less than 30 mole percent resorcinol carbonate units of the formula:

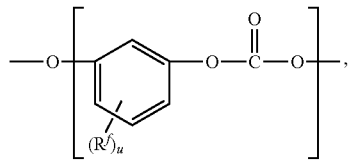

and
less than 35 mole percent bisphenol carbonate units of the formula:

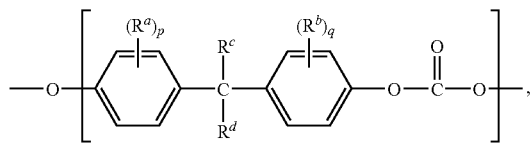

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75, n is 3 to 50, and the sum of the mole percentages of isophthalate-terephthalate-resorcinol ester units, resorcinol carbonate units, and bisphenol carbonate units is 100 mole percent,
wherein the siloxane units of the polysiloxane unit are present in the polysiloxane copolymer composition in an amount of 0.2 to 10 wt % based on the weight of the polysiloxane copolymer composition,
wherein the properties of the polysiloxane composition are such that it can be molded into a test chip having a thickness of 2.0±0.12 millimeters that has a haze of less than or equal to 3%, according to ASTM D1003-00, and
wherein the window article has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

23. A window article consisting essentially of a frame and a sheet supported by the frame, wherein the sheet consists essentially of:
 a.) 50 to 100 percent by weight of a polysiloxane copolymer composition comprising:
  i.) a polysiloxane unit comprising siloxane units, wherein
   the polysiloxane unit is of the formula:
   wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and
  ii.) an arylate-containing unit consisting of:
   50 to 100 mole percent of arylate ester units, wherein the arylate ester units are isophthalate-terephthalate-resorcinol ester units of the formula:

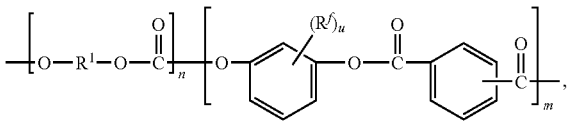

less than 50 mole percent aromatic carbonate units, wherein the aromatic carbonate units comprise
less than 30 mole percent resorcinol carbonate units of the formula:

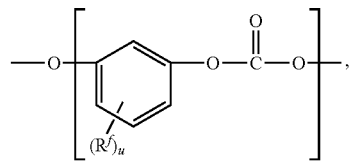

and
less than 35 mole percent bisphenol carbonate units of the formula:

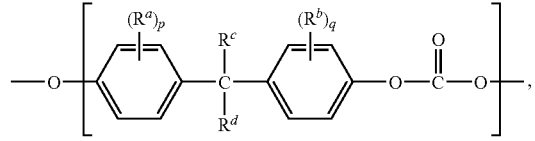

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75, n is 3 to 50, and the sum of the mole percentages of isophthalate-terephthalate-resorcinol ester units, resorcinol carbonate units, and bisphenol carbonate units is 100 mole percent,
wherein the siloxane units of the polysiloxane unit are present in the polysiloxane copolymer composition in an amount of 0.2 to 10 wt % based on the weight of the polysiloxane copolymer composition,
b.) 0 to 50 percent by weight of an additional polymer not identical to the polysiloxane copolymer composition; and
c.) 0 to 1 percent by weight of a flame retardant,
wherein the weight percentages of each of the polysiloxane copolymer composition, the additional polymer, and the flame retardant are based on the total weight of polysiloxane copolymer composition, additional polymer, and flame retardant,
wherein the properties of the polysiloxane composition are such that it can be molded into a test chip having a thickness of 2.0±0.12 millimeters that has a haze of less than or equal to 3%, according to ASTM D1003-00, and wherein the sheet has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

24. A window article comprising:
a frame and a sheet supported by the frame, wherein the sheet comprises an OSU compliant layer having a hard coat disposed on a surface of the OSU compliant layer, wherein the OSU compliant layer comprises a polysiloxane copolymer composition comprising:
a polysiloxane copolymer composition comprising:
   a.) a polysiloxane unit of the formula:

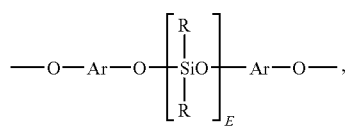

or of the formula:

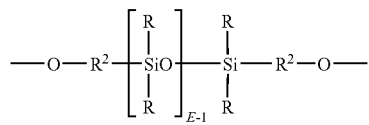

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and
   b.) an arylate-containing unit consisting of:
      50 to 100 mole percent of arylate ester units, wherein the arylate ester units are isophthalate-terephthalate-resorcinol ester units of the formula:

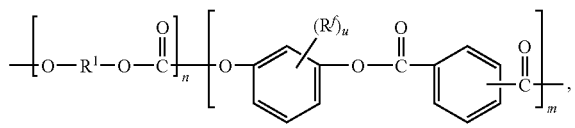

less than 50 mole percent aromatic carbonate units, wherein the aromatic carbonate units comprise
less than 30 mole percent resorcinol carbonate units of the formula:

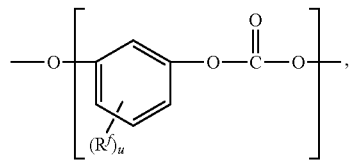

and
less than 35 mole percent bisphenol carbonate units of the formula:

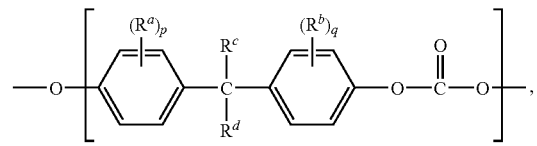

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75, n is 3 to 50, and the sum of the mole percentages of isophthalate-terephthalate-resorcinol ester units, resorcinol carbonate units, and bisphenol carbonate units is 100 mole percent,
wherein the siloxane units of the polysiloxane unit are present in the polysiloxane copolymer composition in an amount of 0.2 to 10 wt % based on the weight of the polysiloxane copolymer composition,
wherein the properties of the polysiloxane composition are such that it can be molded into a test chip having a thickness of 2.0±0.12 millimeters that has a haze of less than or equal to 3%, according to ASTM D1003-00, and
wherein the sheet has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

25. The window article of claim 24, wherein the OSU compliant layer has a hard coat disposed on both opposing surfaces of the OSU compliant layer.

26. A window article comprising:
a frame and a sheet supported by the frame, wherein the sheet comprises an OSU compliant layer having a UV blocking layer disposed on both opposing surfaces of the OSU compliant layer, and a hard coat disposed on a surface of each of the UV blocking layers opposite the OSU compliant layer,
wherein the OSU compliant layer comprises a polysiloxane copolymer composition comprising:
   a.) a polysiloxane unit of the formula:

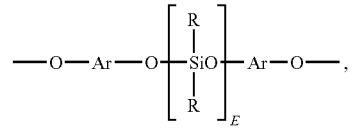

or of the formula:

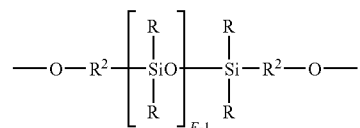

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and b.) an arylate-containing unit consisting of:
50 to 100 mole percent of arylate ester units, wherein the arylate ester units are isophthalate-terephthalate-resorcinol ester units of the formula:

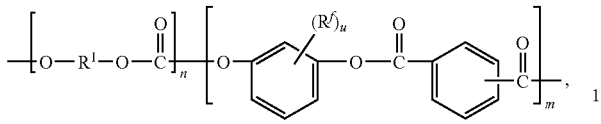

less than 50 mole percent aromatic carbonate units, wherein the aromatic carbonate units comprise
less than 30 mole percent resorcinol carbonate units of the formula:

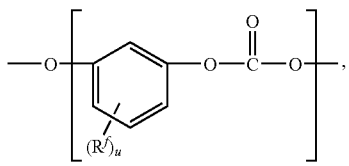

and
less than 35 mole percent bisphenol carbonate units of the formula:

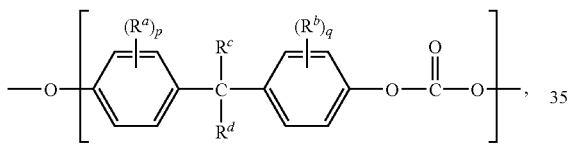

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75, n is 3 to 50, and the sum of the mole percentages of isophthalate-terephthalate-resorcinol ester units, resorcinol carbonate units, and bisphenol carbonate units is 100 mole percent,
wherein the siloxane units of the polysiloxane unit are present in the polysiloxane copolymer composition in an amount of 0.2 to 10 wt % based on the weight of the polysiloxane copolymer composition,
wherein the properties of the polysiloxane composition are such that it can be molded into a test chip having a thickness of 2.0±0.12 millimeters that has a haze of less than or equal to 3%, according to ASTM D1003-00, and
wherein the sheet has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

27. An aircraft window, comprising:
an outer window,
an inner window,
a dust cover, and
a frame,
wherein the outer window, inner window, and dust cover are secured in the frame such that the inner window is disposed between and is substantially coplanar with each of the dust cover and the outer window; the outer window and inner window are separated by a space; the dust cover and the inner window are separated by a space; and
wherein the dust cover comprises
a polysiloxane copolymer composition comprising
a.) a polysiloxane unit comprising siloxane units, wherein
the polysiloxane unit is of the formula:

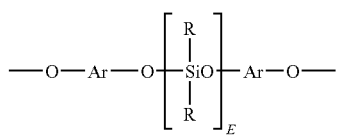

or of the formula:

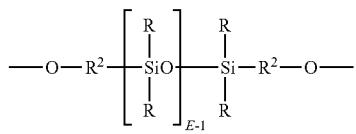

wherein E is 4 to 50; each R is the same or different and is a $C_{1-13}$ monovalent organic group, Ar is a $C_{6-30}$ arylene group, and each $R^2$ is independently a divalent $C_{1-30}$ alkylene or $C_{7-30}$ arylene-alkylene; and
b.) an arylate-containing unit consisting of:
50 to 100 mole percent of arylate ester units, wherein the arylate ester units are isophthalate-terephthalate-resorcinol ester units of the formula:

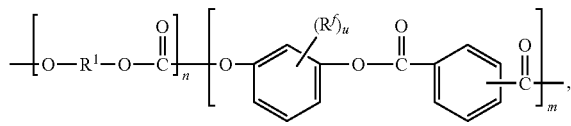

less than 50 mole percent aromatic carbonate units, wherein the aromatic carbonate units comprise
less than 30 mole percent resorcinol carbonate units of the formula:

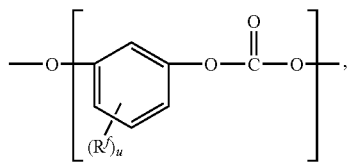

and
less than 35 mole percent bisphenol carbonate units of the formula:

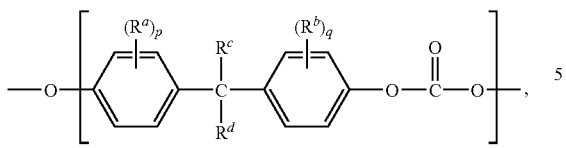

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75, n is 3 to 50, and the sum of the mole percentages of isophthalate-terephthalate-resorcinol ester units, resorcinol carbonate units, and bisphenol carbonate units is 100 mole percent, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the dust cover has a 2 minute integrated heat release rate of less than or equal to 65 kilowatt-minutes per square meter (kW-min/m²) and a peak heat release rate of less than 65 kilowatts per square meter (kW/m²) as measured using the method of FAR F25.4, in accordance with Federal Aviation Regulation FAR 25.853 (d).

28. The aircraft window of claim 27, wherein the dust cover further comprises a hard coat.

29. The aircraft window of claim 27, further comprising an electrochromic element, wherein the electrochromic element is secured to the frame, and is disposed between and is substantially coplanar with each of the dust cover and the inner window; the inner window and electrochromic element are separated by a space; and the dust cover and the electrochromic element are separated by a space.

30. A plastic mirror, comprising:

a polymer layer, a hard coat disposed on a surface of the polymer layer, and a metal layer disposed on a surface of the polymer layer opposite the hard coat, wherein the polymer layer comprises a polysiloxane copolymer composition comprising a.) a polysiloxane unit comprising siloxane units, wherein the polysiloxane unit is of the formula:

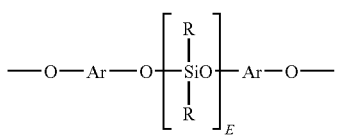

or of the formula:

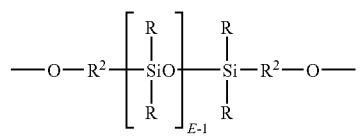

wherein E is 4 to 50; each R is the same or different and is a $C_{1-13}$ monovalent organic group, Ar is a $C_{6-30}$ arylene group, and each $R^2$ is independently a divalent $C_{1-30}$ alkylene or $C_{7-30}$ arylene-alkylene; and b.) an arylate-containing unit consisting of:

50 to 100 mole percent of arylate ester units, wherein the arylate ester units are isophthalate-terephthalate-resorcinol ester units of the formula:

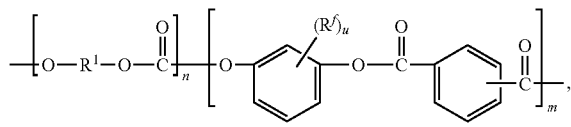

less than 50 mole percent aromatic carbonate units, wherein the aromatic carbonate units comprise less than 30 mole percent resorcinol carbonate units of the formula:

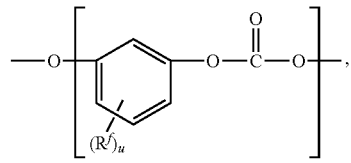

and less than 35 mole percent bisphenol carbonate units of the formula:

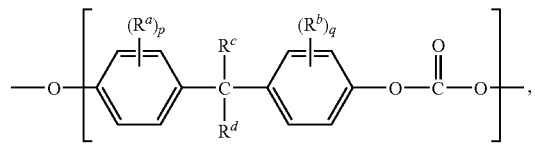

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; $R^1$ is derived from resorcinol; p, q, and u are independently 0 to 4, m is 5 to 75, n is 3 to 50, and the sum of the mole percentages of isophthalate-terephthalate-resorcinol ester units, resorcinol carbonate units, and bisphenol carbonate units is 100 mole percent, wherein the siloxane units of the polysiloxane unit are present in the polysiloxane copolymer composition in an amount of 0.2 to 10 wt % based on the weight of the polysiloxane copolymer composition, wherein the properties of the polysiloxane composition are such that it can be molded into a test chip having a thickness of 2.0±0.12 millimeters that has a haze of less than or equal to 3%, according to ASTM D1003-00, and wherein the plastic mirror has a 2 minute integrated heat release rate of less than or equal to 65 kilowatt-minutes per square meter (kW-min/m$^2$) and a peak heat release rate of less than 65 kilowatts per square meter (kW/m$^2$) as measured using the method of FAR F25.4, in accordance with Federal Aviation Regulation FAR 25.853 (d).

31. The plastic mirror of claim 30, wherein the plastic mirror further comprises a protective coat disposed on a surface of the metal layer opposite the polymer layer.

\* \* \* \* \*